United States Patent
Fujimoto et al.

(10) Patent No.: US 10,839,550 B2
(45) Date of Patent: Nov. 17, 2020

(54) NON-TRANSITORY COMPUTER-READABLE RECORDING MEDIUM FOR STORING SKELETON ESTIMATION PROGRAM, SKELETON ESTIMATION DEVICE, AND SKELETON ESTIMATION METHOD

(71) Applicant: FUJITSU LIMITED, Kawasaki (JP)

(72) Inventors: Hiroaki Fujimoto, Kawasaki (JP); Shoichi Masui, Sagamihara (JP); Kazuo Sasaki, Kobe (JP); Daisuke Abe, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 16/171,196

(22) Filed: Oct. 25, 2018

(65) Prior Publication Data
US 2019/0066327 A1  Feb. 28, 2019

Related U.S. Application Data

(63) Continuation of application No. PCT/JP2016/063501, filed on Apr. 28, 2016.

(51) Int. Cl.
*G06T 7/73* (2017.01)
*G06T 7/60* (2017.01)
(Continued)

(52) U.S. Cl.
CPC ............ *G06T 7/73* (2017.01); *G06K 9/00375* (2013.01); *G06T 7/60* (2013.01); *G06T 7/70* (2017.01);
(Continued)

(58) Field of Classification Search
None
See application file for complete search history.

(56) References Cited

U.S. PATENT DOCUMENTS

| 2010/0034462 A1* | 2/2010 | Nevatia | G06K 9/4642 |
| | | | 382/190 |
| 2010/0111370 A1* | 5/2010 | Black | G06K 9/00369 |
| | | | 382/111 |

(Continued)

FOREIGN PATENT DOCUMENTS

| JP | 2015-11404 | 1/2015 |
| JP | 2015-167008 | 9/2015 |

OTHER PUBLICATIONS

Jamie Shotton et al., "Real-Time Human Pose Recognition in Parts from Single Depth Images", Microsoft Research Cambridge & Xbox Incubation, 8 pages, Jun. 1, 2011 (8 pages).

(Continued)

*Primary Examiner* — Fayyaz Alam
(74) *Attorney, Agent, or Firm* — Fujitsu Patent Center

(57) ABSTRACT

An apparatus includes a memory; a processor coupled to the memory, wherein the processor acquires three-dimensional information of observation points on an object from a sensor, specifies a first area and second areas adjacent to the first area from areas of the object based on the three-dimensional information, and specifies positions of feature points included in the second areas; sets links based on the feature points included in the second areas to estimate positions of skeletons included in the second areas; and uses end points of the skeletons and lengths from the end points of the skeletons to a position of a part included in the first area among parameters used to specify the position of the part, specifies the position of the part included in the first area, and estimates a position of a skeleton included in the first area based on the specified position of the part.

15 Claims, 65 Drawing Sheets

(51) Int. Cl.
  *G06T 7/70* (2017.01)
  *G06K 9/00* (2006.01)
(52) U.S. Cl.
  CPC .............. *G06T 2207/10028* (2013.01); *G06T 2207/30196* (2013.01)

(56) References Cited

U.S. PATENT DOCUMENTS

| | | | | |
|---|---|---|---|---|
| 2012/0314939 | A1* | 12/2012 | Hasegawa | G06K 9/62 382/159 |
| 2012/0327194 | A1* | 12/2012 | Shiratori | G06F 3/011 348/47 |
| 2013/0013112 | A1* | 1/2013 | Darish | B62D 57/032 700/259 |
| 2014/0169623 | A1* | 6/2014 | Liu | G06K 9/00335 382/103 |
| 2014/0219550 | A1* | 8/2014 | Popa | G06K 9/00342 382/154 |
| 2015/0036879 | A1 | 2/2015 | Shiozaki et al. | |
| 2016/0110453 | A1* | 4/2016 | Kim | G06F 16/784 707/749 |
| 2016/0110595 | A1* | 4/2016 | Wang | G06T 7/60 705/27.2 |
| 2016/0334885 | A1* | 11/2016 | Togawa | A63F 13/245 |
| 2017/0273639 | A1* | 9/2017 | Iscoe | A61B 5/0077 |
| 2017/0312032 | A1* | 11/2017 | Amanatullah | G09B 23/30 |
| 2017/0368413 | A1* | 12/2017 | Shavit | G06K 9/00342 |

OTHER PUBLICATIONS

Eiichi Horiuchi, "Hemi-form Geometric Models for Single-scan 3D Point Clouds", The Robotics Society of Japan, vol. 32, No. 8, with English Abstract, 2014 (10 pages).

International Search Report and Written Opinion of the International Searching Authority, mailed in connection with PCT/JP2016/063501 dated Jun. 28, (8 pages), with partial English translation.

EESR—The Extended European Search Report of European Patent Application No. 16900511.3 dated Feb. 12, 2019.

L. Sigal et al., "Tracking Loose-limbed People", Proceedings of the 2004 IEEE Computer Society Conference on Computer Vision and Pattern Recognition, vol. 1, XP055546464, pp. 421-428, Jan. 1, 2004. cited in EESR mailed on Feb. 12, 2019 for corresponding European Patent Application No. 16900511.3.

M. Straka et al., "Skeletal Graph Based Human Pose Estimation in Real-Time", Proceedings of the British Machine Vision Conference 2011, XP055546452, pp. 1-12, Jan. 1, 2011. cited in EESR mailed on Feb. 12, 2019 for corresponding European Patent Application No. 16900511.3.

S. Handrich et al., "A Robust Method for Human Pose Estimation based on Geodesic Distance Features", 2013 IEEE International Conference on Systems, Man, and Cybernetics, 2013 IEEE, XP032556872, DOI 10.1109/SMC.2013.159, pp. 906-911, Oct. 13, 2013. cited in EESR mailed on Feb. 12, 2019 for corresponding European Patent Application No. 16900511.3.

* cited by examiner

FIG. 2

| OBSERVATION POINT IDENTIFICATION INFORMATION | THREE-DIMENSIONAL COORDINATES |
|---|---|
| K1001 | $(x_1, y_1, z_1)$ |
| K1002 | $(x_2, y_2, z_2)$ |
| K1003 | $(x_3, y_3, z_3)$ |
| ... | ... |

FIG. 3

| MODEL NUMBER | PART | THREE-DIMENSIONAL COORDINATES(x,y,z) |
|---|---|---|
| m1 | HEAD | (10, 2, 1) |
| | RIGHT WRIST | (15, 4, 4) |
| | ... | |
| | LEFT WRIST | (5, 8, 3) |
| | CENTER OF GRAVITY | (10, 6, 2.5) |
| m2 | HEAD | (4, 4, 3) |
| | RIGHT WRIST | (13, 4, 3) |
| | ... | |
| | LEFT WRIST | (6, 10, 4) |
| | CENTER OF GRAVITY | (5, 7, 3) |
| | ... | ... |
| ... | | |

| IDENTIFICATION NUMBER | PART | THREE-DIMENSIONAL COORDINATES |
|---|---|---|
| T001 | HEAD | (10, 2, 3) |
| | RIGHT WRIST | (15, 4, 4) |
| | ... | |
| | LEFT WRIST | (5, 8, 3) |
| T002 | HEAD | (10, 2, 3) |
| | RIGHT WRIST | (13, 4, 3) |
| | ... | |
| | LEFT WRIST | (6, 10, 4) |

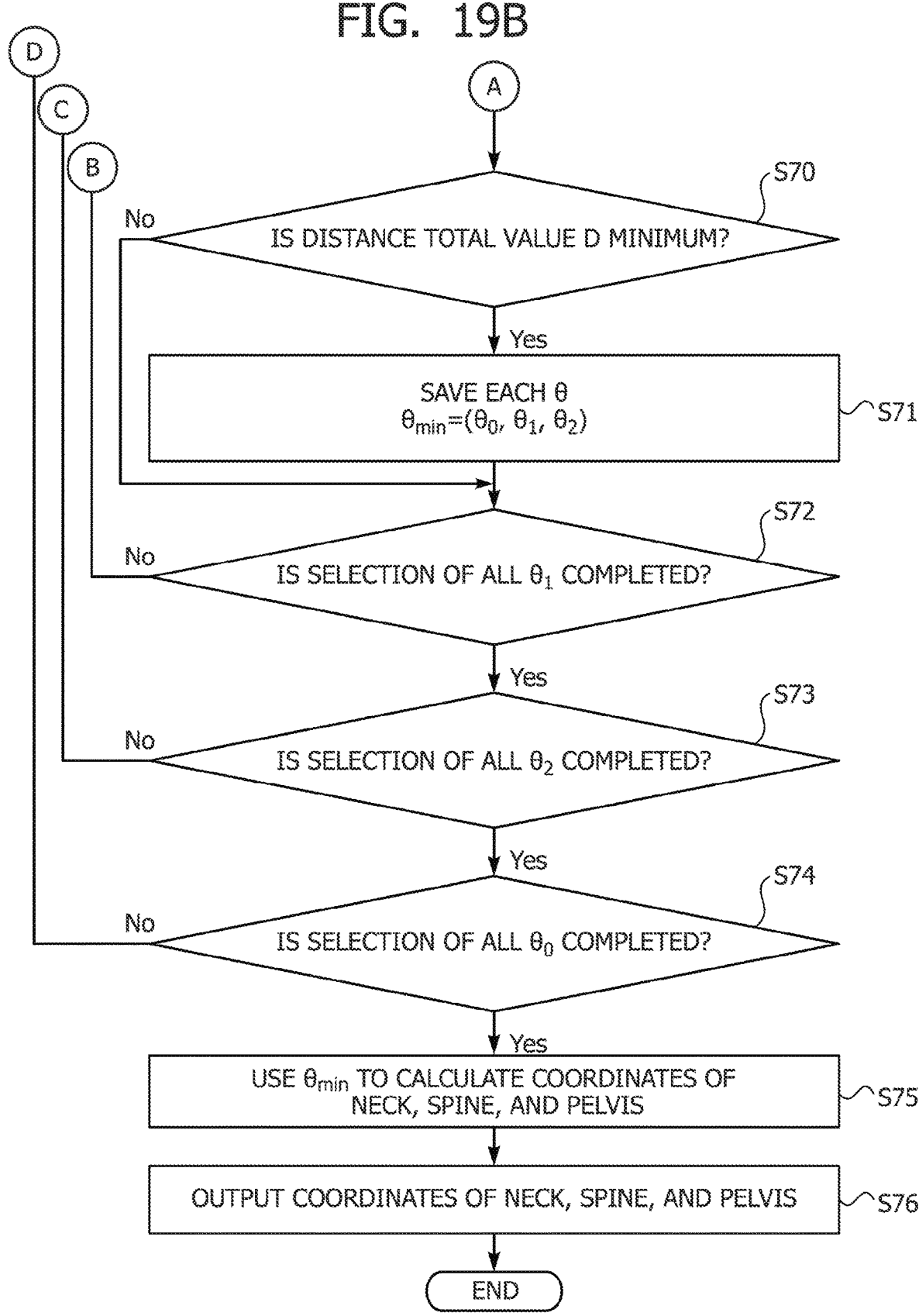

FIG. 24

| MODULE NAME | SKILL DETERMINATION NAME | PARAMETER DEFINITION | | |
|---|---|---|---|---|
| | | TARGET PHASE | COMPARISON POSITION | STANDARD PARAMETER |
| PositionChecker | HEAD MOVEMENT | start-follow | start: HEAD<br>current: HEAD | 8, 10, 20 |
| AngleChecker(1) | LEFT ELBOW ANGLE | start-impact | current: LEFT SHOULDER<br>current: LEFT ELBOW<br>current: LEFT WRIST | (135-180),<br>(130-135, 180-190),<br>(110-130, 190-200) |
| AngleChecker(2) | BENT-FORWARD POSTURE | start-impact | current: HEAD<br>current: WAIST | (25-40),<br>(20-25, 40-55),<br>(8-20, 55-60) |
| | ... | | | |

AngleChecker(1) — □ ×

DETERMINATION NAME: LEFT ELBOW ANGLE

DETERMINATION TARGET  ⌐ 71  ⌐ 71a  ⌐ 71b

| JOINT1: | PHASE: current ▾ | JOINT: ShoulderLeft ▾ |
| JOINT2: | PHASE: current ▾ | JOINT: ElbowLeft ▾ |
| JOINT3: | PHASE: current ▾ | JOINT: WristLeft ▾ |

TARGET SECTION: start ▾ ~ impact ▾

DETERMINATION STANDARD  ⌐ 72

Excellent: 135 ~ 180
Good: 130 ~ 135    180 ~ 190
Bad: 110 ~ 130    190 ~ 200

DETERMINATION RESULT

EVALUATION STANDARD VALUE: 160
THE NUMBER OF SAMPLES FOR AVERAGE MOVEMENT: 3

COMMENT
|  | STANDARD VALUE OR BELOW | STANDARD VALUE OR ABOVE |
| Good: | SLIGHTLY BENT | SLIGHTLY STRETCHED |
| Bad: | TOO BENT | TOO STRETCHED |

OK    CANCEL

FIG. 35

CheckSwingWindow(SNAPSHOT)

| start | backswing | top | impact | follow | end |
|---|---|---|---|---|---|
| HEAD MOVEMENT: Excellent(0cm) | HEAD MOVEMENT: Excellent(1cm) | HEAD MOVEMENT: Excellent(8cm) | HEAD MOVEMENT: Excellent(7cm) | HEAD MOVEMENT: Excellent(7cm) | HEAD MOVEMENT: - |
| LEFT ELBOW ANGLE: Excellent(171°) | LEFT ELBOW ANGLE: Excellent(162°) | LEFT ELBOW ANGLE: bad (103°:TOO BENT) | LEFT ELBOW ANGLE: Excellent(140°) | LEFT ELBOW ANGLE: - | LEFT ELBOW ANGLE: - |
| BENT-FORWARD POSTURE: Excellent(26°) | BENT-FORWARD POSTURE: Excellent(25°) | BENT-FORWARD POSTURE: Excellent(31°) | BENT-FORWARD POSTURE: Excellent(26°) | BENT-FORWARD POSTURE: - | BENT-FORWARD POSTURE: - |

FIG. 42

| USER IDENTIFICATION INFORMATION | ACTIVITY | SKILL DETERMINATION RESULT |
|---|---|---|
| U101 | GOLF | SKILL DETERMINATION RESULT OF USER IDENTIFICATION INFORMATION U101 |
| U102 | GOLF | SKILL DETERMINATION RESULT OF USER IDENTIFICATION INFORMATION U102 |
| U103 | BASEBALL | SKILL DETERMINATION RESULT OF USER IDENTIFICATION INFORMATION U103 |
| ... | ... | ... |

FIG. 43A

DATE: AUG. 1, 2015

| PHASE | DETERMINATION RESULT OF HEAD MOVEMENT | DETERMINATION RESULT OF RIGHT ELBOW ANGLE | DETERMINATION RESULT OF BENT-FORWARD POSTURE | DETERMINATION RESULT OF WAIST ROTATION |
|---|---|---|---|---|
| start | Excellent(○○cm) | Excellent(○○°) | Excellent(○○°) | good(○○°) |
| backswing | Excellent(○○cm) | Excellent(○○°) | Excellent(○○°) | good(○○°) |
| top | Excellent(○○cm) | bad(○○°) | Excellent(○○°) | good(○○°) |
| impact | Excellent(○○cm) | good(○○°) | Excellent(○○°) | bad(○○°) |
| follow | Excellent(○○cm) | good(○○°) | Excellent(○○°) | good(○○°) |
| end | Excellent(○○cm) | Excellent(○○°) | Excellent(○○°) | good(○○°) |

FIG. 43B

| DATE: AUG. 5, 2015 | | | | |
|---|---|---|---|---|
| PHASE | DETERMINATION RESULT OF HEAD MOVEMENT | DETERMINATION RESULT OF RIGHT ELBOW ANGLE | DETERMINATION RESULT OF BENT-FORWARD POSTURE | DETERMINATION RESULT OF WAIST ROTATION |
| start | Excellent(○○cm) | Excellent(○○°) | Excellent(○○°) | good(○○°) |
| backswing | Excellent(○○cm) | Excellent(○○°) | Excellent(○○°) | good(○○°) |
| top | Excellent(○○cm) | good(○○°) | good(○○°) | good(○○°) |
| impact | Excellent(○○cm) | good(○○°) | Excellent(○○°) | bad(○○°) |
| follow | Excellent(○○cm) | good(○○°) | Excellent(○○°) | good(○○°) |
| end | Excellent(○○cm) | Excellent(○○°) | Excellent(○○°) | good(○○°) |

FIG. 43C

DATE: AUG. 8, 2015

| PHASE | DETERMINATION RESULT OF HEAD MOVEMENT | DETERMINATION RESULT OF RIGHT ELBOW ANGLE | DETERMINATION RESULT OF BENT-FORWARD POSTURE | DETERMINATION RESULT OF WAIST ROTATION |
|---|---|---|---|---|
| start | Excellent(○○cm) | Excellent(○○°) | Excellent(○○°) | good(○○°) |
| backswing | Excellent(○○cm) | Excellent(○○°) | Excellent(○○°) | good(○○°) |
| top | Excellent(○○cm) | good(○○°) | Excellent(○○°) | good(○○°) |
| impact | good(○○°) | good(○○°) | Excellent(○○°) | bad(○○°) |
| follow | Excellent(○○cm) | good(○○°) | Excellent(○○°) | good(○○°) |
| end | Excellent(○○cm) | Excellent(○○°) | Excellent(○○°) | good(○○°) |

| USER IDENTIFICATION INFORMATION | ADDRESS | SEX | AGE | HEIGHT | WEIGHT |
|---|---|---|---|---|---|
| U101 | XXX@ABC | MALE | 30 | ○○cm | ○○kg |
| U102 | XXX@ABC | FEMALE | 35 | ○○cm | ○○kg |
| U103 | XXX@ABC | MALE | 28 | ○○cm | ○○kg |
| ... | ... | ... | ... | ... | ... |

FIG. 45

| CONDITION | | | ADVERTISING BANNER INFORMATION |
|---|---|---|---|
| ACTIVITY | SEX | AGE | |
| GOLF | MALE | 20 OR OVER | ADVERTISING BANNER A1(http//www.○○○○), ADVERTISING BANNER B1(http//www.○○○○), ADVERTISING BANNER C1(http//www.○○○○),... |
| | FEMALE | 20 OR OVER | ADVERTISING BANNER A2(http//www.○○○○), ADVERTISING BANNER B2(http//www.○○○○), ADVERTISING BANNER C2(http//www.○○○○),... |
| ... | | | ... |
| BASEBALL | MALE | 10 OR OVER | ADVERTISING BANNER X(http//www.○○○○), ADVERTISING BANNER Y(http//www.○○○○), ADVERTISING BANNER Z(http//www.○○○○),... |
| ... | | | ... |

| ACTIVITY | CONDITION | | PRODUCT NAME | COMMENT |
|---|---|---|---|---|
| | PHASE | DETERMINATION RESULT | | |
| GOLF | impact | DETERMINATION RESULT: -45°±α<br>DETERMINATION RESULT: 10°±α<br>OF WAIST ROTATION<br>OF RIGHT KNEE ANGLE | GOLF CLUB A | SHAFT WITH SOFT HAND SIDE IS RECOMMENDED TO A BODY-TURN TYPE TO USE MORE FLEXIBILITY |
| GOLF | impact | DETERMINATION RESULT: -35°±α<br>DETERMINATION RESULT: 30°±α<br>OF WAIST ROTATION<br>OF RIGHT KNEE ANGLE | GOLF CLUB B | FLAG BEHAVIOR OF A WRIST-TURN TYPE IS LARGE, AND GOLF CLUB WITH A HARD PART FROM THE MIDDLE TO THE HAND SIDE IS RECOMMENDED TO REDUCE THE FLEXIBILITY OF THE SHAFT |
| | ... | ... | ... | |
| BASEBALL | ... | | | |

520d

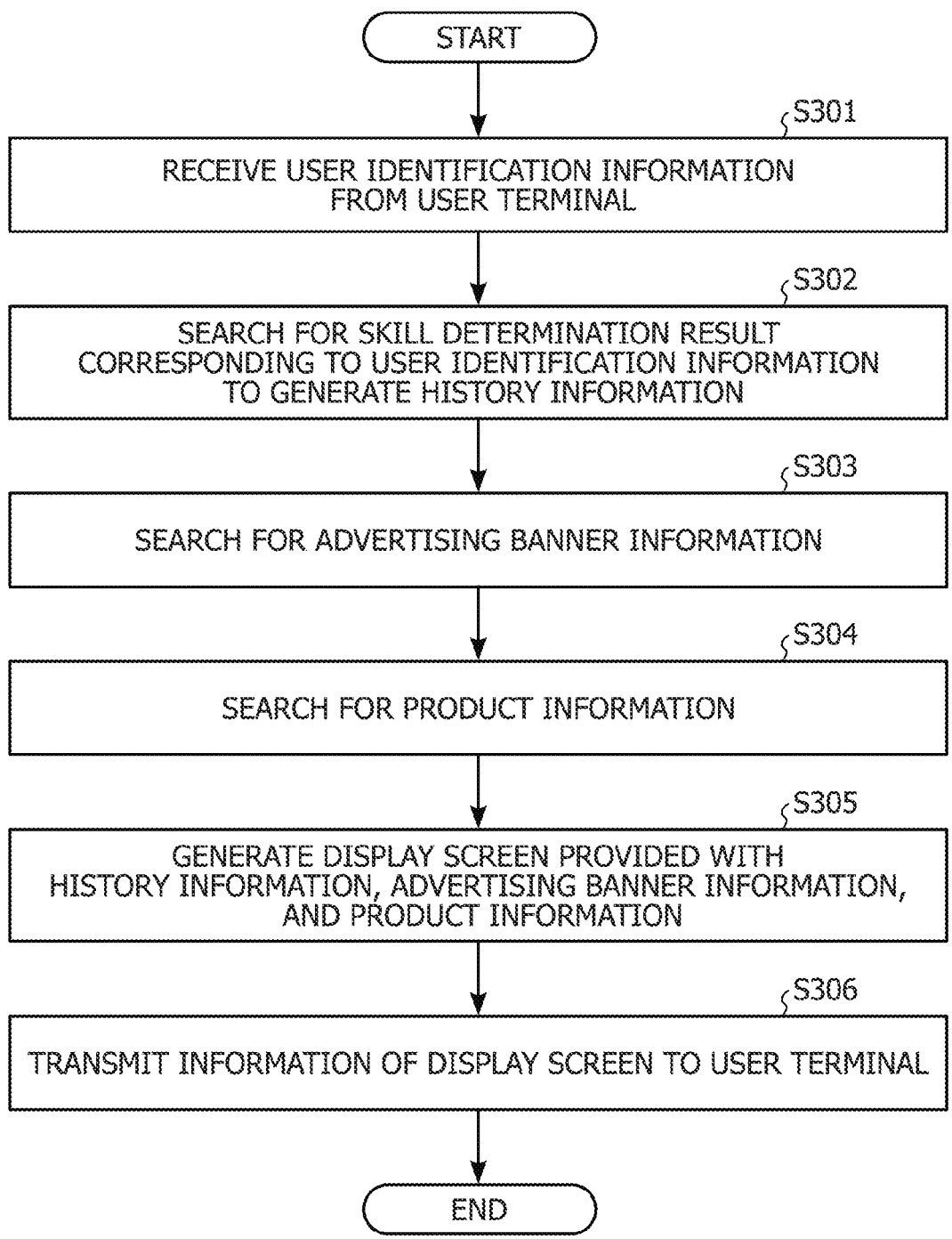

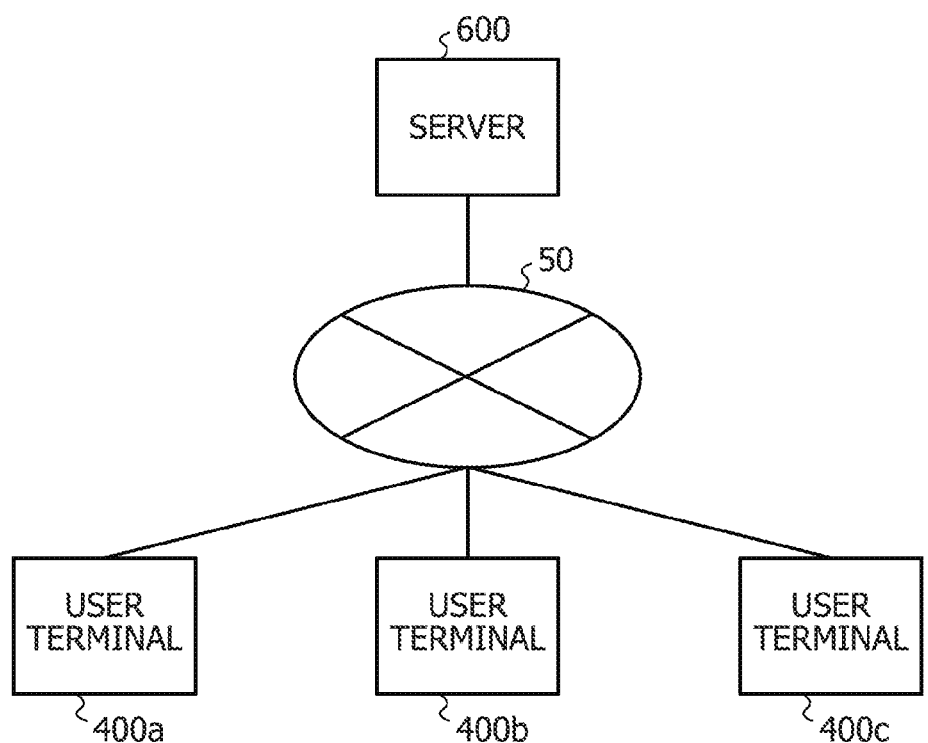

FIG. 50

| USER IDENTIFICATION INFORMATION | ADDRESS | SEX | AGE | HEIGHT | WEIGHT | SCHOOL | PRACTICE FIELD 620b |
|---|---|---|---|---|---|---|---|
| U101 | XXX@ABC | MALE | 30 | ○○cm | ○○kg | SCHOOL A | PRACTICE FIELD a |
| U102 | XXX@ABC | FEMALE | 35 | ○○cm | ○○kg | SCHOOL B | PRACTICE FIELD a |
| U103 | XXX@ABC | MALE | 28 | ○○cm | ○○kg | SCHOOL A | PRACTICE FIELD b |
| ... | ... | ... | ... | ... | ... | ... | ... |

FIG. 51

| GROUP IDENTIFICATION INFORMATION | BELONGING USER IDENTIFICATION INFORMATION |
|---|---|
| G101 | U101, U103, U114, ... |
| G102 | U103, U122, U130, ... |
| G103 | U110, U115, U128, ... |
| ... | ... |

| EXPERT IDENTIFICATION INFORMATION | PROFILE INFORMATION | EXEMPLAR DATA | EVALUATION VALUE |
|---|---|---|---|
| C101 | PROFILE INFORMATION OF EXPERT OF EXPERT IDENTIFICATION INFORMATION C101 | FIRST EXEMPLAR DATA | 80 |
| C102 | PROFILE INFORMATION OF EXPERT OF EXPERT IDENTIFICATION INFORMATION C102 | FIRST EXEMPLAR DATA, SECOND EXEMPLAR DATA | 50 |
| C103 | PROFILE INFORMATION OF EXPERT OF EXPERT IDENTIFICATION INFORMATION C103 | FIRST EXEMPLAR DATA, SECOND EXEMPLAR DATA, THIRD EXEMPLAR DATA | 70 |
| ⋮ | ⋮ | ⋮ | ⋮ |

720c

ND TRANSITORY COMPUTER-READABLE
RECORDING MEDIUM FOR STORING
SKELETON ESTIMATION PROGRAM,
SKELETON ESTIMATION DEVICE, AND
SKELETON ESTIMATION METHOD

CROSS-REFERENCE TO RELATED
APPLICATION

This application is a continuation application of International Application PCT/JP2016/063501 filed on Apr. 28, 2016 and designated the U.S., the entire contents of which are incorporated herein by reference.

FIELD

The embodiments discussed herein are related to a non-transitory computer-readable recording medium for storing a skeleton estimation program, skeleton estimation device, and skeleton estimation method.

BACKGROUND

In recent years, an ICT (Information and Communication Technology) is utilized to make an attempt to improve the skill of sports or to increase the work efficiency. For example, in a technique of improving the skill of sports, the movement of the body of an instructor and the movement of the body of a user are compared and analyzed to display the difference between the movements of the bodies of the instructor and the user.

To analyze the movement of the body of a person, a technique is used to acquire distance image information from a 3D (dimension) sensor, such as Kinect (trademark), to recognize the positions of parts of the person, such as head, hands, body, and legs. Hereinafter, a body part recognition method and a model fitting method will be described as examples of the technique of recognizing the positions of the parts of the person.

Examples of related art are J. Shotton, A. Fitzgibbon, M. Cook, T. Sharp, M Finocchio, R. Moore, A. Kipman, and A. Blake "Real-time human pose recognition in parts from a single depth image" In Proc. CVPR, 2011 and Eiichi Horiuchi, "Hemi-form Geometric Models for Single-scan 3D Point Clouds," Journal of the Robotics Society of Japan, Vol. 32 No. 8, pp. 721 to 730, 2014.

SUMMARY

According to an aspect of the embodiments, an apparatus includes a memory; a processor coupled to the memory, wherein the processor acquires three-dimensional information of a plurality of observation points on an object from a distance sensor, specifies a first area and a plurality of second areas adjacent to the first area from areas of the object based on the three-dimensional information, and specifies positions of a plurality of feature points included in the second areas; sets links based on the feature points included in the second areas to estimate positions of skeletons included in the second areas; and uses end points of the skeletons included in the second areas and lengths from the end points of the skeletons to a position of a part included in the first area among a plurality of parameters used to specify the position of the part included in the first area, specifies the position of the part included in the first area, and estimates a position of a skeleton included in the first area based on the specified position of the part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of a three-dimensional data table according to Embodiment 1;

FIG. 3 is a diagram illustrating an example of a data structure of model data according to Embodiment 1;

FIG. 4 is a diagram illustrating an example of a data structure of a skeleton data table according to Embodiment 1;

FIG. 8 is a diagram illustrating an example of removal patterns;

FIGS. 19A and 19B depict flow chart illustrating a processing procedure of a skeleton recognition process of a body;

FIG. 24 is a diagram illustrating an example of a data structure of skill determination definition data;

FIG. 28 is a diagram illustrating an example of a parameter setting screen of "AngleChecker (1)."

FIG. 35 is a diagram (2) illustrating an example of a display screen generated by an output unit;

FIG. 42 is a diagram illustrating an example of a data structure of a skill determination result table;

FIGS. 43A to 43C depict diagrams illustrating an example of skill determination results;

FIG. 44 is a diagram illustrating an example of a data structure of a personal information table according to Embodiment 3;

FIG. 45 is a diagram illustrating an example of a data structure of a banner information table;

FIG. 46 is a diagram illustrating an example of a data structure of a product table;

FIG. 47 is a flow chart illustrating a processing procedure of a server according to Embodiment 3;

FIG. 48 is a diagram illustrating a configuration of a system according to Embodiment 4;

FIG. 50 is a diagram illustrating an example of a data structure of a personal information table according to Embodiment 4;

FIG. 51 is a diagram illustrating an example of a data structure of a group management table;

FIG. 55 is a diagram illustrating an example of a data structure of an expert data table;

DESCRIPTION OF EMBODIMENTS

The body part recognition method will be described. In the body part recognition method, a distance image is input, and a discriminator learned by using a random forest method is used to label each pixel. The center of gravity of the label equivalent to a joint position is then used to directly estimate joint coordinates in the body part recognition method.

Figure 58:
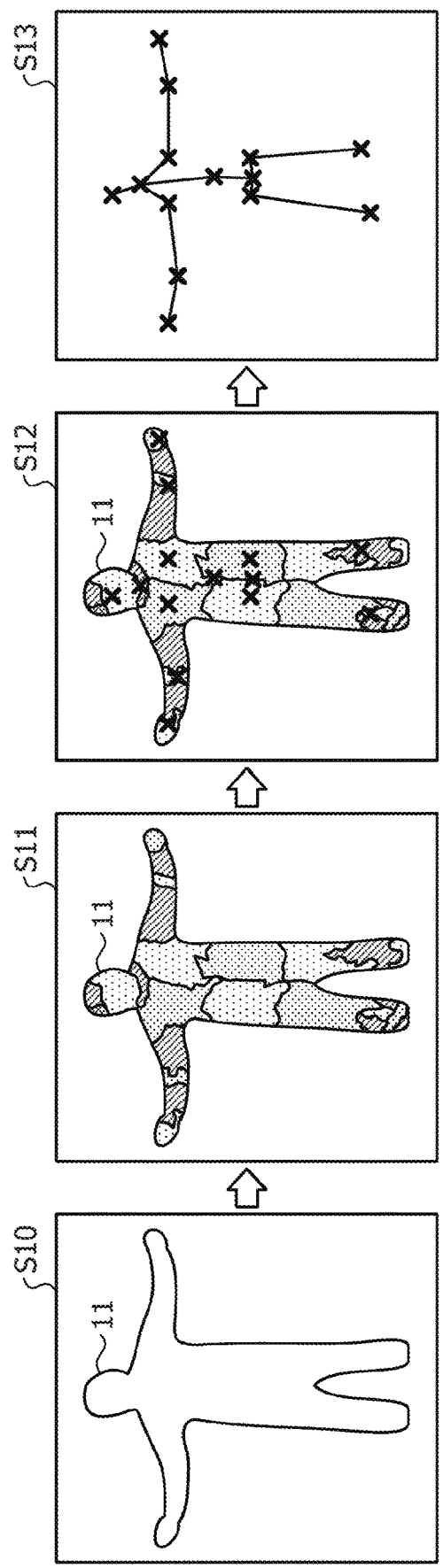
FIG. 58 is a diagram for describing a body part recognition method.

For example, FIG. 58 is a diagram for describing a body part recognition method. As illustrated in FIG. 58, the distance image information is acquired from the 3D sensor, and the background of the distance image information is removed to generate an image 11 in the body part recognition method (step S10). The discriminator learned by using the random forest method is used to label each pixel in the body part recognition method (step S11). The center of gravity of each label is estimated as a joint position (step S12), and the centers of gravity of the labels are connected to recognize the skeleton (step S13) in the body part recognition method.

The model fitting method will be described. In the model fitting method, an area connecting the joints is defined by a cylinder model (or a conic model) or the like, and the shape of the cylinder model that best fits the observation points is calculated while the position and the size of the model are changed. In the model fitting method, the process of calculating the shape of the cylinder model is repeatedly executed in the areas equivalent to the parts, and the cylinder models are combined to recognize the skeleton.

Figure 59:
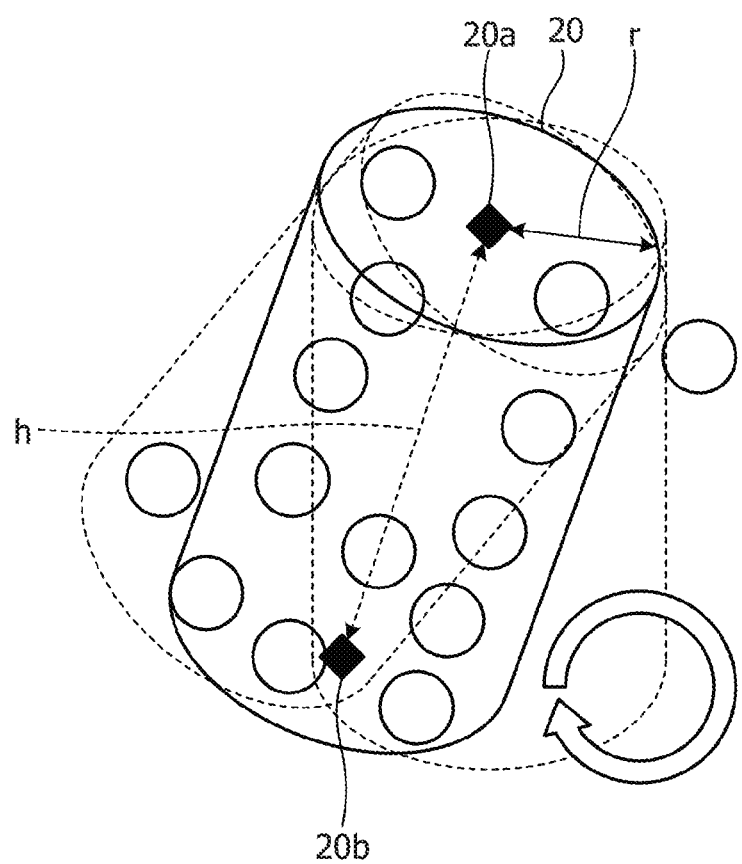
FIG. 59 is a diagram (1) for describing a model fitting method.
Figure 60:
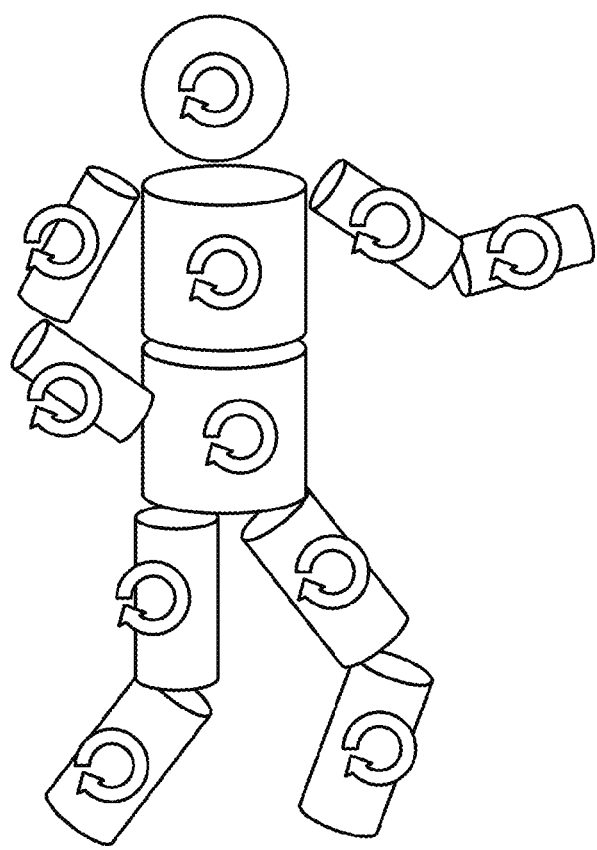
FIG. 60 is a diagram (2) for describing a model fitting method.

FIGS. 59 and 60 are diagrams for describing a model fitting method. As illustrated in FIG. 59, eight variables including a radius r, a height h, and center positions 20a (x1, y1, z1) and 20b (x2, y2, z2) at both ends of a cylinder 20 are changed within a certain range in the model fitting method. In the model fitting method, the number of observation points included in the cylinder 20 is set as an evaluation value, and the cylinder with the highest evaluation value is set as the skeleton. Circles in FIG. 59 are equivalent to the observation points. As illustrated in FIG. 60, the process described in FIG. 59 is repeatedly applied to the parts of the person to obtain a plurality of cylinders equivalent to the parts, and the cylinders are combined to recognize the skeleton in the model fitting method.

There is a problem that the skeleton of the user may not be accurately recognized at a high speed.

In the body part recognition method, the joint coordinates are directly obtained from the centers of gravity of the labels. Therefore, when noise of the 3D sensor, label partitioning with hidden parts, or label position errors in a posture difficult to learn are generated, positions that may not be the human body skeleton may be estimated as positions of joints. In addition, each pixel is labeled at random in the body part recognition method. Therefore, the label near the boundary of the part becomes ambiguous, and the joint position is not stable when viewed in time-series frames.

Figure 61:
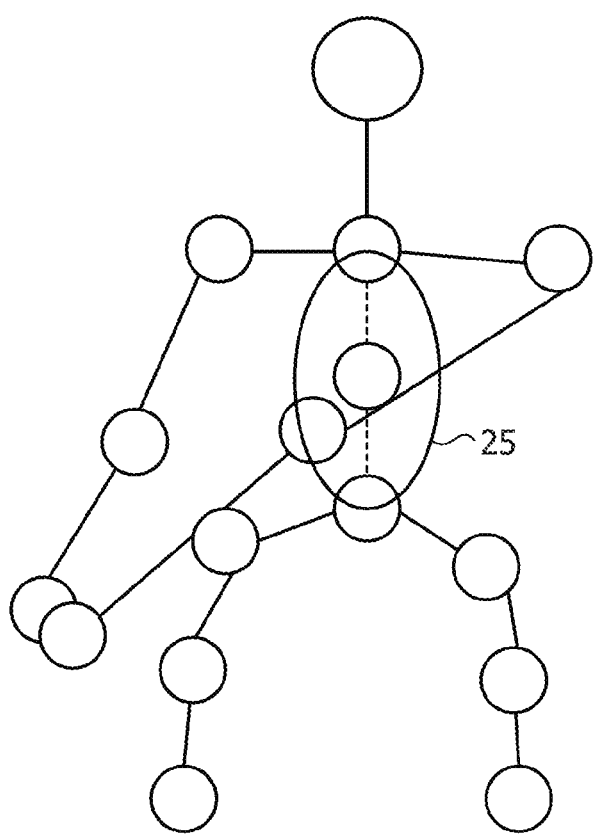
FIG. 61 is a diagram for describing a problem of the related art.

FIG. 61 is a diagram for describing a problem of the related art. In FIG. 61, circles indicate the positions of the joints, and straight lines connecting the joints are defined as links. A set of the joints and the links is defined as a skeleton.

FIG. 61 illustrates the skeleton at a timing of a golf swing of the user, and some of the joints of a body 25 is partially hidden by the left arm. In this case, position errors of the labels occur, and the skeleton may not be appropriately recognized.

On the other hand, combinations of a large number of parameters are evaluated in the model fitting method, and the calculation time period becomes long in the fitting of a target, such as a human body, including a large number of parts. In addition, there are many combinations of evaluation values at a part with many observation points, such as the body. The calculation time period becomes long compared to other parts, and the skeleton of the user may not be recognized at a high speed.

Hereinafter, embodiments of a skeleton estimation device, a skeleton estimation method, and a skeleton estimation program according to the present invention will be described in detail with reference to the drawings. Note that the present invention is not limited by the embodiments.

Embodiment 1

Figure 1:
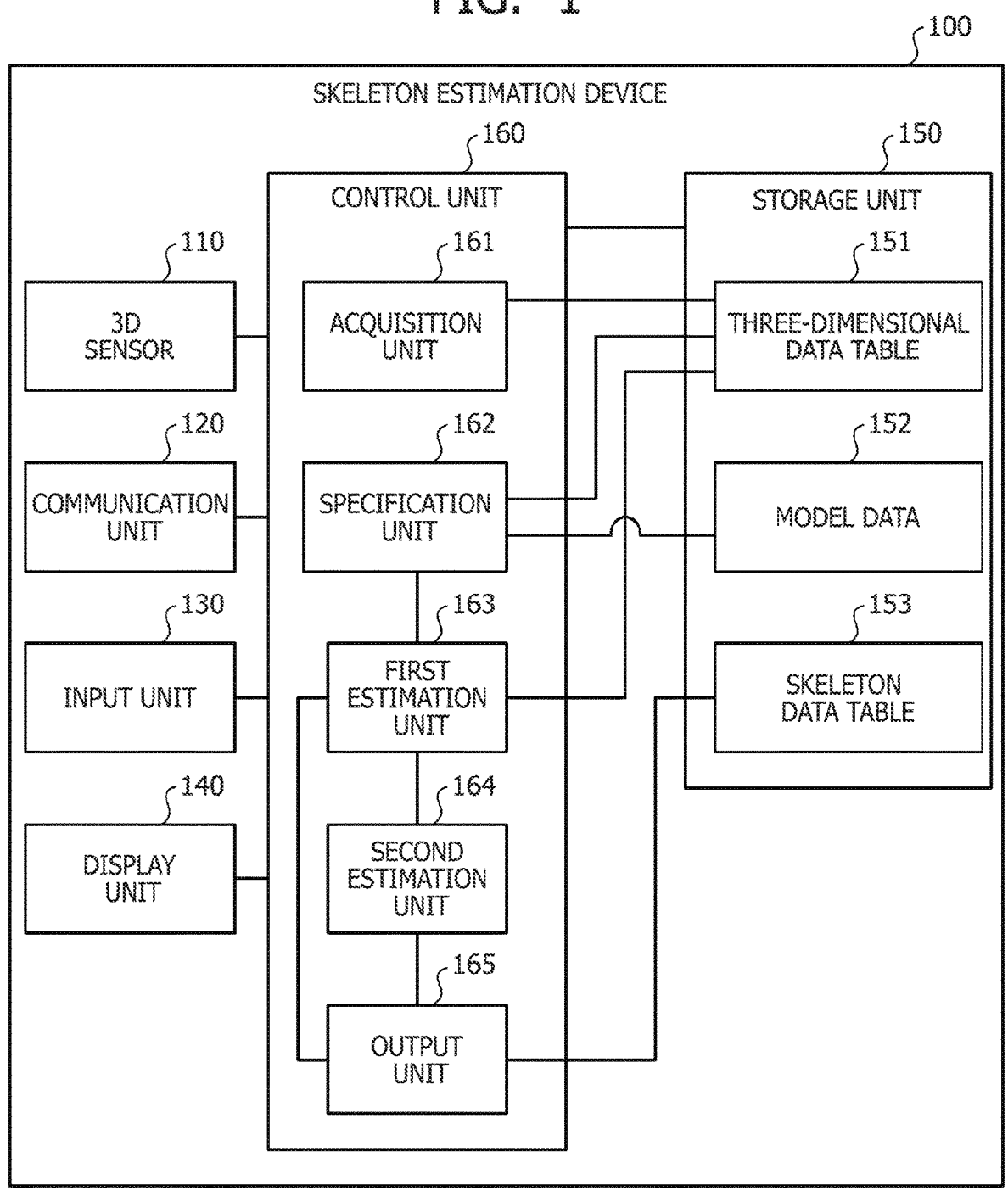
FIG. 1 is a functional block diagram illustrating a configuration of a skeleton estimation device according to Embodiment 1.

FIG. 1 is a functional block diagram illustrating a configuration of a skeleton estimation device according to Embodiment 1. As illustrated in FIG. 1, a skeleton estimation device 100 includes a 3D sensor 110, a communication unit 120, an input unit 130, a display unit 140, a storage unit 150, and a control unit 160.

The 3D sensor 110 is a sensor that measures information of distance from an installation position of the 3D sensor 110 to each observation point on a subject included in an imaging range of the 3D sensor 110. For example, the 3D sensor 110 generates three-dimensional data indicating three-dimensional coordinates of each observation point for each given time period or each frame and outputs the generated three-dimensional data to the control unit 160.

FIG. 2 is a diagram illustrating an example of a data structure of a three-dimensional data table according to Embodiment 1. As illustrated in FIG. 2, a three-dimensional data table 151 associates observation point identification information and three-dimensional coordinates. The observation point identification information is information for uniquely identifying the observation points. The three-dimensional coordinates indicate coordinates of the observation points on an x-axis, a y-axis, and a z-axis orthogonal to each other. For example, the x-axis is an axis in a horizontal direction with respect to the 3D sensor 110. The y-axis is an axis in a vertical direction with respect to the 3D sensor 110. The z-axis is an axis in a depth direction of the 3D sensor 110.

The communication unit 120 is a processing unit that communicates with an external device or the like not illustrated, through a network. The communication unit 120 corresponds to a communication device or the like.

The input unit 130 is an input device for inputting various types of information to the skeleton estimation device 100. The input unit 130 corresponds to, for example, a keyboard, a mouse, a touch panel, and the like.

The display unit 140 is a display device that displays various types of information output from the control unit 160. The display unit 140 corresponds to, for example, a liquid crystal display, a touch panel, and the like.

The storage unit 150 includes a three-dimensional data table 151, model data 152, and a skeleton data table 153. The storage unit 150 corresponds to a semiconductor memory device, such as a RAM (Random Access Memory), a ROM (Read Only Memory), and a flash memory, or a storage device, such as a hard disk and an optical disk.

The three-dimensional data table 151 is a table for storing a plurality of pieces of three-dimensional data acquired from the 3D sensor 110. The data structure of each piece of three-dimensional data corresponds to the data structure described in FIG. 2.

The model data 152 is information defining types of models and three-dimensional coordinates of each part of the models. For example, the types of models correspond to various postures of the subject. FIG. 3 is a diagram illustrating an example of a data structure of model data according to Embodiment 1. As illustrated in FIG. 3, the model data 152 associates model numbers, parts, and three-dimensional coordinates. The model numbers are numbers for identifying the types of models. The parts indicate parts of the subject. The three-dimensional coordinates indicate three-dimensional coordinates of the parts on the models.

The skeleton data table 153 is a table for storing information of the skeleton of the subject for each given time period. FIG. 4 is a diagram illustrating an example of a data structure of a skeleton data table according to Embodiment 1. As illustrated in FIG. 4, the skeleton data table 153 associates identification numbers, parts, and three-dimensional coordinates. The identification numbers are information for identifying the records. The parts indicate parts of the subject. The three-dimensional coordinates indicate three-dimensional coordinates of the parts of the subject.

The control unit 160 includes an acquisition unit 161, a specification unit 162, a first estimation unit 163, a second estimation unit 164, and an output unit 165. the control unit 160 corresponds to an integrated device, such as an ASIC (Application Specific Integrated Circuit) and an FPGA (Field Programmable Gate Array). The control unit 160 also corresponds to an electronic circuit, such as a CPU (Central Processing Unit) and an MPU (Micro Processing Unit).

The acquisition unit 161 is a processing unit that acquires three-dimensional data from the 3D sensor 110. The acquisition unit 161 stores the three-dimensional data in the three-dimensional data table 151 every time the acquisition unit 161 acquires the three-dimensional data. Although the 3D sensor 110 generates the three-dimensional data in the case described above, the acquisition unit 161 may convert distance information acquired from the 3D sensor 110 into three-dimensional data according to a given conversion rule to thereby generate the three-dimensional data.

Figure 5:
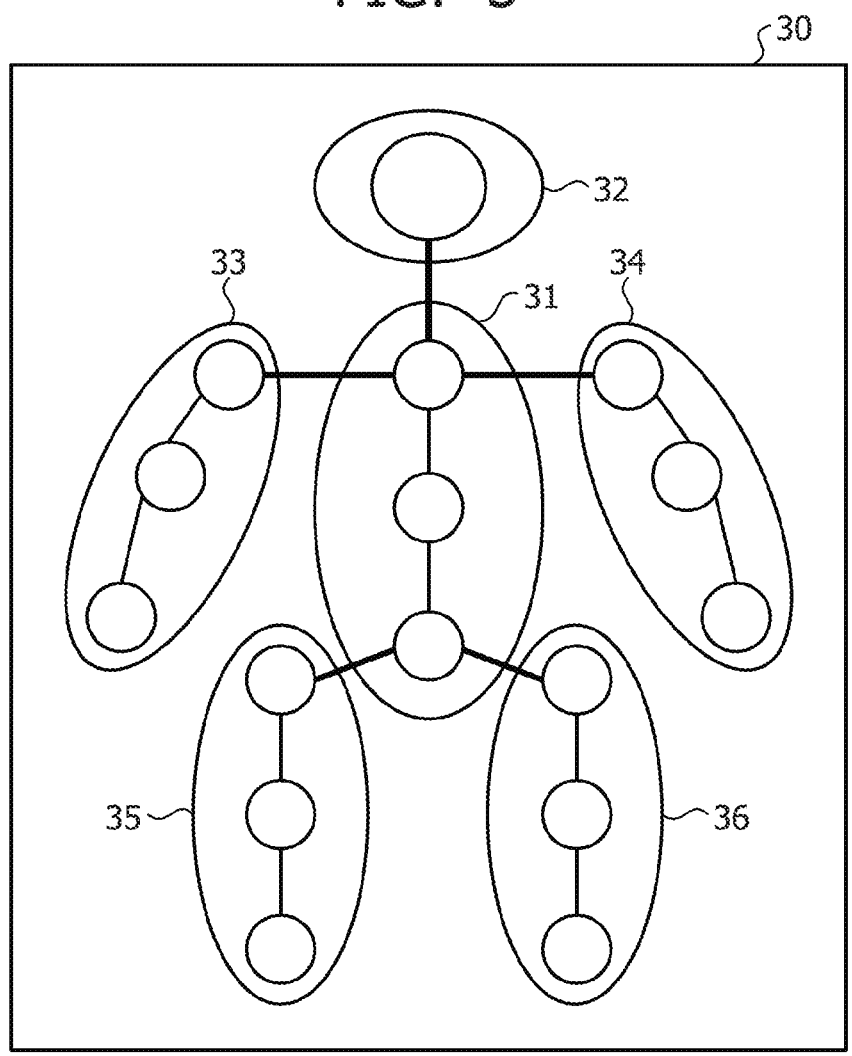
FIG. 5 is a diagram illustrating an example of each area specified by a specification unit of Embodiment 1.

The specification unit 162 is a processing unit that acquires three-dimensional data from the three-dimensional data table 151 and that specifies a first area and a plurality of second areas adjacent to the first area from an area of the subject based on the three-dimensional data. FIG. 5 is a diagram illustrating an example of each area specified by a specification unit of Embodiment 1. As illustrated in FIG. 5, the specification unit 162 specifies a first area 31 and second areas 32, 33, 34, 35, and 36 from an area 30 of the subject. The first area 31 corresponds to the body of the subject. The second area 32 corresponds to the head of the subject. The second area 33 corresponds to the right arm of the subject. The second area 34 corresponds to the left arm of the subject. The second area 35 corresponds to the right leg of the subject. The second area 36 corresponds to the left leg of the subject.

The specification unit 162 also specifies positions of parts included in a plurality of second areas and outputs the specified results to the first estimation unit 163. The specification unit 162 specifies positions of parts included in a plurality of first areas and outputs the specified results to the second estimation unit 164.

When the specification unit 162 specifies the first area 31 and the second areas 32 to 36 and specifies the positions of the parts included in the first area 31 and the second areas 32 to 36, the specification unit 162 executes image thresholding, a thinning process, a feature point extraction process, and a model verification process described later. Note that the processes are examples, and the specification unit 162 may use a discriminator based on machine learning to specify the first area 31 and the second areas 32 to 36 to specify the positions of the parts included in the first area 31 and the second areas 32 to 36.

An example of the image thresholding executed by the specification unit 162 will be described. The specification unit 162 acquires information of observation points existing in a background difference area set in advance among the observation points included in the three-dimensional data. The specification unit 162 focuses on values of the z-axis among the three-dimensional coordinates of the observation points included in the background difference area. The specification unit 162 sets the value of the corresponding two-dimensional coordinates to "1" if the value of the z-axis is equal to or greater than a threshold $Z_{th}$ and sets the value of the corresponding two-dimensional coordinates to "0" if the value of the z-axis is smaller than the threshold $Z_{th}$.

For example, the three-dimensional coordinates of an observation point included in the background difference area are defined as (x1, y2, z1), and the pixel on a binary image corresponding to the observation point is defined as (u1, v2). The specification unit 162 sets the value of the pixel (u1, v2) on the binary image to "1" if "z1" is equal to or greater than the threshold $Z_{th}$. On the other hand, the specification unit 162 sets the value of the pixel (u1, v2) to "0" if "z1" is smaller than the threshold $Z_{th}$. The specification unit 162 repeatedly applies the process to the observation points included in the background difference area to execute the image thresholding to generate the binary image.

Figure 6:
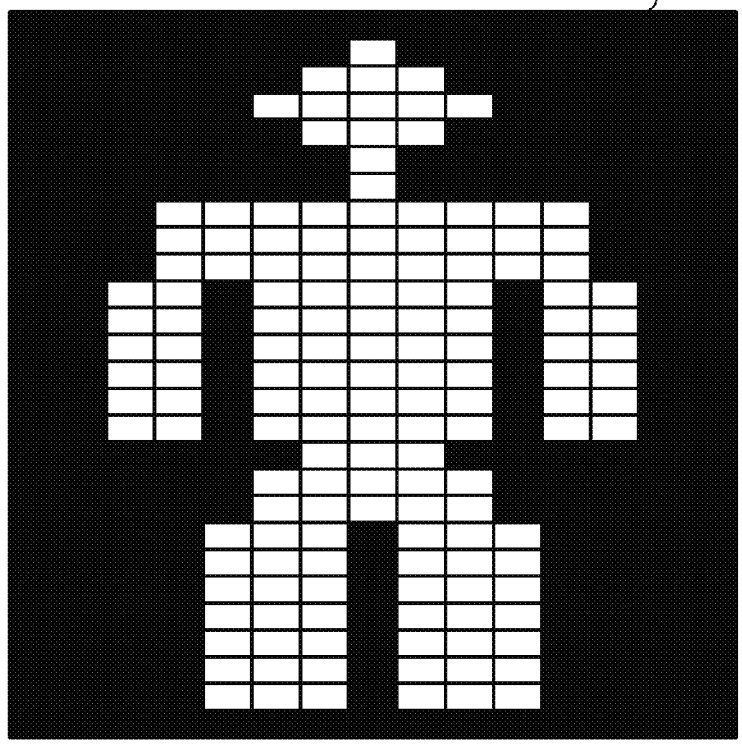
FIG. 6 is a diagram illustrating an example of a binary image.

FIG. 6 is a diagram illustrating an example of a binary image. In a binary image 40a, white areas are areas provided with "0" in the image thresholding and correspond to areas of the subject. Black areas are areas provided with "1" in the image thresholding and correspond to areas other than the subject. Although the values "0" and "1" are used here for the convenience of description, the value "0" may be "0" of the pixel value, and the value "1" may be "255" of the pixel value, for example.

Figure 7:
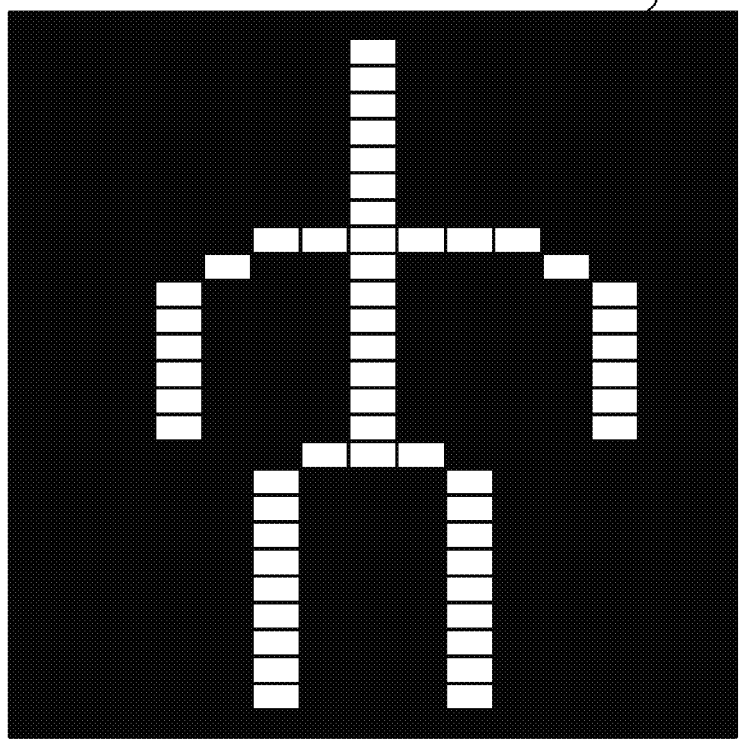
FIG. 7 is a diagram illustrating an example of a thinned image.

An example of the thinning process executed by the specification unit 162 will be described. The specification unit 162 applies the thinning process to the binary image to generate a thinned image. FIG. 7 is a diagram illustrating an example of a thinned image. A thinned image 40b illustrated in FIG. 7 is an image obtained by applying the thinning process to the binary image 40a illustrated in FIG. 6.

The specification unit 162 determines whether or not a partial pattern on the binary image 40a is a removal pattern and changes the value of the area corresponding to the partial pattern to "1" if the partial pattern coincides with the removal pattern. The specification unit 162 repeatedly executes the process while shifting the position of the partial pattern on the binary image 40a to execute the thinning process.

Figure 8:
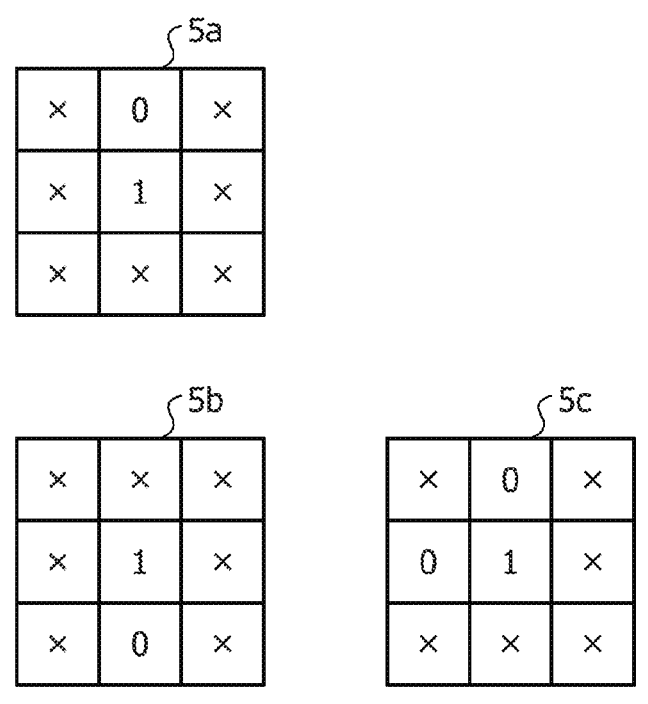

FIG. 8 is a diagram illustrating an example of removal patterns. In the example illustrated in FIG. 8, the removal patterns are removal patterns 5a, 5b, and 5c. For example, the size of the removal pattern is 3×3 pixels, and the size of the partial pattern set on the binary image is 3×3 pixels. However, the example is not limited to this. In the removal pattern, "1" indicates that the value of the corresponding pixel of the partial pattern is "1."

"0" indicates that the value of the corresponding pixel of the partial pattern is "0."

"x" indicates that the value of the corresponding pixel of the partial pattern may be "0" or "1."

Figure 9:
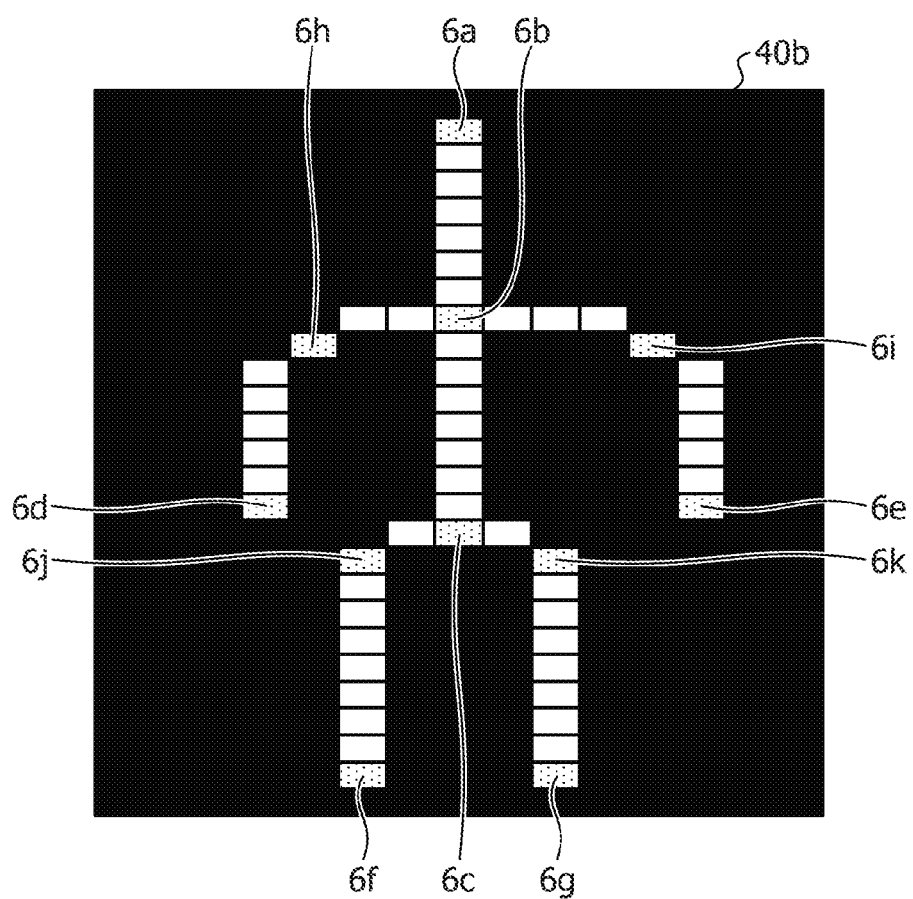
FIG. 9 is a diagram illustrating an example of feature points.

An example of the feature point extraction process executed by the specification unit 162 will be described. The specification unit 162 applies the feature point extraction process to the thinned image to extract feature points from the thinned image. FIG. 9 is a diagram illustrating an example of feature points. In the example illustrated in FIG. 9, an example of extracting feature points 6a to 6k from the thinned image 40b is illustrated. For example, the feature points include the feature points 6a, 6d, 6e, 6f, and 6g corresponding to end points, the feature points 6b and 6c corresponding to intersections, and the feature points 6h, 6i, 6j, and 6k corresponding to corners.

For example, the specification unit 162 extracts the feature points in three approaches. A first approach will be described. The specification unit 162 extracts the end points as the feature points in the areas with value "0" in the thinned image 40b. In the example illustrated in FIG. 9, the points 6a, 6d, 6e, 6f, and 6g are the end points, and the specification unit 162 sets the points 6a, 6d, 6e, 6f, and 6g as the feature points.

A second approach will be described. The specification unit 162 extracts the intersections as the feature points in the areas with value "0" in the thinned image 40b. In the example illustrated in FIG. 9, the points 6b and 6c are the intersections, and the specification unit 162 sets the points 6b and 6c as the feature points.

For example, when the specification unit 162 extracts the feature points of the intersections, the specification unit 162 extracts, as a feature point, a point in which neighboring pixel values include three or more blank areas separated by pixels with value "0."

The blank area is one pixel or a group of pixels in which a plurality of consecutive values are "1."

Figure 10:
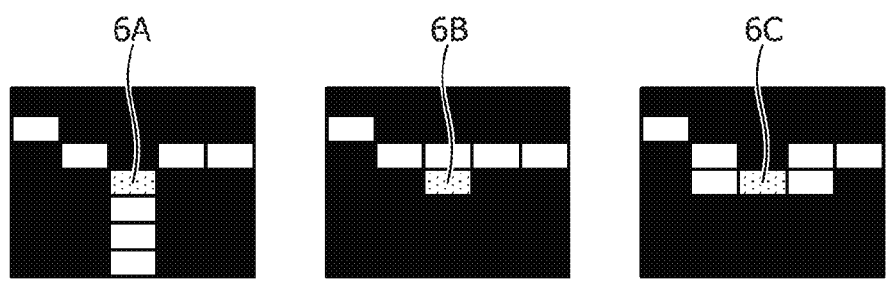
FIG. 10 is a diagram for describing an example of a process of extracting an intersection.

FIG. 10 is a diagram for describing an example of a process of extracting an intersection. In FIG. 10, the specification unit 162 extracts a point 6A as a feature point and does not extract points 6B and 6C as feature points. The reason that the point 6A is the feature point is that there are points with value "0" on the upper left, upper right, and below the point 6A. Each point is separated by points with "1," and there are three blank areas. The reason that the points 6B and 6C are not the intersections is that although three points on the upper left, above, and upper right of the point 6B is 1, there is no point with "1" between the points. The points are continuous, and there is one neighboring blank area. Although the point 6C includes four points with "0," the points on the upper left and the left are continuous, and the points on the upper right and the right are continuous. Therefore, there are two neighboring blank areas, not three or more blank areas.

A third approach will be described. The specification unit 162 extracts, as the feature points, the points of corners in the areas with value "0" in the thinned image 40b. For example, the specification unit 162 applies a corner detection filter to the thinned image 40b to specify the points corresponding to the corners. In the example illustrated in FIG. 9, the points 6h, 6i, 6j, and 6k correspond to the points of the corners.

The specification unit 162 executes the process to extract the feature points 6a to 6k from the thinned image 40b.

The model verification process executed by the specification unit 162 will be described. The specification unit 162 is a processing unit that specifies the parts of the feature points based on the positions of the feature points and the model data 152. For example, the specification unit 162 normalizes the model data 152 to the sizes of the feature points for each model number of the model data 152 and associates the coordinates of the feature points and the coordinates of the parts. The specification unit 162 calculates a total value of differences between the associated coordinates of the feature points and the coordinates of the parts. The normalization is carried out as follows. First, a farthest distance L1 from the center of gravity of the model data to each part and a farthest distance L2 from the center of gravity of the feature points to each feature point are obtained, and the size of the model data is changed such that L1 equals to L2. The center of gravity is average coordinates of the coordinates of the parts in the case of the model data and is average coordinates of the coordinates of the feature points in the case of the feature points. The specification unit 162 associates the feature points and the parts at the closest distance. The specification unit 162 specifies the model number with the smallest total value of the differences between the associated coordinates of the feature points and the coordinates of the parts. The specification unit 162 specifies the parts of the feature points as parts associated for the specified model number.

Figure 11:
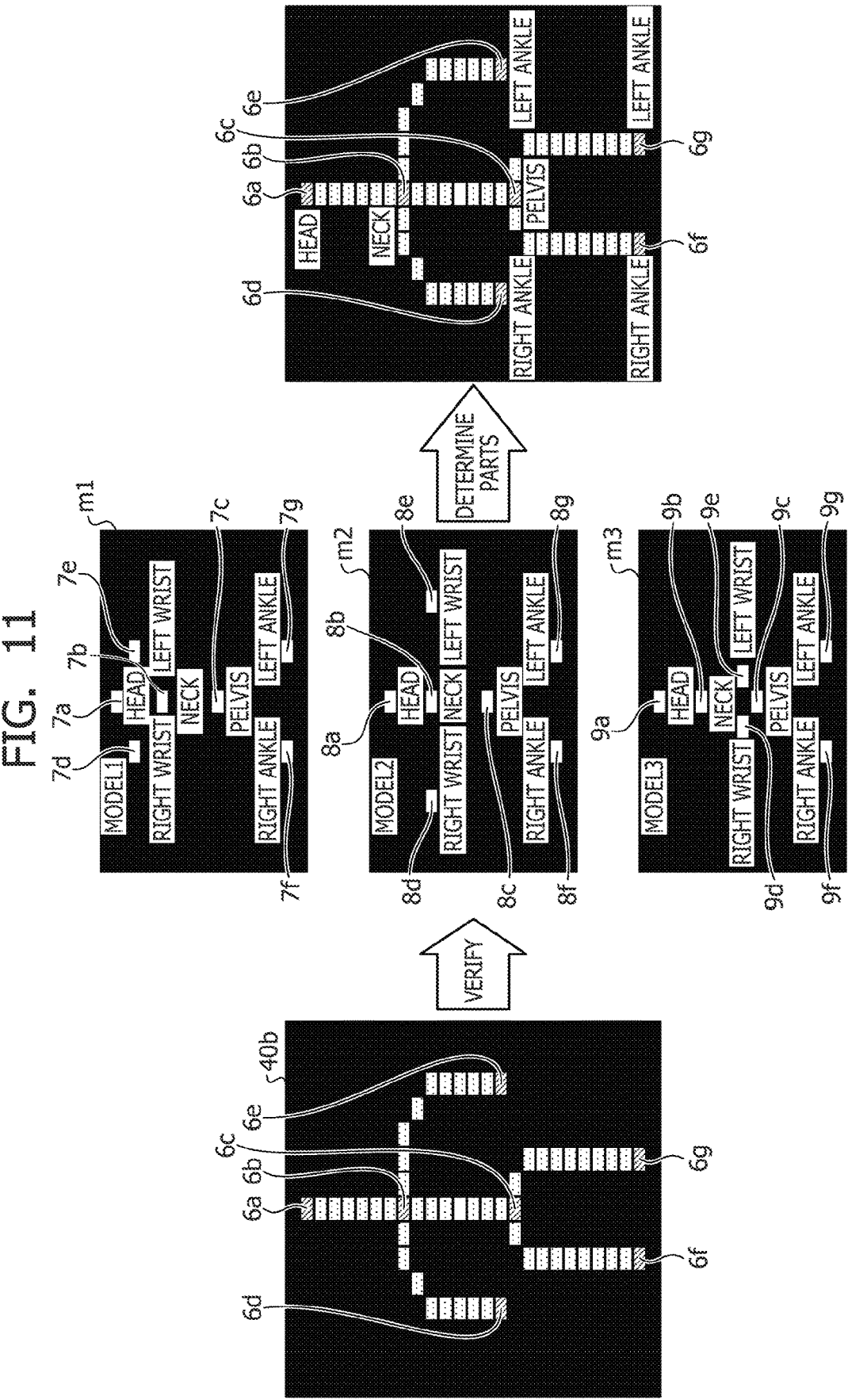
FIG. 11 is a diagram for describing an example of a model verification process.

FIG. 11 is a diagram for describing an example of a model verification process. As illustrated in FIG. 11, it is assumed that the specification unit 162 extracts the feature points 6a to 6g from the thinned image 40b. For the convenience of description, the feature points 6h to 6k will not be described. It is assumed that the model data 152 includes model numbers m1 to m3. Parts 7a, 7b, 7c, 7d, 7e, 7f, and 7g of the model number m1 correspond to the head, the neck, the pelvis, the right wrist, the left wrist, the right ankle, and the left ankle, respectively. Parts 8a, 8b, 8c, 8d, 8e, 8f, and 8g of the model number m2 correspond to the head, the neck, the pelvis, the right wrist, the left wrist, the right ankle, and the left ankle, respectively. Parts 9a, 9b, 9c, 9d, 9e, 9f, and 9g of the model number m1 correspond to the head, the neck, the pelvis, the right wrist, the left wrist, the right ankle, and the left ankle, respectively.

The specification unit 162 associates the feature points 6a to 6g and the parts 7a to 7g of the model m1 so as to minimize the distances between the coordinates of the feature points and the coordinates of the parts and calculates a total value M1 of the differences between the associated coordinates of the feature points and the coordinates of the parts. The specification unit 162 associates the feature points 6a to 6g and the parts 8a to 8g of the model m2 so as to minimize the distances between the coordinates of the feature points and the coordinates of the parts and calculates a total value M2 of the differences between the associated coordinates of the feature points and the coordinates of the parts. The specification unit 162 associates the feature points 6a to 6g and the parts 9a to 9g of the model m3 so as to minimize the distances between the coordinates of the feature points and the coordinates of the parts and calculates a total value M3 of the differences between the associated coordinates of the feature points and the coordinates of the parts.

The specification unit 162 specifies the model m1 when the total value M1 is the smallest among the total values M1 to M3 and specifies the parts of the feature points 6a to 6g based on the correspondence between the parts 7a to 7g of the specified model m1 and the feature points 6a to 6g. In the example illustrated in FIG. 11, the specification unit 162 specifies the feature points 6a to 6g as the head, the neck, the pelvis, the right wrist, the left wrist, the left ankle, and the right ankle, respectively. Although not illustrated in FIG. 11, the specification unit 162 similarly applies the process to the feature points 6h to 6k to specify the parts of the feature points 6h to 6k as the right shoulder, the left shoulder, the right hip joint, and the left hip joint.

Although the specification unit 162 specifies the feature points corresponding to the head, the neck, the left wrist, the right wrist, the pelvis, the left ankle, the right ankle, the right shoulder, the left shoulder, the right hip joint, and the left hip joint in the description above, the feature points are not limited to these. The specification unit 162 may further specify the feature points corresponding to other parts. The other parts correspond to, for example, the spine, the right elbow joint, the left elbow joint, the right knee joint, the left knee joint, and the like. The specification unit 162 may further specify the positions of parts for which the feature points may not be specified from the thinned image. For example, the position of the spine is defined in advance in the model data 152, and the position of the spine is calculated from the positions of the neck and the pelvis specified as feature points in the model specified after the normalization.

The specification unit 162 executes the image thresholding, the thinning process, the feature point extraction process, and the model verification process to output, to the first estimation unit 163, information associating the feature points included in the second areas 32 to 36, the parts corresponding to the feature points, and the three-dimensional coordinates of the feature points. The specification unit 162 also executes the image thresholding, the thinning process, the feature point extraction process, and the model verification process to output, to the second estimation unit 164, position information of the part corresponding to the body part included in the first area 31.

The first estimation unit 163 is a processing unit that sets a link based on the feature points included in the second areas 32 to 36 to estimate the position of the skeleton included in the second areas 32 to 36. For example, the first estimation unit 163 executes a determination process of a cylinder main axis, a determination process of a cylinder radius and a cylinder center, and a link connection process to thereby estimate the position of the skeleton.

The determination process of the cylinder main axis executed by the first estimation processing unit 163 will be described. An example of estimating the position of the skeleton of the second area 34 will be described here. It is assumed that the second area 34 includes the feature point 6i corresponding to the left shoulder, a feature point 6l corresponding to the left elbow joint, and the feature point 6e corresponding to the left wrist.

Figure 12:
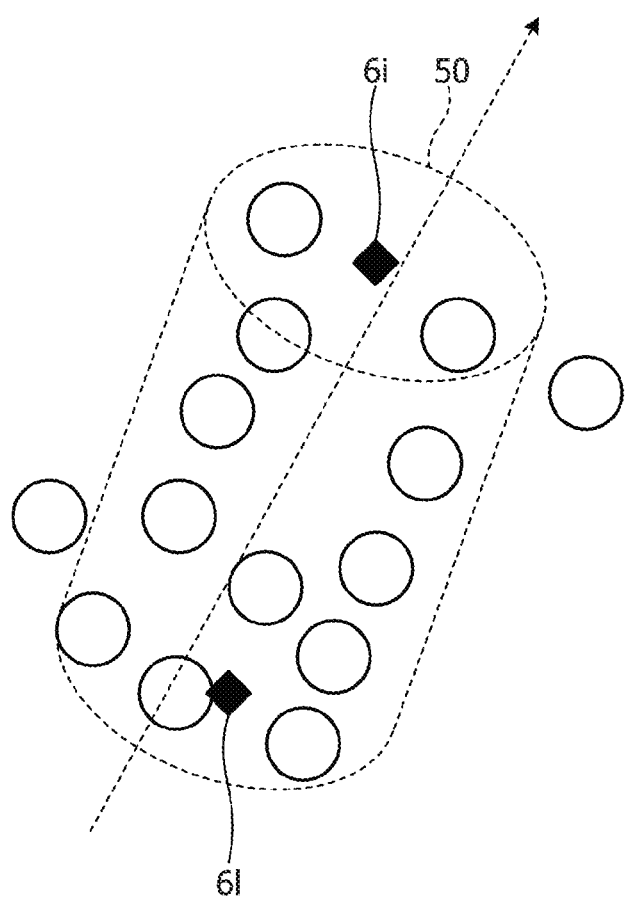
FIG. 12 is a diagram for describing an example of a determination process of a cylinder main axis.

FIG. 12 is a diagram for describing an example of a determination process of a cylinder main axis. In FIG. 12, the feature point 6i indicates a feature point corresponding to the right shoulder, and the feature point 6l indicates a feature point corresponding to the right elbow joint. The first estimation unit 163 sets a cylinder 50 near the feature points 6i and 6l. For example, the height of the cylinder 50 corresponds to the height from the feature point 6l to the feature point 6i. The first estimation unit 163 also acquires, from the three-dimensional data table 151, information of the three-dimensional coordinates of the observation points existing within a given distance from the cylinder 50.

The first estimation unit 163 uses principal component analysis to calculate a slope of the main axis of the cylinder 50. For example, the first estimation unit 163 calculates a covariance matrix $\sigma_{xx}$ from vectors $x_1, x_2, \ldots, x_n$ of the three-dimensional coordinates of the observation points existing between the feature points based on Formula (1). In Formula (1), N corresponds to the number of pieces of data of the observation points. $\langle x \rangle$ is an average of $x_n$ and is defined by Formula (2).

[Expression 1]

$$\sigma_{xx} \equiv \frac{1}{N-1} \sum_{n=1}^{N} (x_n - \langle x \rangle)(x_n - \langle x \rangle)^T \quad (1)$$

[Expression 2]

$$\langle x \rangle = \frac{1}{N} \sum_{n=1}^{N} x_n \quad (2)$$

The first estimation unit 163 calculates the covariance matrix a and calculates eigenvectors $e_1$, $e_2$, and $e_3$ of the covariance matrix $\sigma_{xx}$. The first estimation unit 163 specifies, as the direction of the cylinder 50, the direction of the eigenvector belonging to the maximum eigenvalue among the eigenvectors $e_1$, $e_2$, and $e_3$. The direction of the cylinder 50 corresponds to the slope of the main axis of the cylinder 50. The first estimation unit 163 also applies the process to the sets of other feature points included in the second areas to calculate the slope of the main axis of the cylinder.

Figure 13:
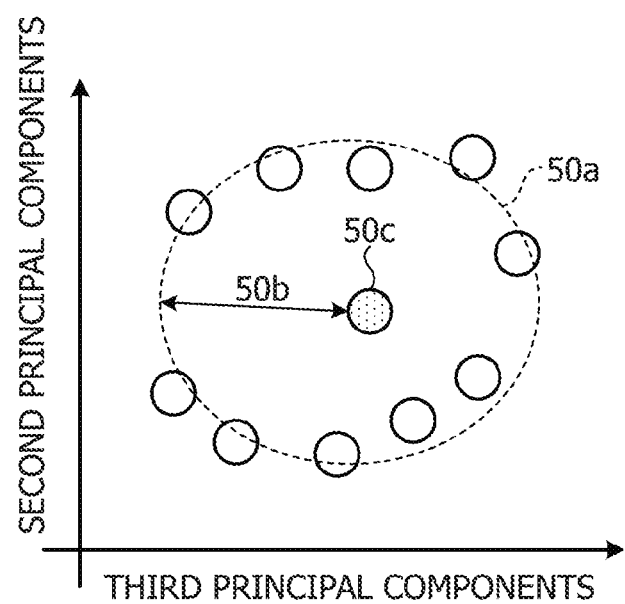
FIG. 13 is a diagram for describing an example of a determination process of a cylinder radius and a cylinder center.

The determination process of the cylinder radius and the cylinder center executed by the first estimation unit 163 will be described. FIG. 13 is a diagram for describing an example of a determination process of a cylinder radius and a cylinder center. In FIG. 13, the vertical axis is an axis corresponding to second principal components, and the horizontal axis is an axis corresponding to third principal components. The second principal components correspond to the eigenvector belonging to the second largest eigenvalue among the eigenvectors $e_1$, $e_2$, and $e_3$ of the covariance matrix $\sigma_{xx}$. The third principal components correspond to the eigenvector belonging to the third largest eigenvalue among the eigenvectors $e_1$, $e_2$, and $e_3$ of the covariance matrix $\sigma_{xx}$.

The first estimation unit 163 projects the observation points existing within the given distance from the cylinder 50 to the plane of the second and third principal components and uses a least-squares method or the like to specify a cylinder radius 50*b* and a cylinder center 50*c* so as to minimize the error between a circle (ellipse) 50*a* of the cylinder 50 and each of the projected observation points. The first estimation unit 163 also applies the process to the other feature points included in the second areas to specify the cylinder radius and the cylinder center.

Figure 14:
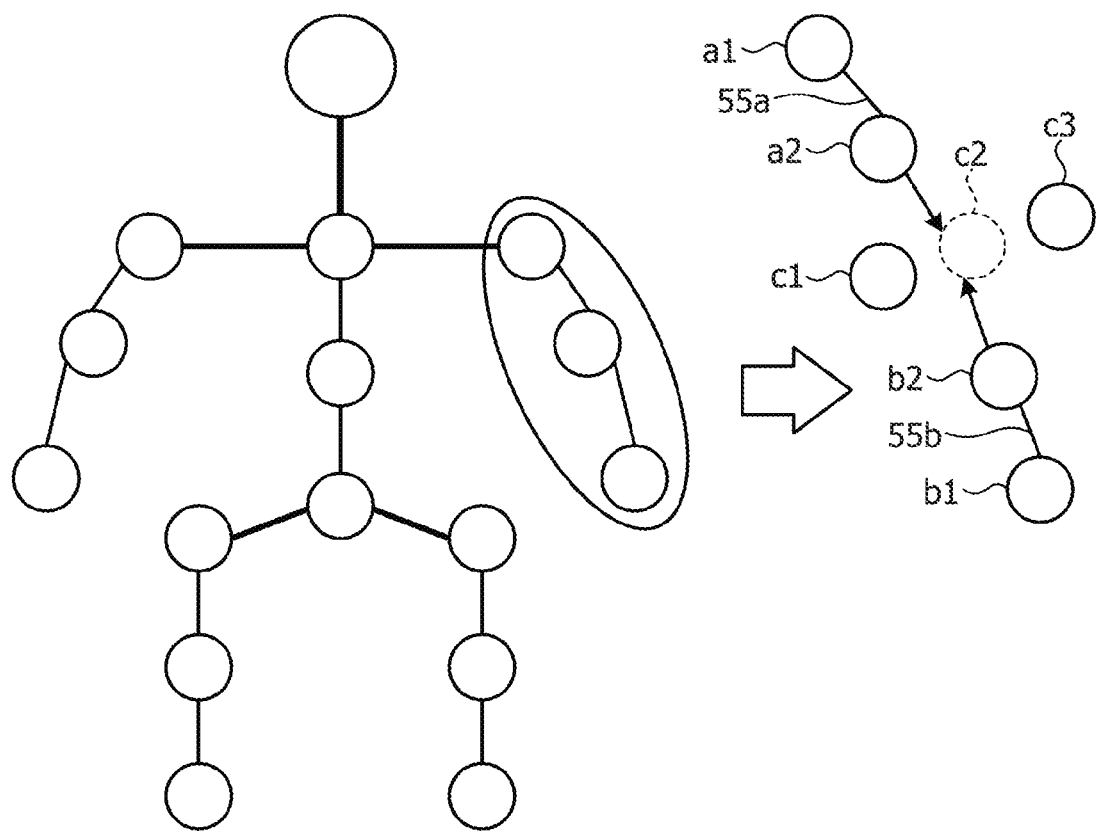
FIG. 14 is a diagram for describing an example of a link connection process.

The link connection process executed by the first estimation unit 163 will be described. For example, the links correspond to the axes of the cylinders calculated in the determination process of the cylinder main axis and in the determination process of the cylinder radius and the cylinder center. FIG. 14 is a diagram for describing an example of a link connection process. In the example illustrated in FIG. 14, the link of a cylinder is defined as a link 55*a*, and the link of another cylinder is defined as a link 55*b*. An upper end point of the link 55*a* is defined as an end point a1, and a lower end point of the link 55*a* is defined as an end point a2.

An upper end point of the link 55*b* is defined as an end point b1 and a lower end point of the link 55*b* is defined as an end point b2.

The first estimation unit 163 sets a plurality of connection point candidates and adjusts the slopes of the links 55*a* and 55*b* such that the extension of the link passes through each connection point candidate. The first estimation unit 163 specifies, from the plurality of connection points, the connection point candidate with the smallest total value of the change in the slope of the link 55*a* and the change in the slope of the link 55*b*.

For example, the first estimation unit 163 sets a plurality of connection point candidates c1 to c3 in the example illustrated in FIG. 14. The first estimation unit 163 adjusts the slopes of the links 55*a* and 55*b* such that the extensions of the links pass through each connection point candidate. For example, the total value of the change in the slope of the link 55*a* and the change in the slope of the link 55*b* when the connection point is the connection point c1 is defined as c1. The total value of the change in the slope of the link 55*a* and the change in the slope of the link 55*b* when the connection point is the connection point c2 is defined as c2. For example, the total value of the change in the slope of the link 55*a* and the change in the slope of the link 55*b* when the connection point is the connection point c3 is defined as c3.

The first estimation unit 163 adjusts the slopes of the links 55*a* and 55*b* to set the connection point to c2 if the value c2 is the smallest among the values c1 to c3. The first estimation unit 163 also applies the process to the other links included in the other second areas to specify the connection points to adjust the slope of each link. The first estimation unit 163 further adjusts the length of the link to couple the link to the connection point. The first estimation unit 163 estimates that a group of the links coupled by the connection points is the position of the skeleton included in the second area.

The first estimation unit 163 executes the process to estimate the positions of the skeletons corresponding to the second areas 33 to 36 and outputs the information of the position of each skeleton to the second estimation unit 164 and the output unit 165.

For each angle parameter, the second estimation unit 164 uses fixed end points of the skeletons included in the second areas 33 to 36 and fixed lengths from the end points of the skeletons to the positions of the parts included in the first area 31 to estimate the positions of a plurality of parts of the first area 31. The second estimation unit 164 compares sets of a plurality of parts corresponding to the angle parameters and approximate coordinates of a plurality of parts of the first area 31 and estimates that the set of a plurality of parts closest to the approximate coordinates is the parts of the first area 31. The second estimation unit 164 uses the links to couple the estimated parts of the first area 31 and estimates that the parts coupled by the links are the positions of the skeleton included in the first area 31.

Figure 15:
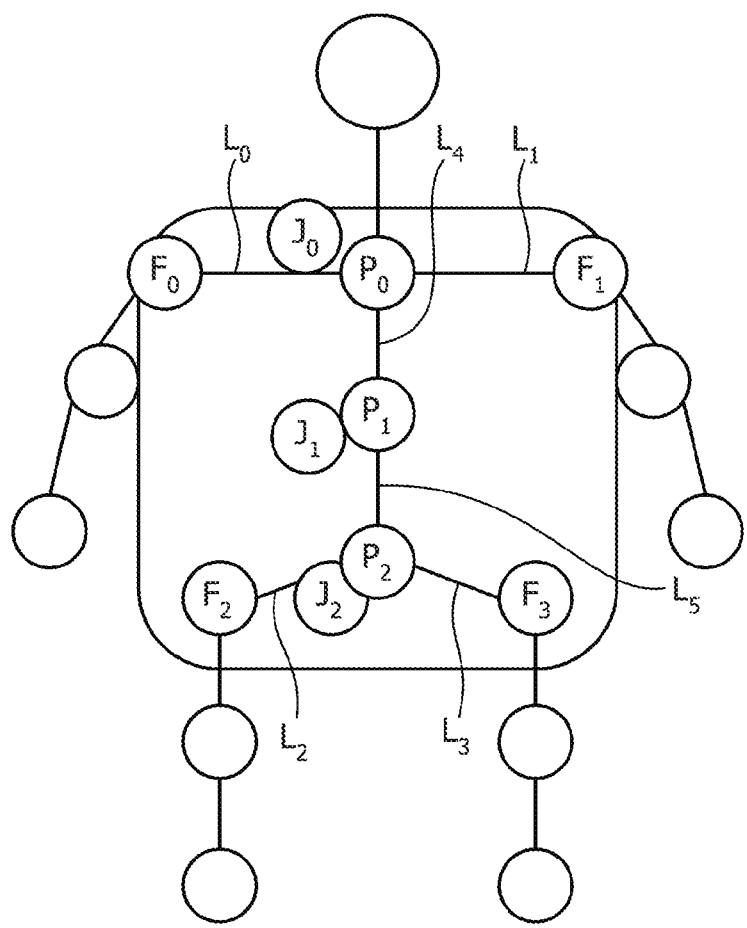
FIG. 15 is a diagram for describing an example of a process of a second estimation unit according to Embodiment 1.

FIG. 15 is a diagram for describing an example of a process of a second estimation unit according to Embodiment 1. In FIG. 15, $F_0$ is a point corresponding to the right shoulder. The point corresponding to the right shoulder corresponds to the point at the upper end of the skeleton included in the second area 33. $F_1$ is a point corresponding to the left shoulder. The point corresponding to the left shoulder corresponds to the point at the upper end of the skeleton included in the second area 34. $F_2$ is a point corresponding to the right hip joint. The point corresponding to the right hip joint corresponds to the point at the upper end of the skeleton included in the second area 35. $F_3$ is a point corresponding to the left hip joint. The point corresponding to the left hip joint corresponds to the point at the upper end of the skeleton included in the second area 36.

The second estimation unit 164 uses fixed three-dimensional coordinates of $F_0$ to $F_3$ and fixed lengths $L_0$ to $L_5$ of the links and uses an angle parameter θ to estimate body estimation coordinates $P_0$, $P_1$, and $P_2$. The second estimation unit 164 associates body approximate coordinates $J_0$, $J_1$, and $J_2$ corresponding to the body parts among the part coordinates specified in the model verification process by the specification unit 162 and the estimated body estimation coordinates $P_0$, $P_1$, and $P_2$, respectively, and calculates a distance total value D of the associated points. For example, the distance total value D is defined by Formula (3).

[Expression 3]

$$D = \Sigma_{i=0}^{n} |P_i J_i| \tag{3}$$

The second estimation unit 164 changes the angle parameter θ within a given range and calculates the total value for each of the changed angle parameter. The second estimation unit 164 specifies, as parts of the first area 31, the body estimation coordinates $P_0$, $P_1$, and $P_2$ with the smallest total value among the calculated total values. The second estimation unit 164 uses the links to connect the estimated parts and estimates it as the skeleton included in the first area 31. Instead of using the part coordinates specified by the specification unit 162 in the model verification process, the second estimation unit 164 may use the calculated body estimation coordinates $P_0$, $P_1$, and $P_2$ to update the body approximate coordinates $J_0$, $J_1$, and $J_2$ for the process of the next frame.

Figure 16:
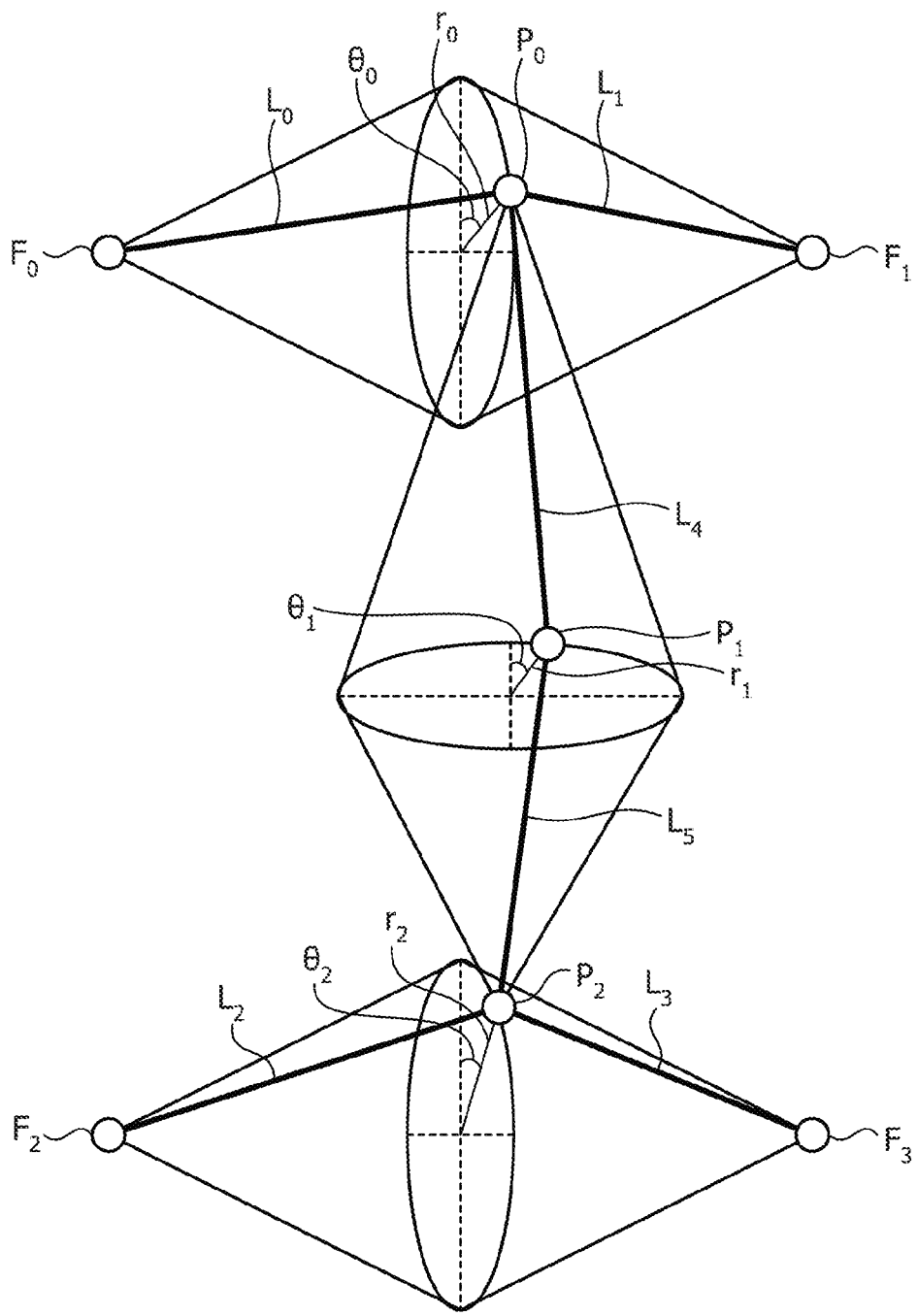
FIG. 16 is a diagram (1) for describing an example of a process of estimating body estimation coordinates.
Figure 17:
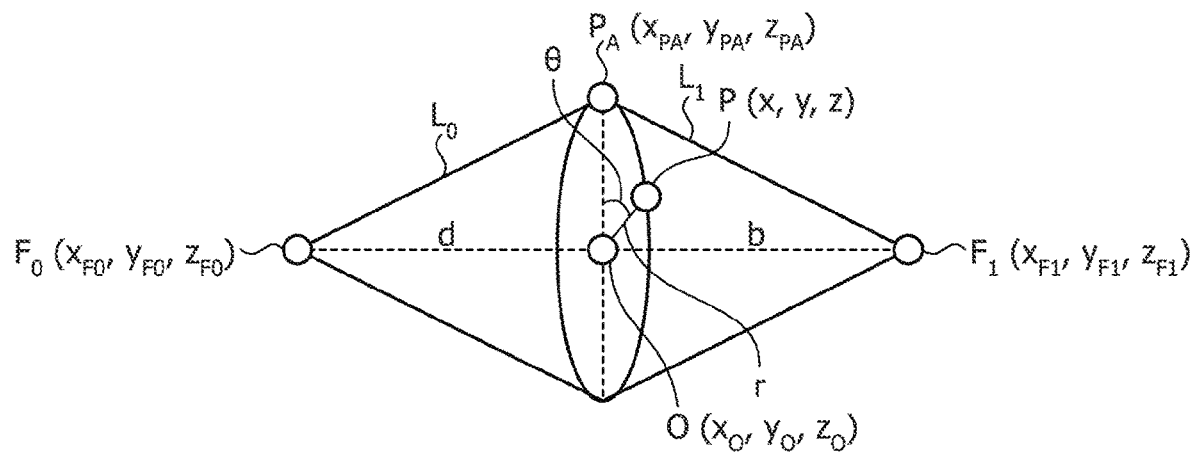
FIG. 17 is a diagram (2) for describing an example of a process of estimating body estimation coordinates.

Next, an example of the process of estimating the body estimation coordinates $P_0$, $P_1$, and $P_2$ of the first area 31 executed by the second estimation unit 164 will be described. FIGS. 16 and 17 are diagrams for describing an example of a process of estimating body estimation coordinates. $F_0$ to $F_3$ illustrated in FIG. 16 correspond to $F_0$ to $F_3$ described in FIG. 15. $L_0$ to $L_5$ illustrated in FIG. 16 correspond to $L_0$ to $L_5$ described in FIG. 15.

In FIG. 16, the lengths $L_0$ and $L_1$ of the bones from the left and right shoulder coordinates $F_0$ and $F_1$ to the neck coordinates $P_0$ are fixed, and the neck coordinates $P_0$ are points on the circumference determined by a radius $r_0$, $θ_0$. Similarly, the lengths $L_2$ and $L_3$ of the bones from the left and right hip joint coordinates $F_2$ and $F_3$ to the pelvis coordinates $P_2$ are fixed, and the pelvis coordinates $P_0$ are points on the circumference determined by a radius $r_2$, $θ_2$. The neck coordinates $P_0$ and the pelvis coordinates $P_2$ are determined by $θ_0$ and $θ_2$.

The length between the neck coordinates $P_0$ and the spine coordinates $P_1$ is fixed at $L_4$. The length between the pelvis coordinates $P_2$ and the spine coordinates $P_1$ is fixed at $L_5$. Therefore, once the neck coordinates $P_0$ and the pelvis coordinates $P_2$ are determined by $θ_θ$ and $θ_2$, the spine coordinates $P_1$ are points on the circumference determined by the radius $r_1$, $θ_1$. The second estimation unit 164 calculates the distance total value D while changing the angle parameters.

Next, an example of coordinate calculation of P determined by θ will be described with reference to FIG. 17.

The second estimation unit 164 uses $F_0$, $F_1$, $L_0$, and $L_1$ to calculate coordinates $(x_0, y_0, z_0)$ of O based on Formula (4). Here, the coordinates of $F_0$ will be defined as $(x_{F0}, y_{F0}, z_{F0})$, and the coordinates of $F_1$ will be defined as $(x_{F1}, y_{F1}, z_{F1})$. In addition, the lengths of $L_0$ and $L_1$ are equal.

[Expression 4]

$$O(x_0, y_0, z_0) = \left( \frac{x_{F0}+x_{F1}}{2}, \frac{y_{F0}+y_{F1}}{2}, \frac{z_{F0}+z_{F1}}{2} \right) \tag{4}$$

The second estimation unit 164 calculates the length of b based on Formula (5). The second estimation unit 164 also calculates a radius r based on Formula (6).

[Expression 5]

$$b = |OF_1| \tag{5}$$

[Expression 6]

$$r = \sqrt{L_1^2 - b^2} \tag{6}$$

The second estimation unit 164 sets, as $P_A$, a point at the distance r from O on a straight line obtained by orthogonal projection of a straight line passing through O and parallel to the y-axis, to a plane passing through O and perpendicular to $F_0F_1$. The second estimation unit 164 sets a point at the distance r from O on the straight line as $P_A$. The second estimation unit 164 sets vectors of OP, $OP_A$, and $OF_1$ as illustrated in Formula (7).

[Expression 7]

$$OP(x_{OP}, y_{OP}, z_{OP}), OP_A(x_{OPA}, y_{OPA}, z_{OPA}), OF_1(x_{OF1}, y_{OF1}, z_{OF1}) \tag{7}$$

The second estimation unit 164 defines Formula (8) based on a relationship of $OP \perp OF_1$.

[Expression 8]

$$OP \cdot OF_1 = x_{OP} x_{OF1} + y_{OP} y_{OF1} + z_{OP} z_{OF1} = 0 \tag{8}$$

The second estimation unit 164 defines Formula (9) based on a relationship of an inner product of $OP_A$ and OP.

[Expression 9]

$$OP \cdot OP_A = x_{OP} x_{OPA} + y_{OP} y_{OPA} + z_{OP} z_{OPA} = |OP||OP_A| \cos θ = r^2 \cos θ \tag{9}$$

The second estimation unit 164 defines Formula (10) based on a cross product of $OP_A$ and OP.

[Expression 10]

$$|OP \times OP_A| = \sqrt{\begin{array}{l}(y_{OP} z_{OPA} - z_{OP} y_{OPA})^2 + \\ (z_{OP} x_{OPA} - x_{OP} z_{OPA})^2 + \\ (x_{OP} y_{OPA} - y_{OP} x_{OPA})^2\end{array}}$$
$$= |OP||OP_A| \sin θ$$
$$= r^2 \sin θ \tag{10}$$

The second estimation unit 164 uses Formulas (5), (6), (7), and (8) to calculate coordinates (x, y, z) of $P_0$. The second estimation unit 164 similarly calculates the coordinates of $P_2$.

The second estimation unit 164 executes the process to calculate the coordinates of the neck $P_0$, the spine $P_1$, and the pelvis $P_2$ of the skeleton included in the first area 31. The second estimation unit 164 outputs the information of the calculated coordinates of the neck $P_0$, the spine $P_1$, and the pelvis $P_2$ to the output unit 165.

The output unit 165 is a processing unit that acquires information of recognition results of the skeleton included in the first area 31 and the second areas 32 and 33 from the first estimation unit 163 and the second estimation unit 164 and that outputs the acquired information. For example, the information of the recognition results of the skeleton corresponds to the coordinates of the head, the neck, the spine, the pelvis, the left wrist, the right wrist, the hip joint, the left ankle, the right ankle, the right shoulder, the left shoulder, the right hip joint, the left hip joint, the right elbow joint, the left elbow joint, the right knee joint, and the left knee joint.

The output unit 165 may associate the information of the recognition results of the skeleton and the three-dimensional data acquired from the 3D sensor 110 and output the information and the data. For example, the second estimation unit 164 outputs the three-dimensional data and the information of the recognition results of the skeleton side-by-side in a format of (x, y, z, d) where d is a drawing color. For the drawing color d, the color corresponding to the numeric value of d is defined in advance. The output unit 165 may also display the information of the recognition results of the skeleton on the display unit 140 according to the information of the recognition results of the skeleton.

The specification unit 162, the first estimation unit 163, and the second estimation unit 164 repeatedly execute the process for each given frame to generate recognition results of the skeleton corresponding to given frames. The output unit 165 sequentially stores the recognition results of the skeleton in the skeleton data table 153 in association with the identification numbers.

Figure 18:
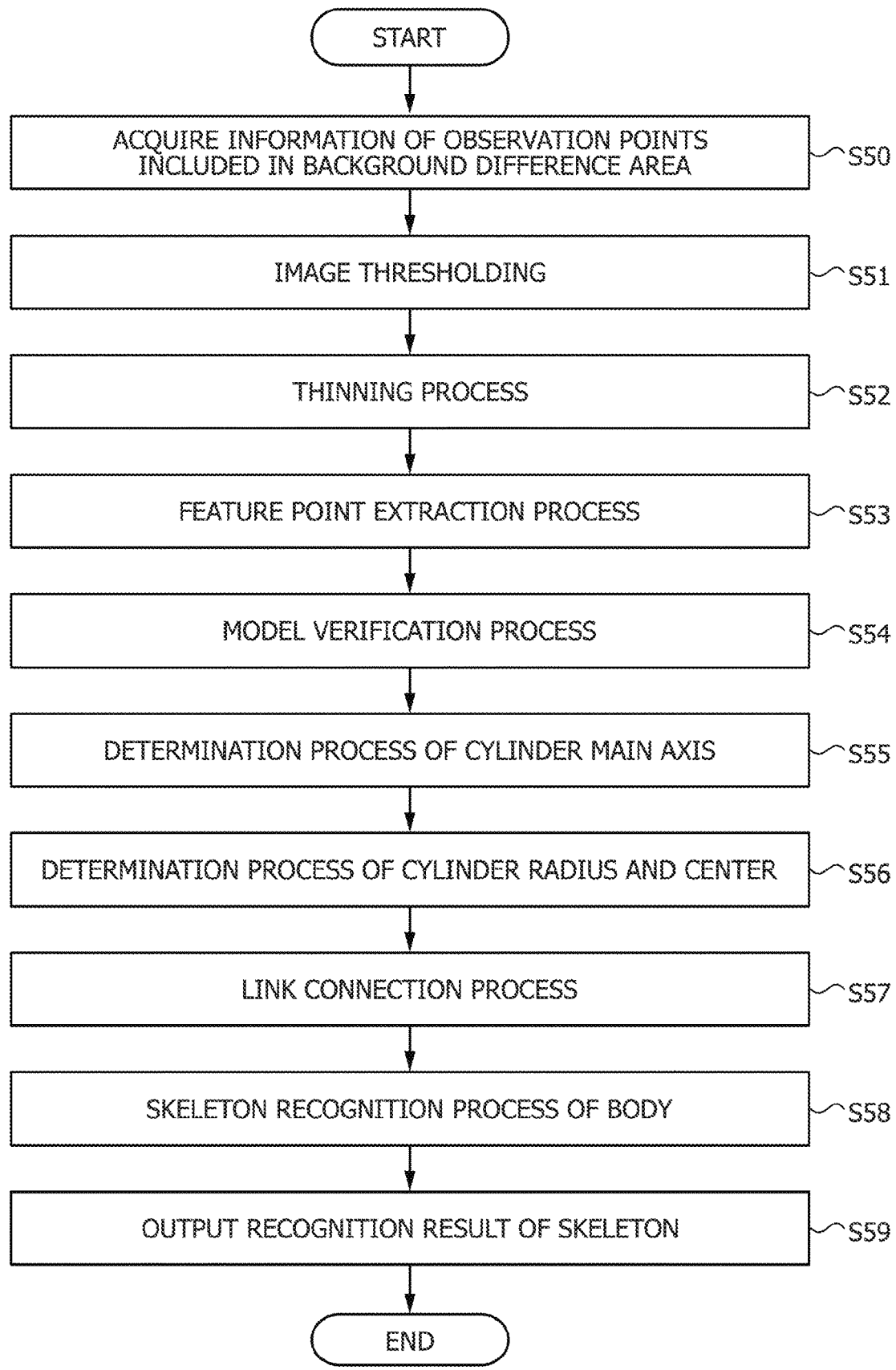
FIG. 18 is a flow chart illustrating a processing procedure of a skeleton estimation device according to Embodiment 1.

Next, an example of a processing procedure of the skeleton estimation device 100 according to Embodiment 1 will be described. FIG. 18 is a flow chart illustrating a processing procedure of a skeleton estimation device according to Embodiment 1. As illustrated in FIG. 18, the specification unit 162 of the skeleton estimation device 100 acquires the information of the observation points included in the background difference area (step S50).

The specification unit 162 executes the image thresholding (step S51). The specification unit 162 executes the thinning process (step S52). The specification unit 162 executes the feature point extraction process (step S53). The specification unit 162 executes the model verification process (step S54).

The first estimation unit 163 of the skeleton estimation device 100 executes the determination process of the cylinder main axis (step S55). The first estimation unit 163 executes the determination process of the cylinder radius and the cylinder center (step S56). The first estimation unit 163 executes the link connection process (step S57). The second estimation unit 164 of the skeleton estimation device 100 executes the skeleton recognition process of the body (step S58). The output unit 165 of the skeleton estimation device 100 outputs the recognition results of the skeleton (step S59).

Figure 19A:
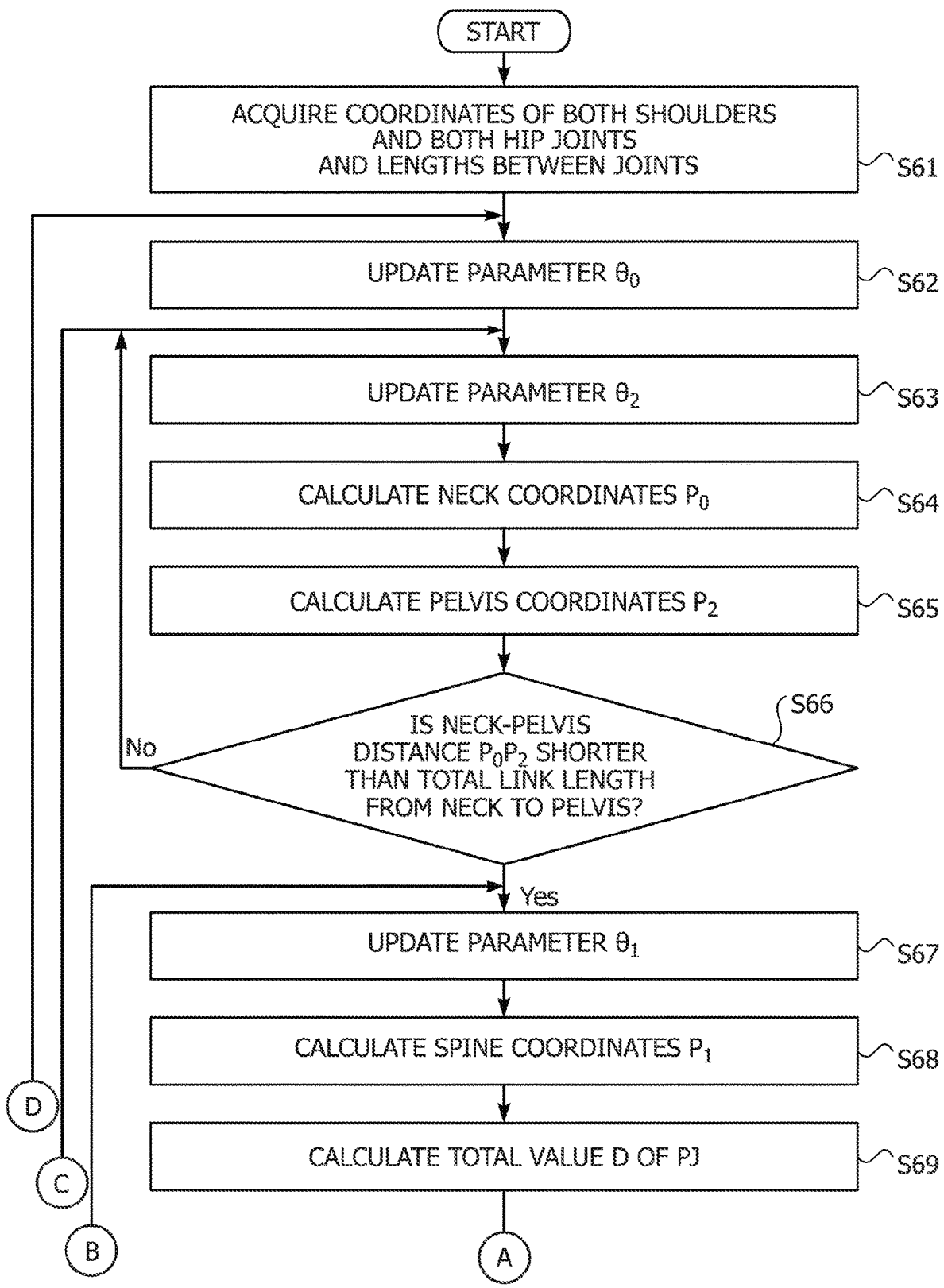

Next, a processing procedure of the skeleton recognition process of the body illustrated in step S58 of FIG. 18 will be described. FIGS. 19A and 19B depict flow chart illustrating a processing procedure of a skeleton recognition process of a body. As illustrated in FIGS. 19A and 19B, the second estimation unit 164 of the skeleton estimation device 100 acquires the coordinates of both shoulders and both hip joints and the lengths between the joints (step S61).

The second estimation unit 164 updates the parameter $\theta_0$ (step S62) and updates the parameter $\theta_2$ (step S63). The second estimation unit 164 calculates the neck coordinates $P_0$ (step S64) and calculates the pelvis coordinates $P_2$ (step S65). The second estimation unit 164 determines whether or not the neck-pelvis distance $P_0P_2$ is shorter than the total link length from the neck to the pelvis (step S66).

The second estimation unit 164 moves to step S63 if the neck-pelvis distance $P_0P_2$ is not shorter than the total link length from the neck to the pelvis (step S66, No). On the other hand, the second estimation unit 164 moves to step S67 if the neck-pelvis distance $P_0P_2$ is shorter than the total link length from the neck to the pelvis (step S66, Yes).

The second estimation unit 164 updates the parameter $\theta_1$ (step S67). The second estimation unit 164 calculates the spine coordinates $P_1$ (step S68). The second estimation unit 164 calculates the distance total value D of PJ (step S69).

The second estimation unit 164 determines whether or not the distance total value D is the minimum (step S70). The second estimation unit 164 moves to step S72 if the distance total value D is not the minimum (step S70, No). On the other hand, the second estimation unit 164 moves to step S71 if the distance total value D is the minimum (step S70, Yes).

The second estimation unit 164 saves each $\theta$ (step S71). For example, $\theta$ with the minimum distance total value D is defined as $\theta_{min}=(\theta_0, \theta_1, \theta_2)$.

The second estimation unit 164 determines whether or not the selection of all $\theta_1$ is completed (step S72). The second estimation unit 164 moves to step S67 if the selection of all $\theta_1$ is not completed (step S72, No). The second estimation unit 164 moves to step S73 if the selection of all $\theta_1$ is completed (step S72, Yes).

The second estimation unit 164 determines whether or not the selection of all $\theta_2$ is completed (step S73). The second estimation unit 164 moves to step S63 if the selection of all $\theta_2$ is not completed (step S73, No). The second estimation unit 164 moves to step S74 if the selection of all $\theta_2$ is completed (step S73, Yes).

The second estimation unit 164 determines whether or not the selection of all $\theta_0$ is completed (step S74). The second estimation unit 164 moves to step S62 if the selection of all $\theta_0$ is not completed (step S74, No). The second estimation unit 164 moves to step S75 if the selection of all $\theta_0$ is completed (step S74, Yes).

The second estimation unit 164 uses $\theta_{min}$ to calculate the coordinates of the neck $P_0$, the spine $P_1$, and the pelvis $P_2$ (step S75). The second estimation unit 164 outputs the coordinates of the neck $P_0$, the spine $P_1$, and the pelvis $P_2$ (step S76).

Next, advantageous effects of the skeleton estimation device 100 according to Embodiment 1 will be described. The skeleton estimation device 100 roughly specifies the areas of the head, both arms, the body, and both legs of the subject, and after recognizing the positions of the skeletons of both arms and both legs, uses the recognition results of the positions of the skeletons of both arms and both legs as constraint conditions to recognize the skeleton of the body. As a result, the skeleton of the subject may be accurately recognized at a high speed.

For example, the skeleton estimation device 100 uses fixed coordinates of the skeletons of both arms and both legs and fixed lengths between the joints. The skeleton estimation device 100 changes the angle parameter to calculate a plurality of candidates for the position of the skeleton of the body. The skeleton estimation device 100 estimates that the candidate close to the body approximate coordinates among the candidates for the positions of the skeleton of the body is the position of the skeleton of the body. The positions of the skeletons of both arms and both legs allow to accurately estimate the positions of the skeletons at a high speed compared to the body. Therefore, the positions of the skeletons of both arms and both legs may be obtained first, and the positions may be used as constraint conditions in calculating the body. In this way, the amount of calculation may be reduced in calculating the position of the skeleton of the body, and the accuracy of calculation may be improved.

Note that the second estimation unit 164 may adjust the lengths between the joints according to the scale of the subject when using fixed coordinates of the skeletons of both arms and both legs and fixed lengths between the joints and changing the angle parameter to calculate the plurality of candidates for the position of the skeleton of the body. The execution of the process allows more accurate recognition of the skeleton of the subject.

Figure 20:
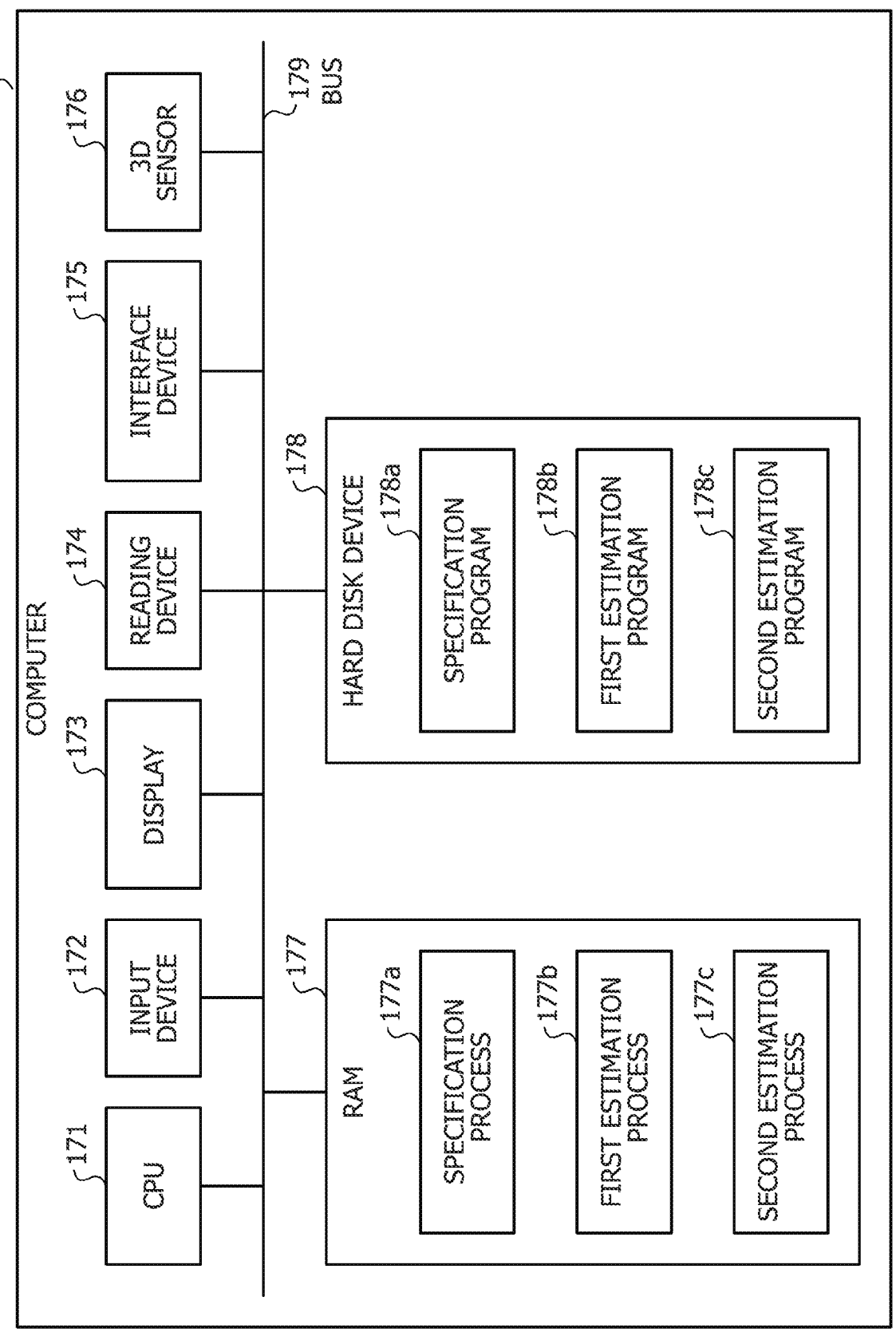
FIG. 20 is a diagram illustrating an example of a hardware configuration of a skeleton estimation device.

Next, an example of a hardware configuration of the skeleton estimation device 100 illustrated in Embodiment described above will be described. FIG. 20 is a diagram illustrating an example of a hardware configuration of a skeleton estimation device.

As illustrated in FIG. 20, a computer 170 includes a CPU 171 that executes various types of arithmetic processing, an input device 172 that receives an input of data from the user, and a display 173. The computer 170 also includes a reading device 174 that reads a program or the like from a storage medium and an interface device 175 that transmits and receives data to and from another computer through a network. The computer 170 includes a 3D sensor 176. The computer 170 also includes a RAM 177 that temporarily stores various types of information and a hard disk device 178. The devices 171 to 178 are coupled to a bus 179.

The hard disk device 178 includes a specification program 178a, a first estimation program 178b, and a second estimation program 178c. The CPU 171 reads and expands the programs 178a to 178c to the RAM 177. The specification program 178a functions as a specification process 177a. The first estimation program 178b functions as a first estimation process 177b. The second estimation program 178c functions as a second estimation process 177c.

For example, the process of the specification process 177a corresponds to the process of the specification unit 162. The process of the first estimation process 177b corresponds to the process of the first estimation unit 163. The process of the second estimation process 177c corresponds to the process of the second estimation unit 164.

Note that the programs 178a to 178c may not be stored in the hard disk device 178 from the beginning. The programs are stored in advance in a "portable physical medium," such as a flexible disk (FD), a CD-ROM (Compact Disc Read Only Memory), a DVD (Digital Versatile Disc) disk, a magneto-optical disk, and an IC (Integrated Circuit) card, inserted into the computer 170. Then, the computer 170 may read the programs 178a to 178c from the medium to execute the programs 178a to 178c.

Embodiment 2

Embodiment 2 of a skill determination device using the skeleton estimation device 100 described in Embodiment 1 will be described. The skill determination device is a device that extracts motion data of the user based on the recognition results of the skeleton of the user to determine the skill of the user.

Figure 21:
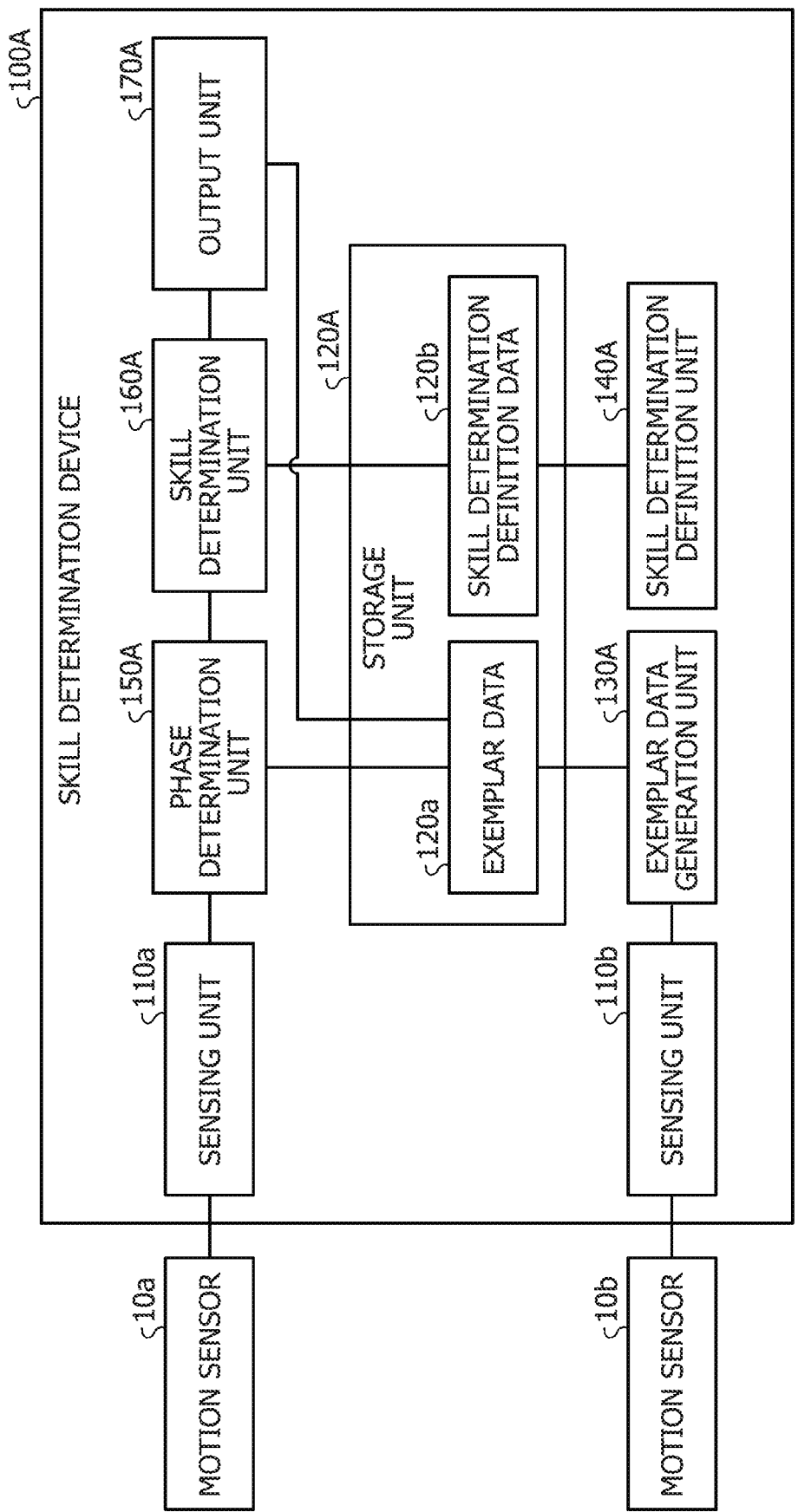
FIG. 21 is a functional block diagram illustrating a configuration of a skill determination device according to Embodiment 2.

A configuration of the skill determination device according to Embodiment 2 will be described. FIG. 21 is a functional block diagram illustrating a configuration of a skill determination device according to Embodiment 2. As illustrated in FIG. 21, a skill determination device 100A is coupled to motion sensors 10a and 10b. The skill determination device 100A includes sensing units 110a and 110b, a storage unit 120A, an exemplar data generation unit 130A, a skill determination definition unit 140A, a phase determination unit 150A, a skill determination unit 160A, and an output unit 170A.

The motion sensors 10a and 10b will be collectively referred to as motion sensors 10 as necessary. The motion sensor 10 is a sensor that detects a movement of a person or a thing. For example, the motion sensor 10 detects three-dimensional coordinates of feature points of a person and outputs sensing information associating the feature points and the three-dimensional coordinates to the skill determination device 100A. The feature points of the person here correspond to, for example, the head, the neck, the back, the waist, and other joint parts of the person. For example, the motion sensors 10a and 10b have the configuration of the skeleton estimation device 100 described in Embodiment 1.

The motion sensor 10 may use any related art to output the sensing information. For example, the motion sensor 10 corresponds to a reflective MA motion sensor and a photo thermal sensor. Alternatively, a 3-axis acceleration sensor or a 3-axis gyro sensor may be attached to the person to extract the sensing information.

The sensing unit 110a is a processing unit that acquires, from the motion sensor 10, sensing information of a user instructed by an expert. In the following description, the user instructed by the expert will be simply referred to as a user. The sensing unit 110a consecutively acquires the sensing information as frame data from the motion sensor 10 and outputs the frame data to the phase determination unit 150A.

Figure 22:
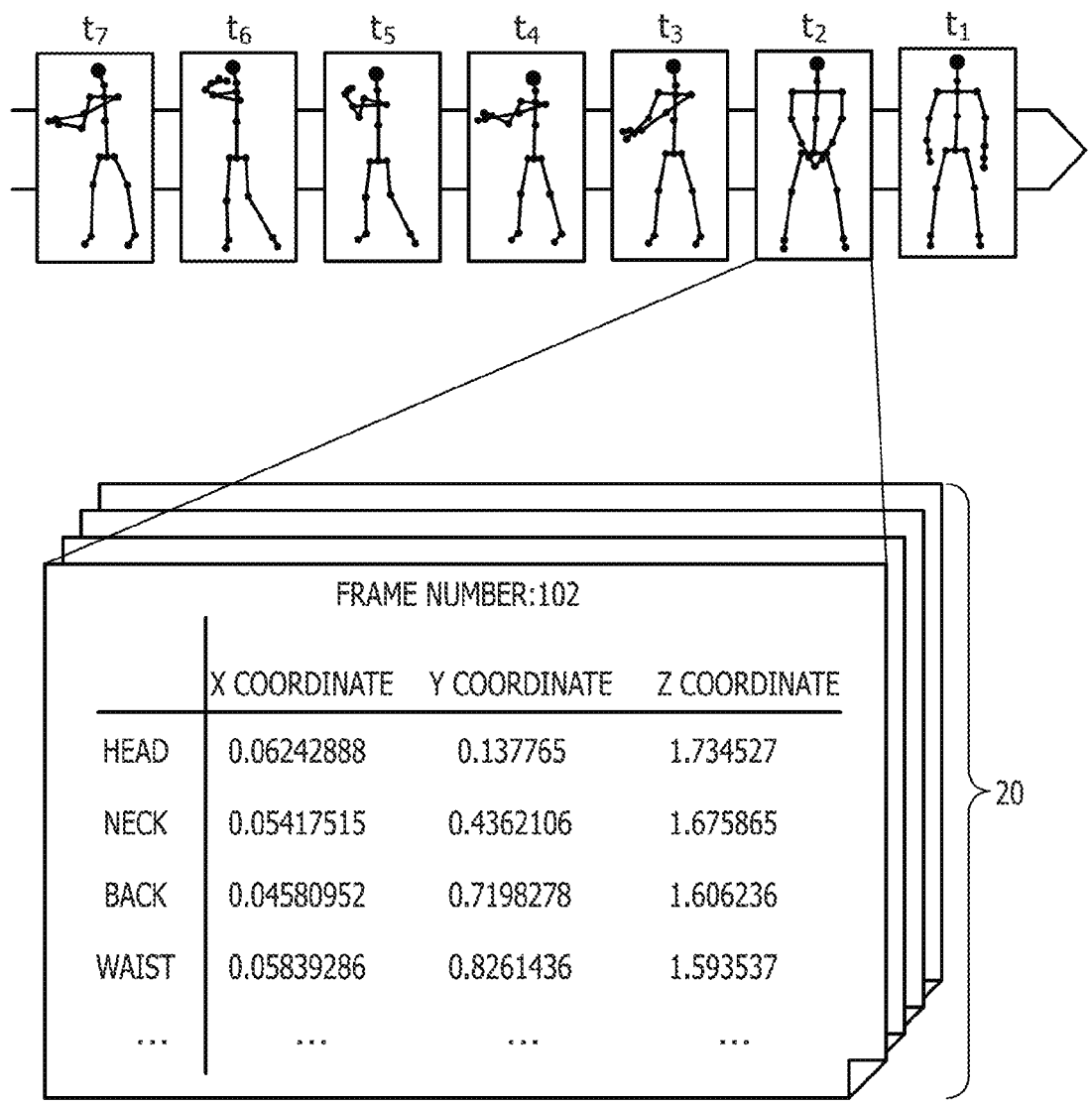
FIG. 22 is a diagram illustrating an example of a data structure of frame data.

FIG. 22 is a diagram illustrating an example of a data structure of frame data. As illustrated in FIG. 22, the frame data is consecutively acquired by the sensing unit 110a and output to the phase determination unit 150A. Each piece of the frame data is associated with a frame number. Although not illustrated, the pieces of frame data are associated with time information and output to the phase determination unit 150A in chronological order. For example, frame data 20 with frame number "102" indicates the three-dimensional coordinates of the feature points of the user detected by the motion sensor 10 at time "t2."

The sensing unit 110b is a processing unit that acquires sensing information of an expert from the motion sensor 10. The sensing unit 110b consecutively acquires the sensing information as frame data from the motion sensor 10 and outputs the frame data to the exemplar data generation unit 130A. The data structure of the frame data of the expert is the same as the data structure of the frame data illustrated in FIG. 22.

Hereinafter, the frame data included in the motion data of the expert will be referred to as first frame data for the convenience of description. The fame data included in the motion data of the user will be referred to as second frame data.

The storage unit 120A includes exemplar data 120a and skill determination definition data 120b. The storage unit 120A corresponds to a semiconductor memory device, such as a RAM (Random Access Memory) and a flash memory (Flash Memory), or a storage device, such as an HDD (Hard Disk Drive).

The exemplar data 120a is information associating the first frame data and the type of phase of the first frame data. The exemplar data 120a corresponds to phase definition information. Examples of the type of phase include "start," "backswing," "top," "impact," "follow," and "end."

The exemplar data 120a is generated by the exemplar data generation unit 130A described later.

Figure 23:
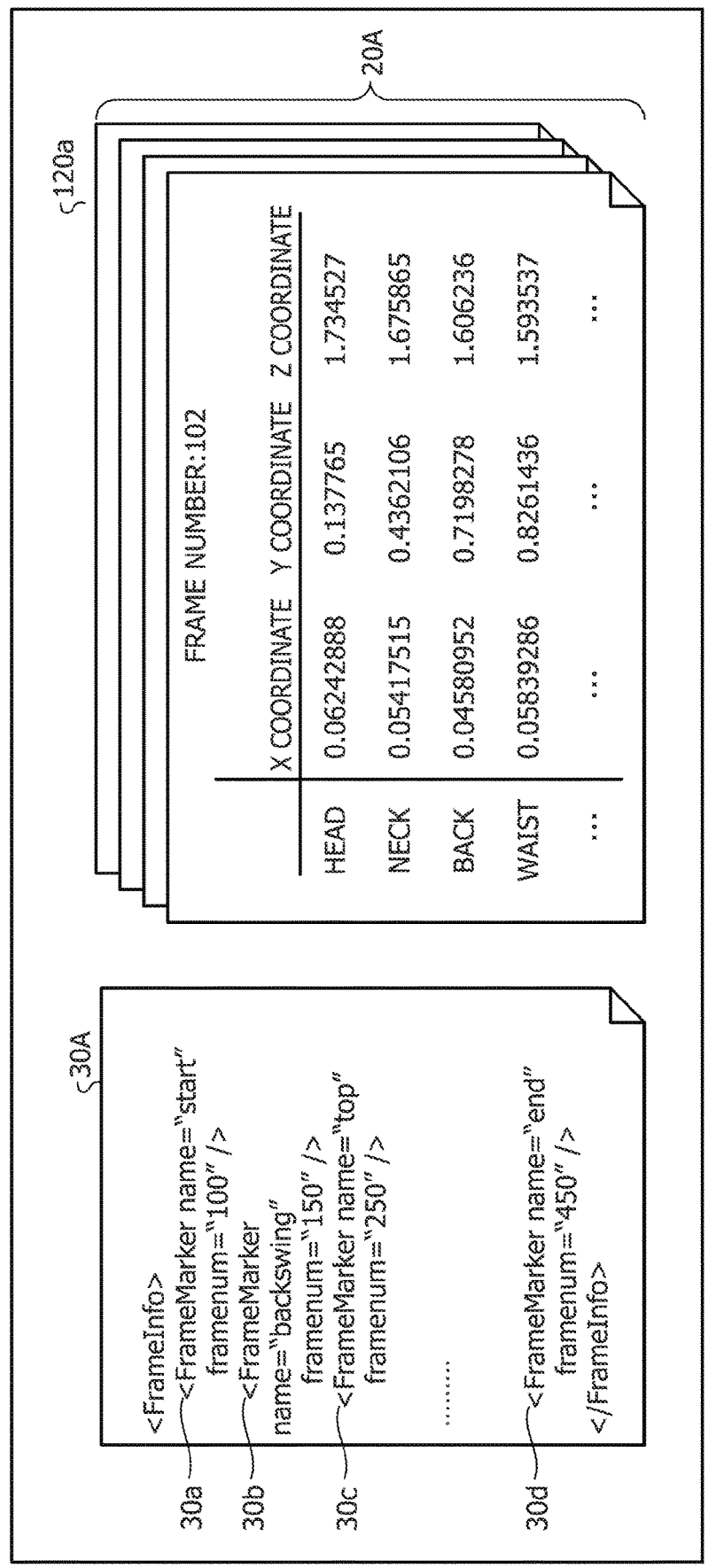
FIG. 23 is a diagram illustrating an example of a data structure of exemplar data.

FIG. 23 is a diagram illustrating an example of a data structure of exemplar data. As illustrated in FIG. 23, the exemplar data 120a includes metadata 30A and motion data 20A. The metadata 30A is information associating the frame number of the first frame data and the type of phase. The motion data 20A illustrated in FIG. 23 includes a plurality of pieces of first frame data.

In the metadata 30A of FIG. 23, an area 30a defines that the type of frame of the first frame data with frame number "100" is "start."

An area 30b defines that the type of frame of the first frame data with frame number "150" is "backswing."

An area 30c defines that the type of frame of the first frame data with frame number "250" is "top."

An area 30d defines that the type of frame of the first frame data with frame number "450" is "end."

The skill determination definition data 120b is information associating and defining feature values of actions of the user derived from the feature points included in a plurality of pieces of second frame data, determination standards of the skill, and types of phase to be determined.

Figure 25:
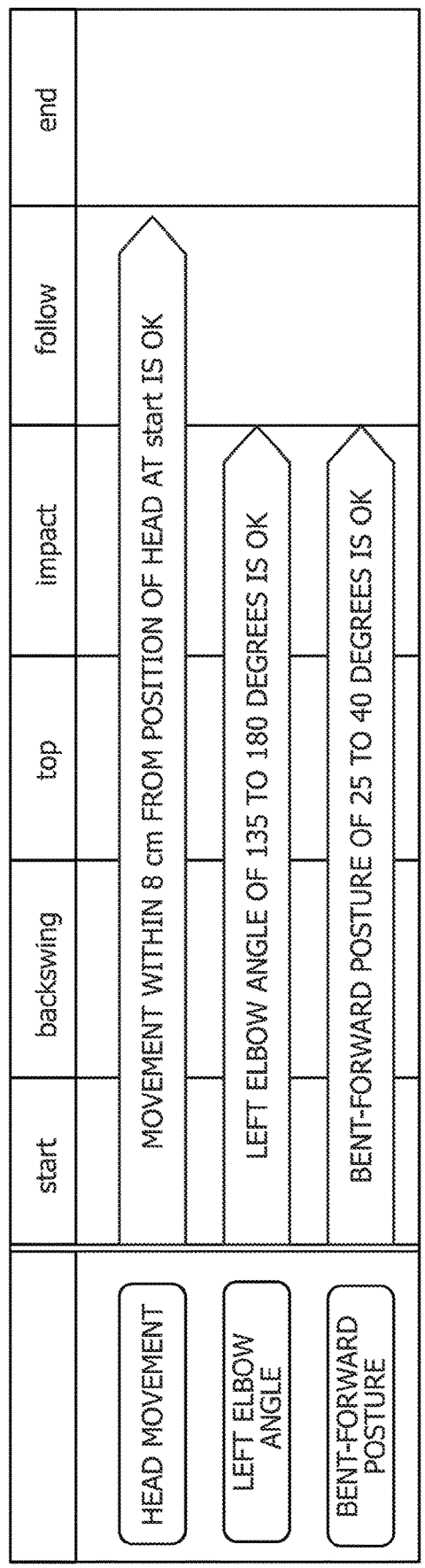
FIG. 25 is a diagram for supplementary description of skill determination definition data.

FIG. 24 is a diagram illustrating an example of a data structure of skill determination definition data. FIG. 25 is a diagram for supplementary description of skill determination definition data. As illustrated in FIG. 24, the skill determination definition data 120b associates module names, skill determination names, and parameter definitions. The module names are module names used by the skill determination unit 160A described later to determine the skills. The skill determination names define determination names of the skills. The parameter definitions include target phases, comparison positions, and standard parameters. The skills here indicate, for example, a series of actions, postures, and angles of joints during a golf swing or the like of an expert. For example, the skill determination name "head movement" defines a skill of the head movement of the expert during the swing. The determination standard of the skill is based on the series of actions, the postures, and the angles of joints of the expert, and an evaluation is made based on how much the series of actions, the postures, and the angles of joints of the user vary from those of the expert. For example, a set of the target phases, the comparison positions, and the standard parameters corresponds to the determination standard of the skill. The process of determining the skill based on the determination standard of the skill will be described later.

The target phases are information for specifying the types of phase as determination targets of the skill. The comparison positions are information for defining the type of second frame data to be compared and the positions of the feature points. The standard parameters and the standard values are numeric values used to determine whether the skill is good or bad.

A record with module name "PositionChecker" and skill determination name "head movement" in FIG. 24 will be described. The skill determination of the "head movement" determines whether the head movement of the user is good or bad during a swing of a driver in golf. The target phases are "start-follow," and the types of second phase to be determined are "start, backswing, top, impact, follow" as illustrated in FIG. 25.

The comparison positions are "start: head, current: head."

The body part recognition method will be described. In the body part recognition method, a distance image is input, and a discriminator learned by using a random forest method is used to label each pixel. The center of gravity of the label equivalent to a joint position is then used to directly estimate joint coordinates in the body part recognition method. Therefore, the positions of the feature points of the comparison source are positions of feature points of the head of the first second frame data of the second frame data with the type of phase "strat."

The positions of the feature points of the comparison destination are positions of feature points of the head in the current second frame data.

The standard parameters are "8, 10, 20."

It is defined that the determination result is "Excellent" when the difference between the positions of the feature points to be compared is "smaller than 8 cm."

It is defined that the determination result is "Good" when the difference between the positions of the feature points to be compared is "equal to or greater than 8 cm and smaller than 10 cm."

It is defined that the determination result is "Bad" when the difference between the positions of the feature points to be compared is "equal to or greater than 10 cm and smaller than 20 cm."

Next, a record with module name "AngleChecker (1)" and skill determination name "left elbow angle" will be described. The skill determination of the "left elbow angle" determines whether the left elbow angle of the user is good or bad during the swing of the driver. The target phases are "start-impact."

The types of second phase to be determined are "start, backswing, top, impact" as illustrated in FIG. 25.

The comparison positions are "current: left shoulder, current: left elbow, current: left wrist."

Therefore, the determination target is an angle formed by a line segment passing through the feature point of the left shoulder and the feature point of the left elbow of the current second frame data and a straight line passing through the feature point of the left elbow and the feature point of the left wrist.

The standard parameters are "(135-180), (130-135, 180-190), (110-130, 190-200)."

It is defined that the determination result is "Excellent" when the formed angle is included in "135-180."

It is defined that the determination result is "Good" when the formed angle is included in "130-135, 180-190."

It is defined that the determination result is "Bad" when the formed angle is included in "110-130, 190-200."

Next, a record with module name "AngleChecker (2)" and skill determination name "bent-forward posture" will be described. The skill determination of "bent-forward posture" determines whether the bent-forward posture of the user is good or bad during the swing of the driver. The target phases are "start-impact."

The types of second phase to be determined are "start, backswing, top, impact" as illustrated in FIG. 25.

The comparison positions are "current: head, current: waist."

Therefore, the determination target is an angle formed by a line segment passing through the feature point of the head and the feature point of the waist of the current second frame data and a perpendicular line.

The standard parameters are "(25-40), (20-25, 40-55), (8-20, 55-60)."

It is defined that the determination result is "Excellent" when the formed angle is included in "25-40."

It is defined that the determination result is "Good" when the formed angle is "20-25, 40-55."

It is defined that the determination result is "Bad" when the formed angle is "8-20, 55-60."

FIG. 21 will be described again. The exemplar data generation unit 130A is a processing unit that acquires the motion data of the expert from the sensing unit 110b to generate the exemplar data 120a. The exemplar data generation unit 130A saves the generated exemplar data 120a in the storage unit 120A.

For example, the exemplar data generation unit 130 causes a display device to display the first frame data included in the motion data of the expert and receives, from an input device, the type of phase that the first frame data corresponds to. The display device and the input device are not illustrated here.

The expert operates the input device to input the relationship between the first frame data and the type of phase to the exemplar data generation unit 130A. The exemplar data generation unit 130A associates the frame number of the first frame data and the type of phase based on the information received from the input device to generate the metadata 30A illustrated in FIG. 23. The exemplar data generation unit 130A saves the exemplar data 120a including the metadata 30A and the motion data 20A in the storage unit 120A.

The skill determination definition unit 140A is a processing unit that generates the skill determination definition data 120b. The skill determination definition unit 140A saves the generated skill determination definition data 120b in the storage unit 120A.

For example, the skill determination definition unit 140A causes the display device to display a setting screen of the skill determination definition and receives information regarding the skill determination definition from the input device. The expert operates the input device to input information regarding the skill determination definition. The skill determination definition unit 140A generates the skill determination definition data 120b based on the information regarding the skill determination definition and saves the skill determination definition data 120b in the storage unit 120A.

Figure 26:
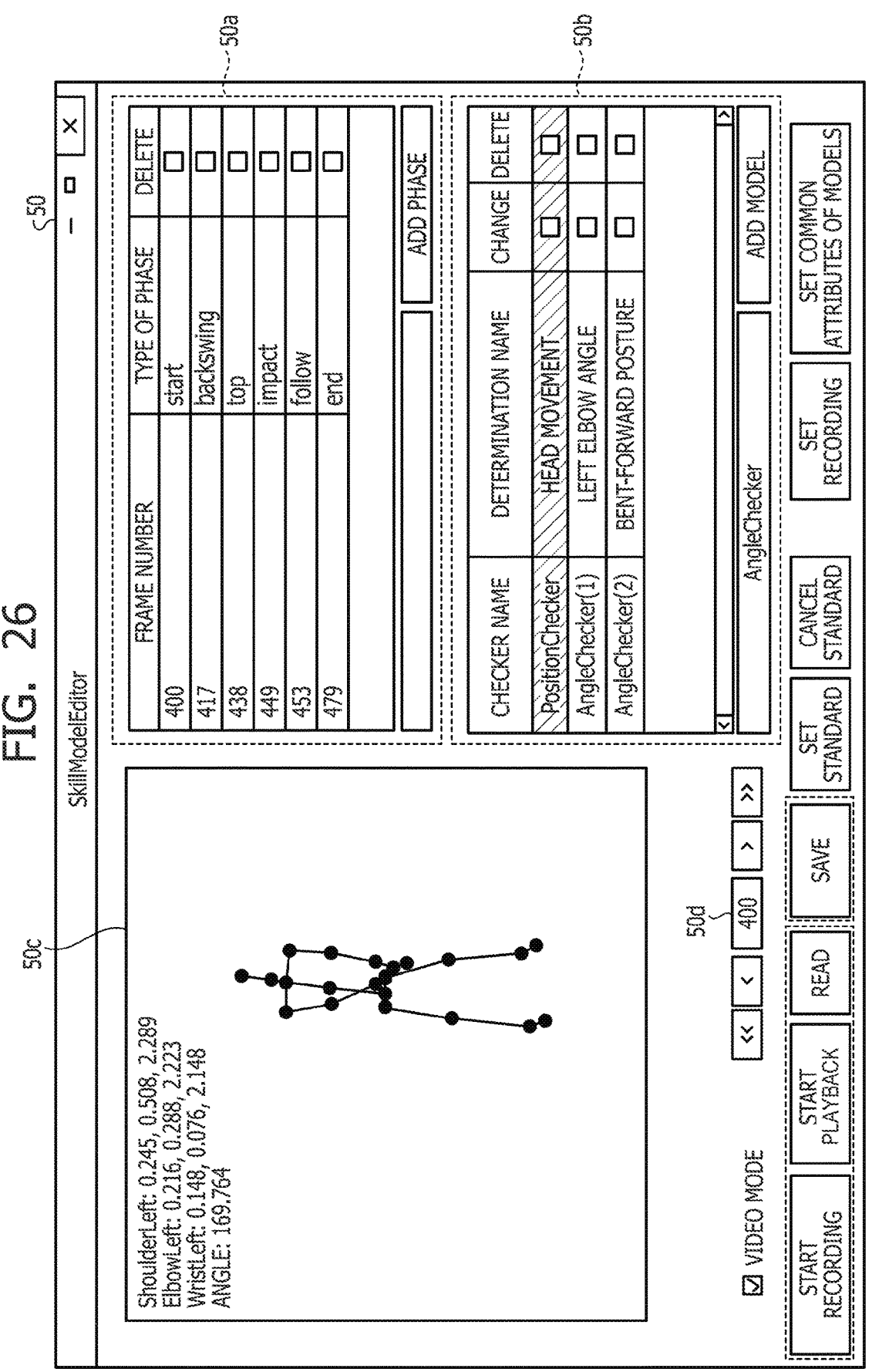
FIG. 26 is a diagram illustrating an example of a display screen displayed on a display device.

FIG. 26 is a diagram illustrating an example of a display screen displayed on a display device. The display screen 50 includes a phase setting screen 50a displayed by the exemplar data generation unit 130A and a skill setting screen 50b displayed by the skill determination definition unit 140A. The display screen 50 may also display a playback screen 50c that displays the motion data of the expert and a frame number display screen 50d of the current first frame data.

The expert operates the input device and refers to the playback screen 50c and the frame number display screen 50d to input the correspondence between the frame number and the type of phase to the phase setting screen 50a. For example, the exemplar data generation unit 130A generates the exemplar data 120a based on the information input to the phase setting screen 50a.

The expert operates the input device to select one of the checker names of the skill setting screen 50b. In the following description, examples of parameter setting screens displayed when "PositionChecker," "AngleChecker (1)," and "AngleChecker (2)" are selected will be described.

Figure 27:
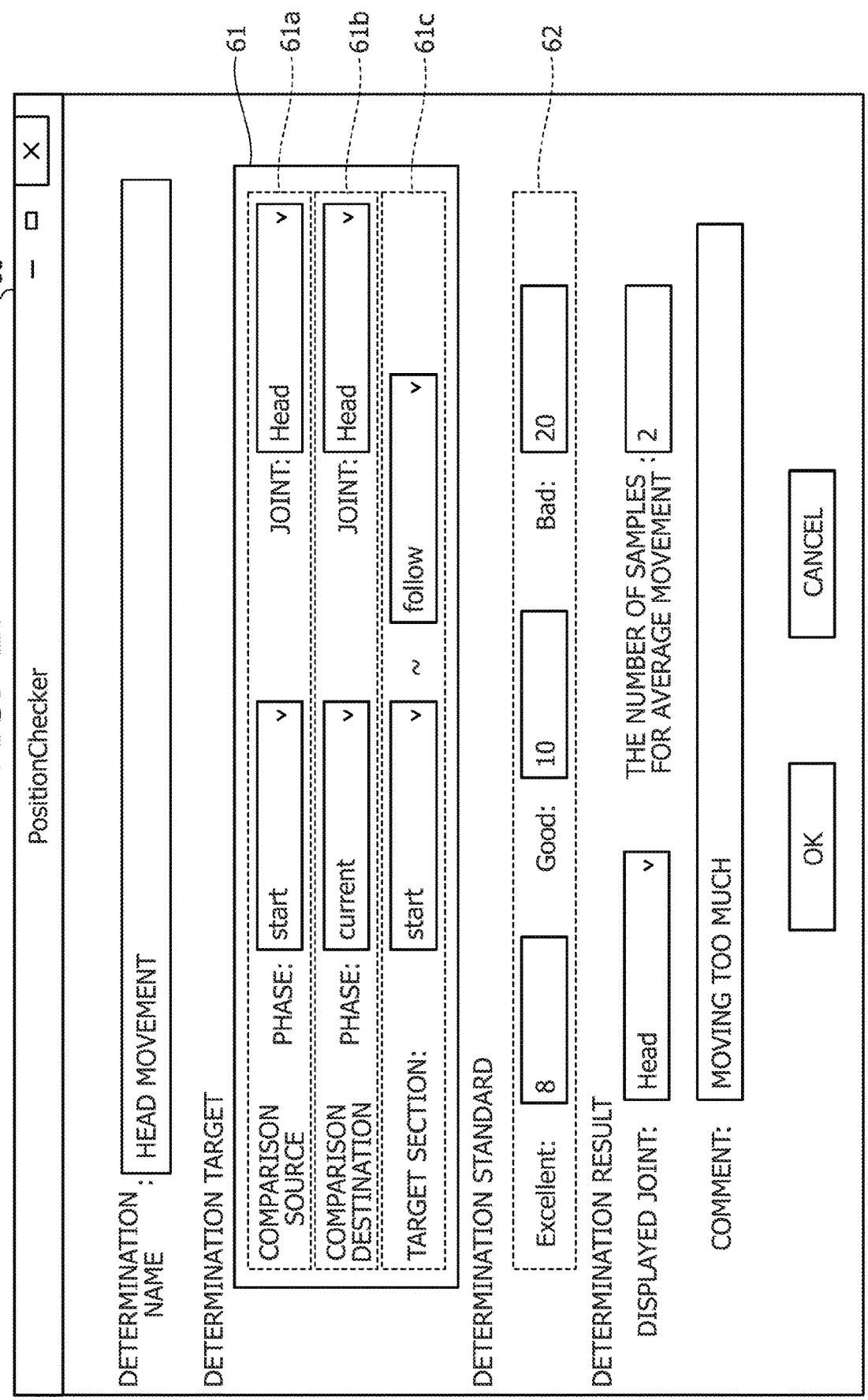
FIG. 27 is a diagram illustrating an example of a parameter setting screen of "PositionChecker."

FIG. 27 is a diagram illustrating an example of a parameter setting screen of "PositionChecker."

As illustrated in FIG. 27, a parameter setting screen 60 includes an area 61 defining the determination target and an area 62 defining the determination standard. The area 61 includes an area 61a defining the comparison source, an area 61b defining the comparison destination, and an area 61c defining the target section. The expert operates the input device to input information to each area.

In the example illustrated in FIG. 27, the area 61a defining the comparison source defines that the position of the feature point of the comparison source is the position of the feature point of the head in the first second frame data of the second frame data with the type of phase "start."

The area 61b defining the comparison destination defines that the position of the feature point of the comparison destination is the position of the feature point of the head in the current second frame data. The area 61c defining the target section defines that the target phases are "start-follow."

The area 62 defining the determination standard defines that the standard parameters are "8, 10, 20."

For example, the skill determination definition unit 140A generates a record corresponding to the module name "PositionChecker" of FIG. 24 based on the information input to FIG. 27.

FIG. 28 is a diagram illustrating an example of a parameter setting screen of "AngleChecker (1)."

A parameter setting screen 70 includes an area 71 defining the determination target and an area 72 defining the determination standard. The area 71 includes an area 71a defining the feature points to be compared and an area 71b defining the target section. The expert operates the input device to input information to each area.

In the example illustrated in FIG. 28, the area 71a defining the feature points to be compared defines that the angle formed by the line segment passing through the feature point of the left shoulder and the feature point of the left elbow of the current second frame data and the straight line passing through the feature point of the left elbow and the feature point of the left wrist is the determination target. The area 71b defining the target section defines that the target phases are "start-impact."

The area 72 defining the determination standard defines various standard parameters.

For example, the skill determination definition unit 140A generates a record corresponding to the module name "AngleChecker (1)" of FIG. 24 based on the information input to FIG. 28.

Figure 29:
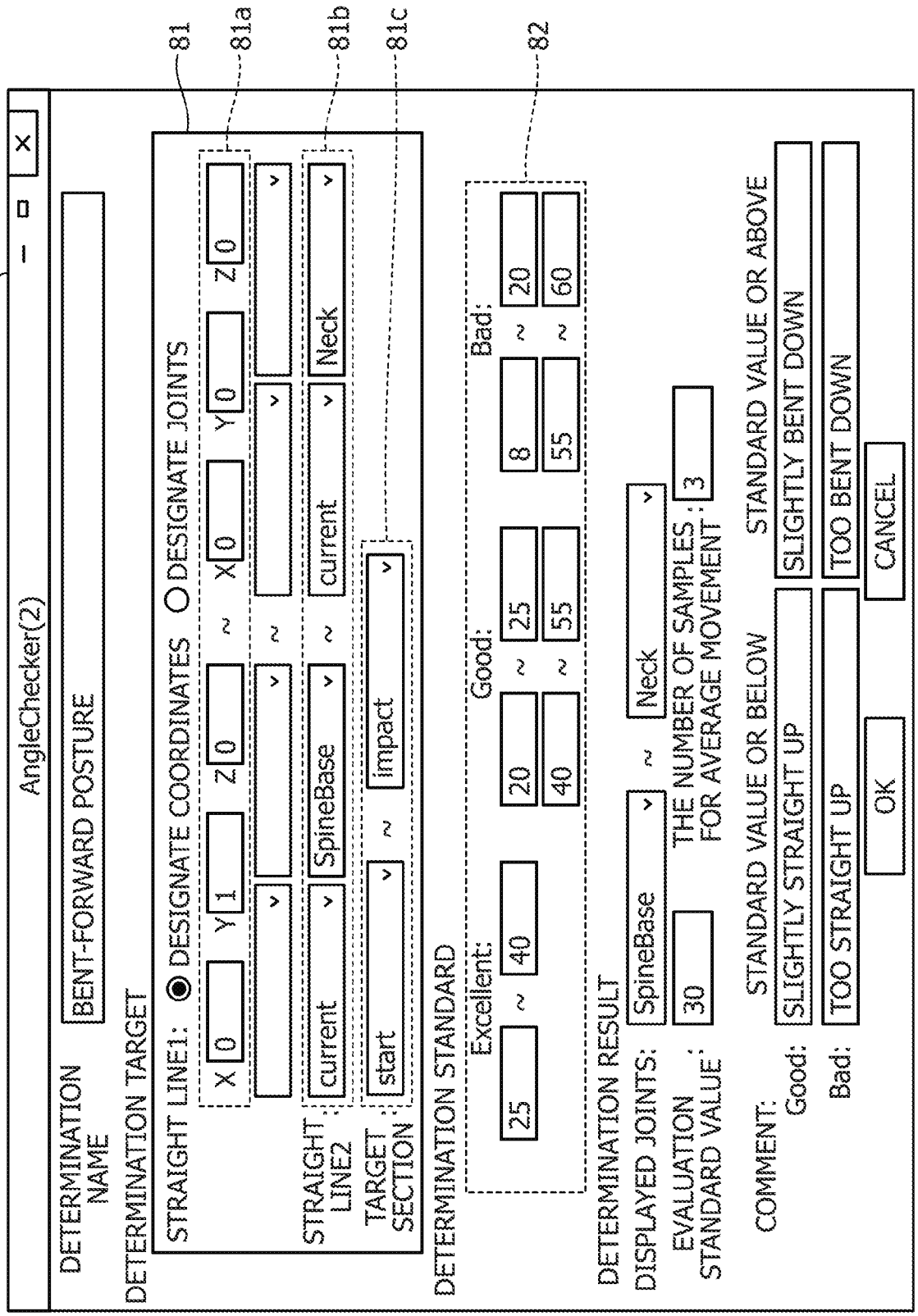
FIG. 29 is a diagram illustrating an example of a parameter setting screen of "AngleChecker (2)."

FIG. 29 is a diagram illustrating an example of a parameter setting screen of "AngleChecker (2)."

A parameter setting screen 80 includes an area 81 defining the determination target and an area 82 defining the determination standard. The area 81 includes an area 81a defining the perpendicular line, an area 81b defining the feature points to be compared, and an area 81c defining the target section. The expert operates the input device to input information to each area.

In the example illustrated in FIG. 29, the area 81a defining the perpendicular line defines the three-dimensional coordinates of the start point and the terminal point of the perpendicular line. The area 81b defining the feature points to be compared defines the line segment passing through the feature point of the head and the feature point of the waist in the current second frame data. The area 81c defining the target section defines that the target phases are "start-impact."

The area 82 defining the determination standard defines various standard parameters.

For example, the skill determination definition unit 140A generates a record corresponding to the module name "AngleChecker (2)" of FIG. 24 based on the information input to FIG. 29.

FIG. 21 will be described again. The phase determination unit 150A is a processing unit that compares each piece of the first frame data included in the exemplar data 120a and the second frame data of the user to determine the type of phase corresponding to the second frame data. The phase determination unit 150A provides the determined type of phase to the acquired frame data and outputs the frame data to the skill determination unit 160A.

Hereinafter, an example of processes of the phase determination unit 150A will be described. The phase determination unit 150A saves the second frame data of the user in the memory and sequentially executes a correction process, feature value calculation, and frame matching.

An example of the correction process executed by the phase determination unit 150A will be described. The phase determination unit 150A performs vertical axis correction of the second frame data. For example, the installation position and the installation angle may be different from the environment of the last time when the motion sensor 10 is a stationary sensor, and the vertical axis of the second frame data is corrected according to the installation environment. For example, the phase determination unit 150A causes the display device to display the second frame data and receives an input of correction information from the user to bring the vertical axis of the second frame data into line with the perpendicular line. The phase determination unit 150A may make a correction by bringing the direction of the user into line with the front direction. After receiving the input of the correction information, the phase determination unit 150A may use the correction information to correct the vertical axis or correct the direction of the remaining second frame data.

The phase determination unit 150A also executes a correction process for reducing variations in the position of the feature point of the second frame data. For example, the phase determination unit 150A reduces the variations by setting an average value of the positions of the feature point of the preceding and following second frame data as the position of the feature point of the second frame data between the preceding and following second frame data. The phase determination unit 150A may also use a low-pass filter to remove noise components included in the second frame data.

An example of the feature value calculation executed by the phase determination unit 150A will be described. In Embodiment 1, the three-dimensional coordinates of the feature point of each joint included in the second frame data are calculated as a feature value, for example.

An example of other feature value calculations executed by the phase determination unit 150A will be described. When selecting the joints characterizing the swing specific to each sport, the phase determination unit 150A may calculate, as the feature values, the three-dimensional coordinates and the speed and acceleration of the hands, the waist, the fingers, and the like.

When handling general data not specific to each sport as the feature values, the phase determination unit 150A may calculate, as the feature values, the three-dimensional coordinates and the speed and acceleration of all joints. The phase determination unit 150A may also calculate, as the feature values, the centers of gravity or the like of all joint positions.

Figure 30:
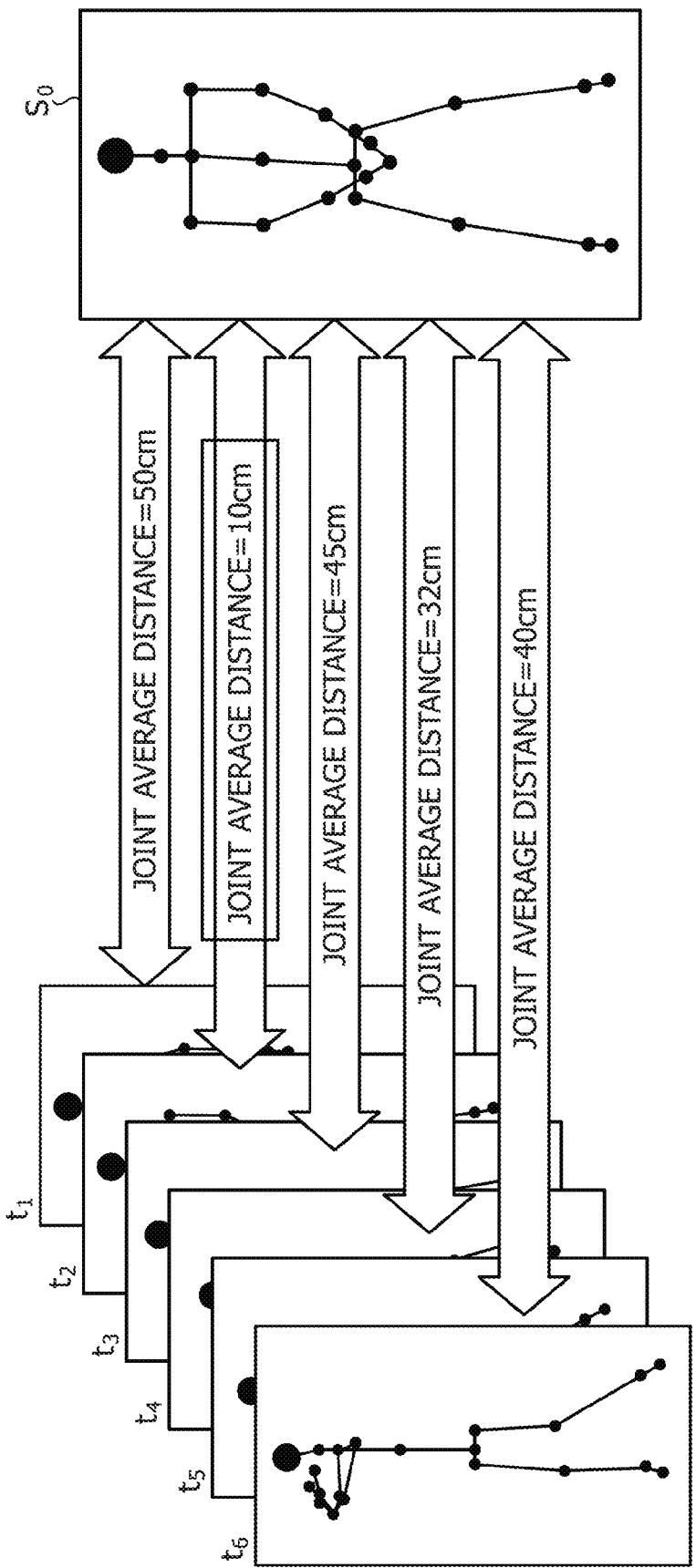
FIG. 30 is a diagram for describing an example of frame matching.

An example of the frame matching executed by the phase determination unit 150A will be described. FIG. 30 is a diagram for describing an example of frame matching. The current second frame data will be referred to as second frame data $S_0$ in the example illustrated in FIG. 30. The pieces of first frame data included in the exemplar data 120a will be referred to as first frame data t1 to t6. The phase determination unit 150A calculates each average value of the distances between the feature points of the joints regarding the second frame data $S_0$ and the first frame data t1 to t6 based on Formula (11). In the following description, the average value of the distances between the feature points of the joints will be referred to as "joint average distance."

[Expression 11]

$$\mathrm{argmin}_{i \in R} \left( \sum_{j=1}^{N} \sqrt{(x_{t_i,j} - x_{s_0,j})^2 + (y_{t_i,j} - y_{s_0,j})^2 + (z_{t_i,j} - z_{s_0,j})^2} \Big/ n \right) \quad (11)$$

In Formula (11), $xS_{0j}$, $yS_{0j}$, and $zS_{0j}$ are three-dimensional coordinates of the feature point of a joint (joint corresponding to the numerical value j) of the second frame data. $x_{tij}$, $y_{tij}$, and $z_{tij}$ are three-dimensional coordinates of the feature point of a joint (joint corresponding to the numeric value of j) of the first frame data ti. n is the number of feature points of the joint. The phase determination unit 150A specifies a set of the second frame data $S_0$ and the first frame data with the smallest joint average distance among the joint average distances calculated by Formula (11).

In the example illustrated in FIG. 30, the joint average distance of the set of the second frame data $S_0$ and the first frame data $t_2$ is the smallest, and the phase determination unit 150A determines that the first frame data corresponding to the second frame data $S_0$ is the first frame data $t_2$. The phase determination unit 150A also determines that the type of phase of the second frame data $S_0$ is the type of phase corresponding to the first frame data t2.

Figure 31:
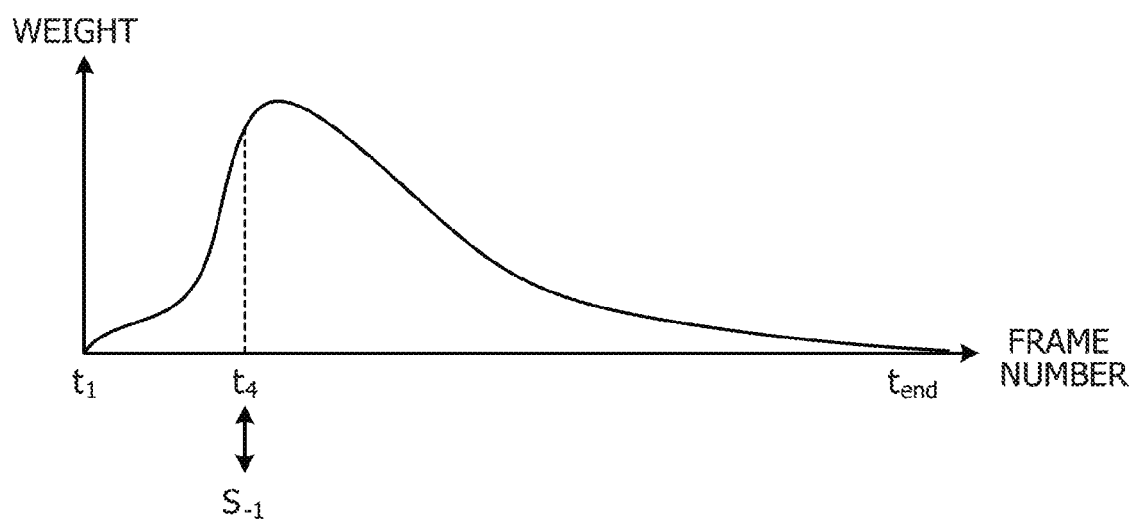
FIG. 31 is a diagram for describing weights.

Incidentally, the phase determination unit 150A uses a weight to correct the value of the joint average distance when the phase determination unit 150A uses Formula (11) to calculate the joint average distance. For example, the phase determination unit 150A may divide the joint average distance by the weight to correct the joint average distance. FIG. 31 is a diagram for describing weights. In FIG. 31, the horizontal axis corresponds to the frame number of the first frame data, and the vertical axis corresponds to the weight. For example, the sum of the weights corresponding to the frame numbers is 1.

For example, the first frame data matching the second frame data $S_0$ is likely to be first frame data near the first frame data matching the preceding second frame data $S_{-1}$. For example, assuming that the first frame data matching the second frame data $S_{-1}$ is first frame data $t_4$, the first frame data matching the second frame data $S_0$ is likely to be first frame data after and near the first frame data $t_4$.

Therefore, a larger weight is provided to the first frame data after the first frame data matching the second frame data $S_{-1}$ near the matched first frame data. Even if the first frame data is near the matched first frame data, the possibility is low in a frame before the matched first frame data, and a lower weight is provided.

The value of the joint average distance calculated in Formula (11) may be corrected by the weight to reduce reversal or jumping of the matching first frame data.

The phase determination unit 150A repeatedly applies the process to the other second frame data to determine the first frame data corresponding to each piece of second frame data to determine the type of phase of each piece of second frame data. The phase determination unit 150A extracts the second frame data with the types of phase from start to end among the pieces of second frame data. The phase determination unit 150A saves the second frame data as motion data in a file and outputs the motion data to the output unit 170A.

The skill determination unit 160A is a processing unit that determines the skill of the user for each type of phase based on the skill determination definition data 120b as well as the actions, the postures, and the feature values of the joints of the user derived from the feature points included in the second frame data extracted for each type of phase.

An example of the process of the determination unit 160A will be described. The skill determination unit 160A refers to the skill determination definition data 120b to generate determination modules. For example, the skill determination unit 160A generates the "PositionChecker" module, the "AngleChecker (1)" module, and the "AngleChecker (2)" module in the example illustrated in FIG. 24.

The skill determination unit 160A outputs the second frame data received from the phase determination unit 150A to the corresponding module based on the type of phase corresponding to the second frame data and the skill determination definition data 120b. Once the module receives the second frame data, the module outputs the result of the skill determination of the user based on the data defined in the skill determination definition data 120b.

Figure 32:
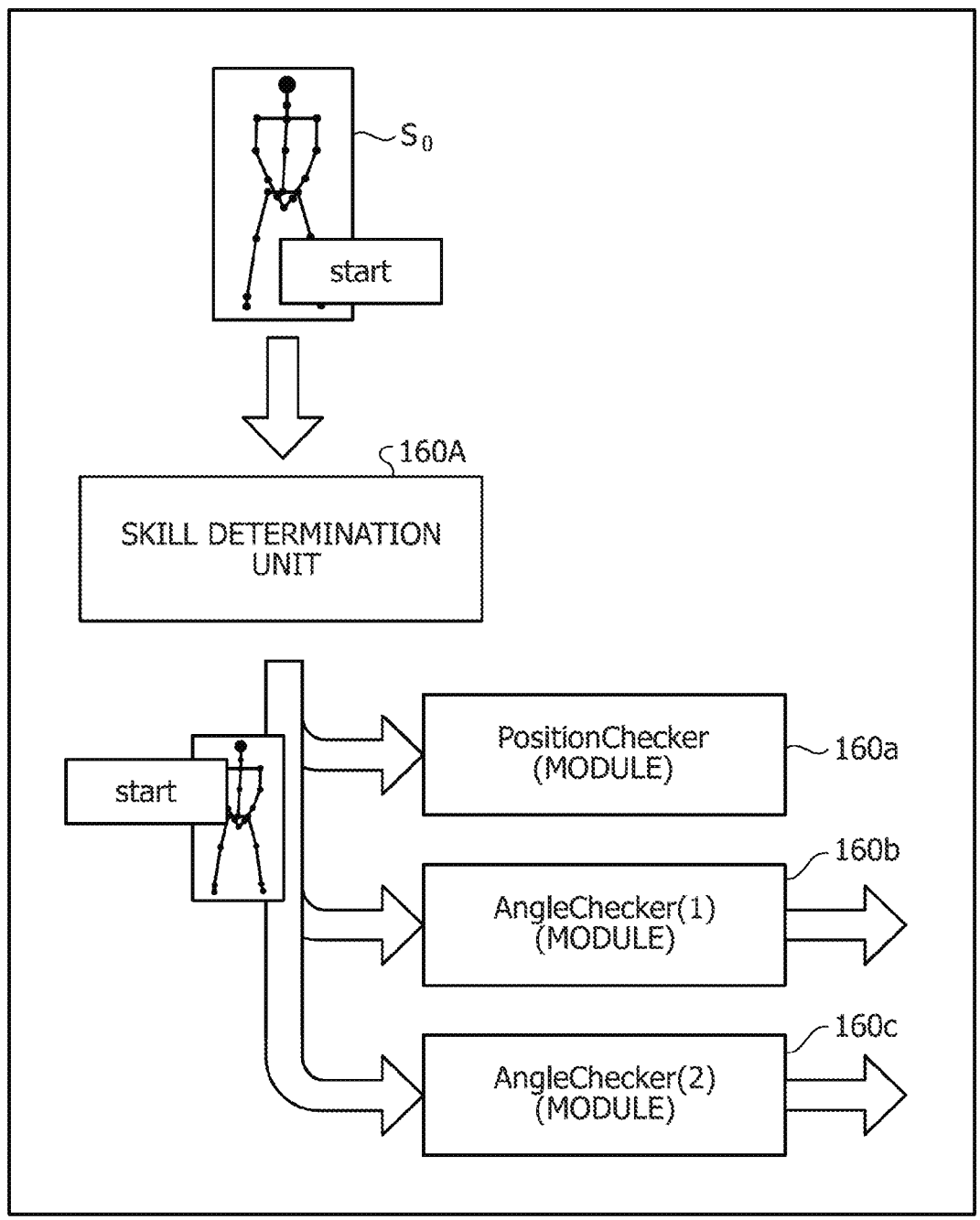
FIG. 32 is a diagram (1) for describing a process of a skill determination unit.
Figure 33:
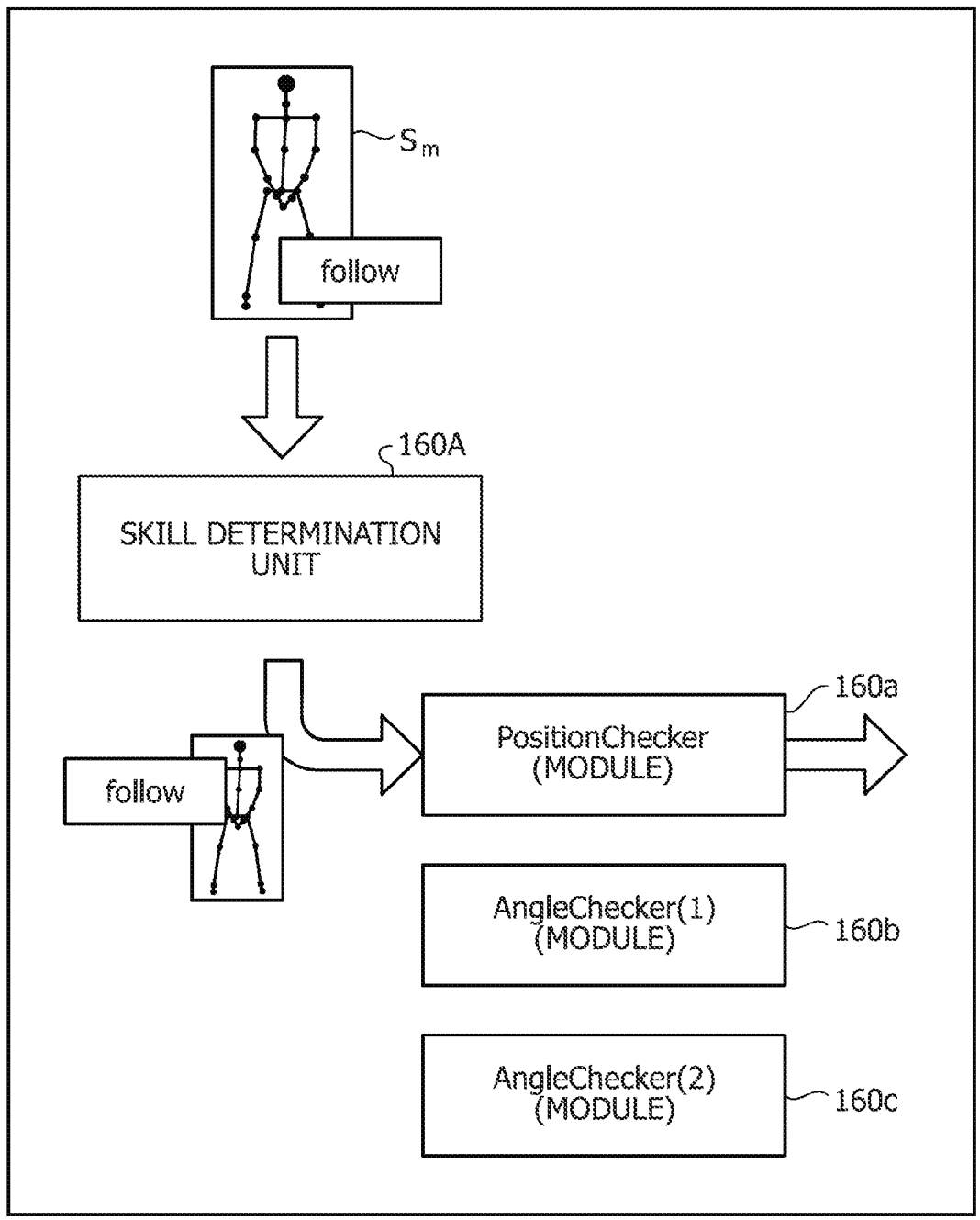
FIG. 33 is a diagram (2) for describing a process of a skill determination unit.

FIGS. 32 and 33 are diagrams for describing a process of a skill determination unit. FIG. 32 will be described. The skill determination unit 160A acquires the second frame data $S_0$ with the type of phase "start."

As illustrated in FIG. 24, the target phases of "PositionChecker" are "start-follow," and the skill determination unit 160A outputs the second frame data $S_0$ to a "PositionChecker" module 160a. For example, the "PositionChecker" module 160a saves the three-dimensional coordinates of the feature point of the head in the second frame data $S_0$.

As illustrated in FIG. 24, the target phases of "AngleChecker (1)" are "start-impact," and the skill determination unit 160A outputs the second frame data $S_0$ to a "AngleChecker (1)" module 160b. The "AngleChecker (1)" module 160b evaluates the second frame data $S_0$ based on the comparison positions and the standard parameters to determine the skill of the user and outputs the determination result.

For example, the "AngleChecker (1)" module 160b outputs the determination result "Excellent" when the formed angle is included in "135-180."

The "AngleChecker (1)" module 160b outputs the determination result "Good" when the formed angle is included in "130-135, 180-190."

The "AngleChecker (1)" module 160b outputs the determination result "Bad" when the formed angle is included in "110-130, 190-200."

Note that the "AngleChecker (1)" module 160b may output a comment separately from the determination result. For example, the "AngleChecker (1)" module 160b outputs a comment "slightly bent" when the formed angle is included in "130-135" and outputs a comment "slightly stretched" when the formed angle is included in "180-190."

The "AngleChecker (1)" module 160b outputs a comment "too bent" when the formed angle is included in "110-130" and outputs a comment "too stretched" when the formed angle is included in "190-200."

As illustrated in FIG. 24, the target phases of "AngleChecker (2)" are "start-impact," and the skill determination unit 160A outputs the second frame data $S_0$ to an "AngleChecker (2)" module 160c. The "AngleChecker (2)" module 160c evaluates the second frame data $S_0$ based on the comparison positions and the standard parameters to thereby determine the skill of the user and outputs the determination result.

For example, the "AngleChecker (2)" module 160c outputs the determination result "Excellent" when the formed angle is included in "25-40."

The "AngleChecker (2)" module 160c outputs the determination result "Good" when the formed angle is "20-25, 40-55."

The "AngleChecker (2)" module 160c outputs the determination result "Bad" when the formed angle is "8-20, 55-60."

Note that the "AngleChecker (2)" module 160c may output a comment separately from the determination result. For example, the "AngleChecker (2)" module 160c outputs a comment "slightly straight up" when the formed angle is included in "20-25" and outputs a comment "slightly bent down" when the formed angle is included in "40-55."

The "AngleChecker (2)" module 160c outputs a comment "too straight up" when the formed angle is included in "8-20" and outputs a comment "too bent down" when the formed angle is included in "55-60."

Next, FIG. 33 will be described. The skill determination unit 160A acquires the second frame data $S_m$ with the type of phase "follow."

As described in FIG. 24, the target phases of "PositionChecker" are "start-follow," and the skill determination unit 160A outputs the second frame data $S_m$ to the "PositionChecker" module 160a.

The "PositionChecker" module 160a evaluates the second frame data $S_m$ based on the comparison positions and the standard parameters to determine the skill of the user and outputs the determination result. For example, the "PositionChecker" module 160a outputs the determination result "Excellent" when the difference between the position of the feature point of the head in the second frame data $S_0$ and the position of the feature point of the head in the second frame data $S_m$ is "smaller than 8 cm."

The "PositionChecker" module 160a outputs the determination result "Good" when the difference between the position of the feature point of the head in the second frame data $S_0$ and the position of the feature point of the head in the second frame data $S_m$ is "equal to or greater than 8 cm and smaller than 10 cm."

The "PositionChecker" module 160a outputs the determination result "Bad" when the difference between the position of the feature point of the head in the second frame data $S_0$ and the position of the feature point of the head in the second frame data $S_m$ is "equal to or greater than 10 cm and smaller than 20 cm."

The "PositionChecker" module 160a may output a comment separately from the determination result. For example, the "PositionChecker" module 160a outputs a comment "moving too much" when the difference between the position of the feature point of the head in the second frame data $S_0$ and the position of the feature point of the head in the second frame data $S_m$ is equal to or greater than "10 cm."

Note that as illustrated in FIG. 24, the target phases of "AngleChecker (1)" are "start-impact," and the skill determination unit 160A does not output the second frame data $S_m$ to the "AngleChecker (1)" module 160b. The target phases of "AngleChecker (2)" are "start-impact," and the skill determination unit 160A does not output the second frame data $S_m$ to the "AngleChecker (2)" module 160c. Note that the skill determination unit 160A may output the second frame data to each module, and the module may individually determine whether or not to process the second frame data.

The skill determination unit 160A outputs information of the determination result associating the determination result of each module and the second frame data to the output unit 170A.

The output unit 170A is a processing unit that uses image information, voice information, or a physical stimulus to the user to output the determination result of the skill determination unit 160A. Hereinafter, an example of a process of the output unit 170A will be described.

Figure 34:
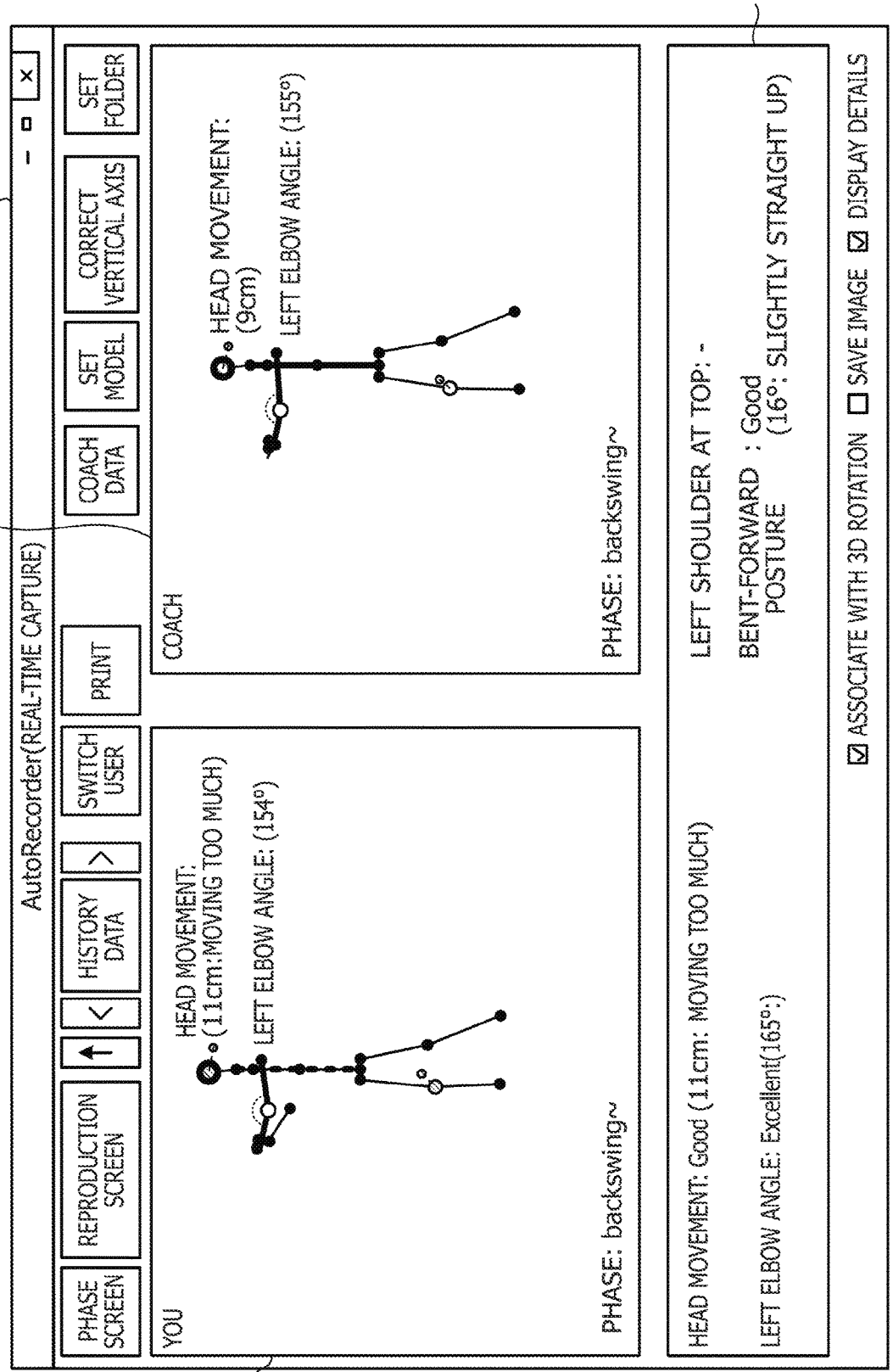
FIG. 34 is a diagram (1) illustrating an example of a display screen generated by an output unit.

A display screen generated by the output unit 170A based on the determination result of the skill determination unit 160A will be described. FIG. 34 is a diagram (1) illustrating an example of a display screen generated by an output unit. As illustrated in FIG. 34, a display screen 200 includes a user data screen 200a, an exemplar data screen 200b, and a skill determination screen 200c.

The output unit 170A causes the user data screen 200a to display the second frame data of the user acquired from the skill determination unit 160A. The output unit 170A may also associate and display each feature point of the second frame data, the movement, the posture, the feature value of the joint, and the comment. In the example illustrated in FIG. 34, the output unit 170A displays the head movement (11 cm, moving too much) on the head of as a feature point. The output unit 170A displays the left elbow angle (154°) on the left shoulder as a feature point.

The output unit 170A causes the exemplar data screen 200b to display the first frame data of the user exemplar data 120a. For example, the output unit 170A brings the type of phase of the first frame data into line with the type of phase of the second frame data displayed on the user data screen 200a. The output unit 170A may also associate and display each feature point of the first frame data, the movement, the posture, and the feature value of the joint. In the example illustrated in FIG. 34, the output unit 170A displays the head movement (9 cm) on the head as a feature point. The output unit 170A displays the left elbow angle (155°) on the left shoulder as a feature point.

The output unit 170A causes the skill determination screen 200c to display the determination result of the skill acquired from the skill determination unit 160A. For example, the output unit 170A may associate and display the skill determination name, the determination result, the movement, the posture, the feature value of the joint, and the comment.

The output unit 170A may update the display screens 200a, 200b, and 200c of FIG. 34 every time each piece of second frame data is acquired. The frame data from the start to the end may be reproduced on a screen similar to this screen after the phase type is determined to be "End."

The output unit 170A may execute a process of sequentially changing the phase of the second frame data on the user data screen 200a of the display screen 200 of FIG. 34 and switching the content of the exemplar data screen 200b and the skill determination screen 200c according to the change.

The output unit 170A may associate the type of each phase, the second frame data, and the determination result to generate a display screen. FIG. 35 is a diagram (2) illustrating an example of a display screen generated by an output unit. As illustrated in a display screen 210 of FIG. 35, the output unit 170A associates and displays the second frame data of the type of each phase and the determination result. For example, the output unit 170A may associate and display the skill determination name, the determination result, the movement, the posture, the feature value of the joint, and the comment. The output unit 170A may also display image information in addition to the 3D skeleton information.

Next, a process of outputting the voice information based on the determination result executed by the output unit 170A will be described. The output unit 170A may use voice to output the skill result or a point to be fixed according to the determination result output from the skill determination unit 160A. For example, the output unit 170A outputs a voice "the head is moving too much" when the determination result regarding the head movement is Bad. Which voice is to be output for which determination result is set in advance in a table or the like, and the output unit 170A outputs the voice based on the table.

Next, a process of using a physical stimulus to the user to notify the user of the determination result executed by the output unit 170A will be described. The user wears equipment including a small motor, and the output unit 170A causes the small motor to act according to the determination result. For example, the output unit 170A changes the speed of the small motor according to various determination results "Excellent, Good, Bad."

The speed of the small motor with respect to the determination result is set in advance in a table or the like, and the output unit 170A rotates the small motor based on the table.

The user wears a cooling device, such as a Peltier element, and the output unit 170A cools the cooling device according to the determination result. For example, the output unit 170A changes the temperature of the cooling device according to various determination results "Excellent, Good, Bad."

The temperature of the cooling device with respect to the determination result is set in advance in a table or the like, and the output unit 170A controls the cooling device based on the table.

The user wears a device in which a low-frequency current flows, and the output unit 170A causes the device to generate a current according to the determination result. For example, the output unit 170A changes the magnitude of the current according to various determination results "Excellent, Good, Bad."

The magnitude of the current with respect to the determination result is set in advance in a table or the like, and the output unit 170A controls the device based on the table.

The user may also wear a powered exoskeleton or an artificial muscle, and the output unit 170A may move the powered exoskeleton or the artificial muscle according to the motion data of the expert. In this way, the user may experience the movement of the expert.

Figure 36:
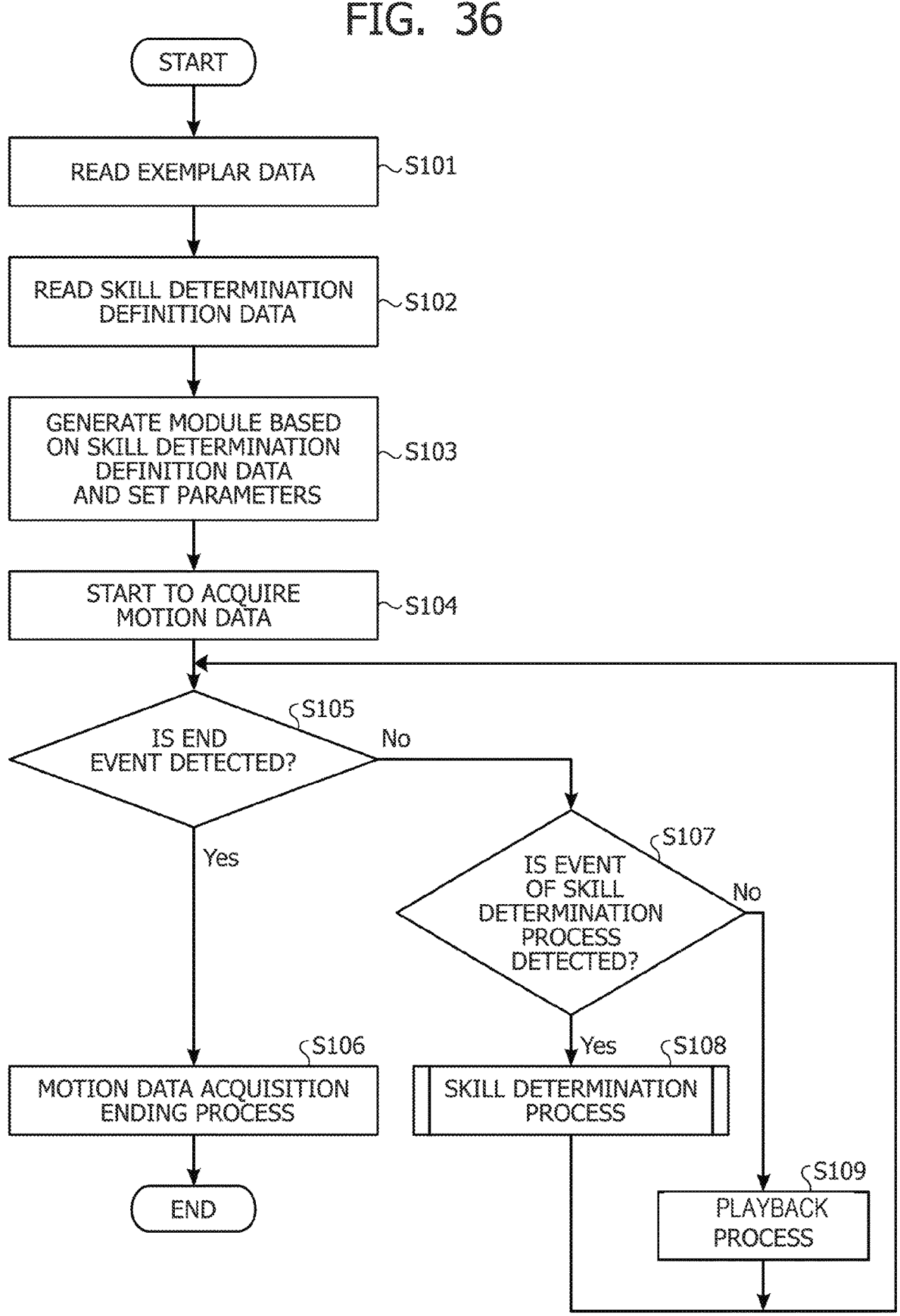
FIG. 36 is a flow chart illustrating a processing procedure of a skill determination device.

Next, a processing procedure of the skill determination device 100A according to the present Embodiment will be described. FIG. 36 is a flow chart illustrating a processing procedure of a skill determination device. As illustrated in FIG. 36, the phase determination unit 150A of the skill determination device 100A reads the exemplar data 120a (step S101). The skill determination unit 160A of the skill determination device 100A reads the skill determination definition data 120b (step S102).

The skill determination unit 160A generates the module based on the skill determination definition data 120b and sets the parameters (step S103). The phase determination unit 150A starts to acquire the motion data of the user (step S104). The skill determination device 100A determines whether or not an end event is detected through the input device (step S105).

If the skill determination device 100A detects the end event through the input device (step S105, Yes), the phase determination unit 150A executes a motion data acquisition ending process of the user (step S106).

On the other hand, if the skill determination device 100A does not detect the end event through the input device (step S105, No), the skill determination device 100A determines whether or not an event of a skill determination process is detected through the input device (step S107). If the skill determination device 100A detects the event of the skill determination process through the input device (step S107, Yes), the skill determination unit 160A executes the skill determination process (step S108) and moves to step S105. Note that the event of the skill determination process is an event generated when the sensing unit 110a acquires the frame data from the motion sensor.

On the other hand, if the skill determination device 100A does not detect the event of the playback process through the input device (step S107, No), the output unit 170A of the skill determination device 100A executes a playback process (step S109) and moves to step S105.

Figure 37A:
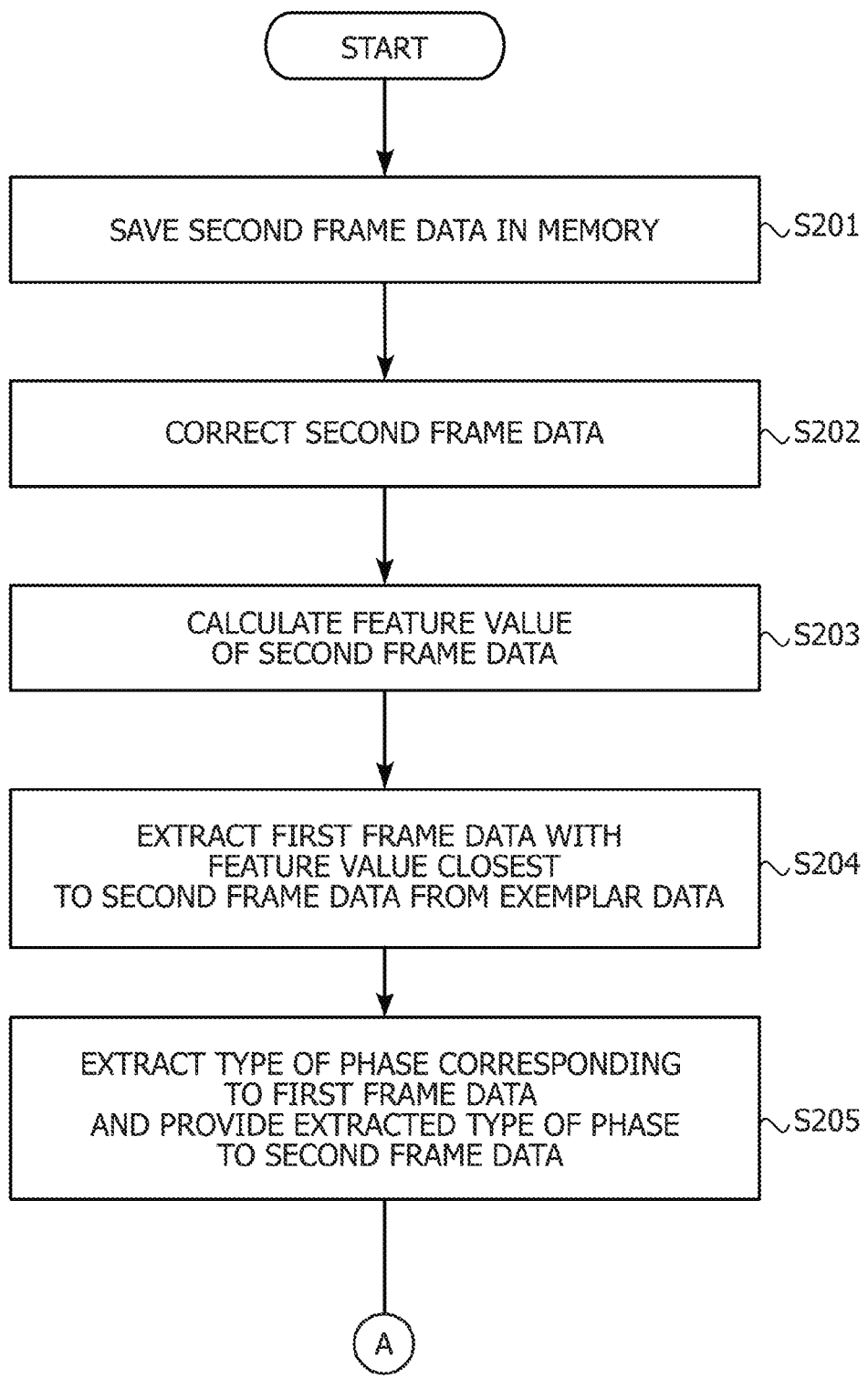
FIGS. 37A and 37B depict flow chart illustrating a processing procedure of a skill determination process.
Figure 37B:
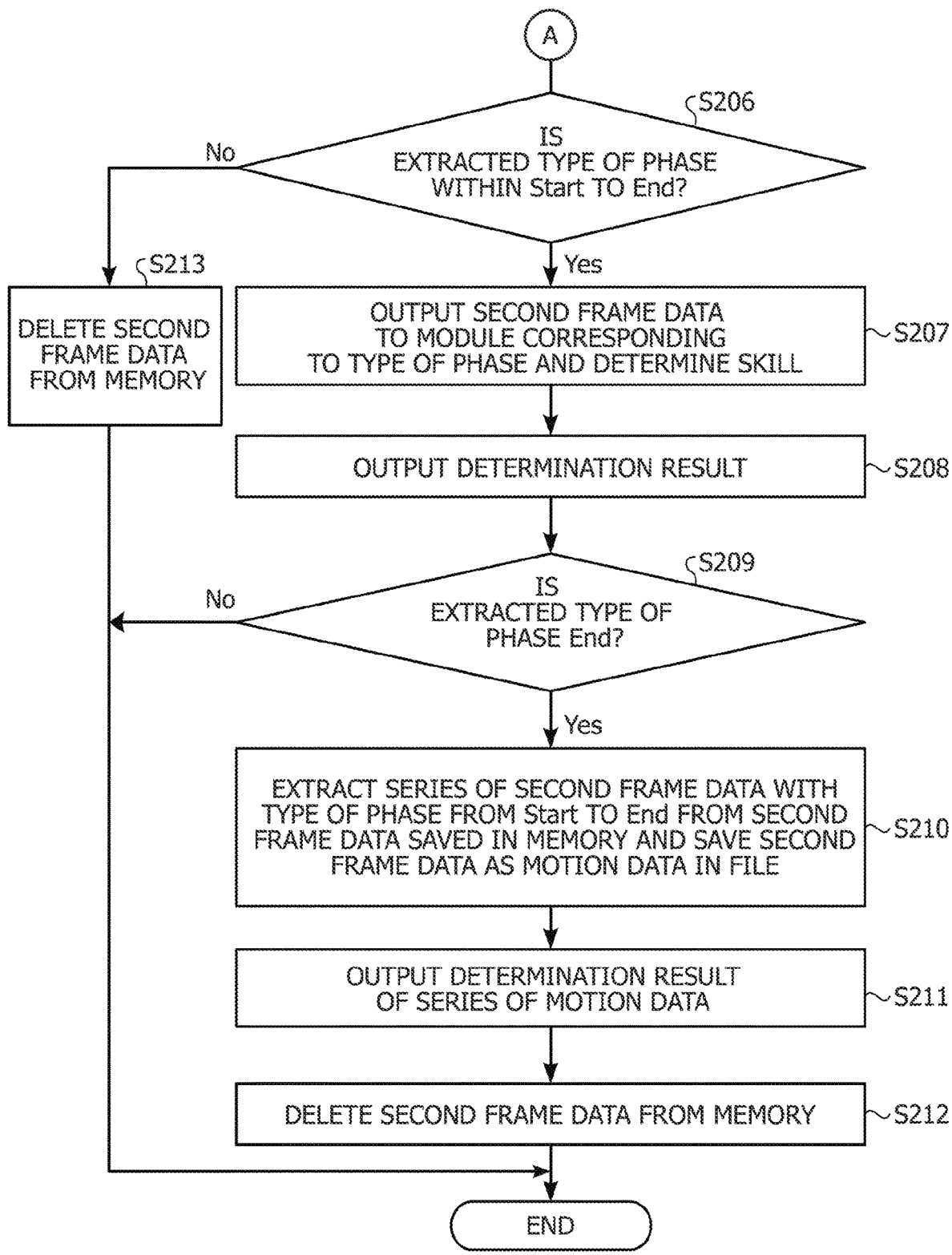

Next, a processing procedure of the skill determination process illustrated in step S108 will be described. FIGS. 37A and 37B depict flow chart illustrating a processing procedure of a skill determination process. As illustrated in FIGS. 37A and 37B, the phase determination unit 150A of the skill determination device 100A saves the second frame data in the memory (step S201). The phase determination unit 150A corrects the second frame data (step S202).

The phase determination unit 150A calculates the feature value of the second frame data (step S203). The phase determination unit 150A extracts the first frame data with the feature value closest to the second frame data from the exemplar data 120a (step S204). The phase determination unit 150A extracts the type of phase corresponding to the first frame data and provides the extracted type of phase to the second frame data (step S205). Note that the type of phase includes the phase type corresponding one-to-one with the frame number, such as "start" and "backswing," as illustrated in 50a of FIG. 26, and besides includes phase types indicating phases between "start" and "backswing."

The phase determination unit 150A determines whether the extracted type of phase is within Start to End (step S206). If the type of phase is not within Start to End (step S206, No), the phase determination unit 150A deletes the second frame data stored in S201 from the memory (step S213) and ends the skill determination process.

On the other hand, if the type of phase is within Start to End (step S206, Yes), the skill determination unit 160A outputs the second frame data to the module corresponding to the type of phase and determines the skill (step S207). The output unit 170A outputs the determination result (step S208).

The phase determination unit 150A determines whether or not the extracted type of phase is End (step S209). If the extracted type of phase is not End (step S209, No), the phase determination unit 150A ends the skill determination process.

On the other hand, if the extracted type of phase is End (step S209, Yes), the phase determination unit 150A moves to step S210. The phase determination unit 150A extracts the series of second frame data with the type of phase from Start to End from the second frame data saved in the memory and saves the second frame data as motion data in a file (step S210). The output unit 170A outputs the determination result of the series of motion data (step S211), deletes the second frame data stored in S201 from the memory (step S212), and ends the skill determination process.

Figure 38:
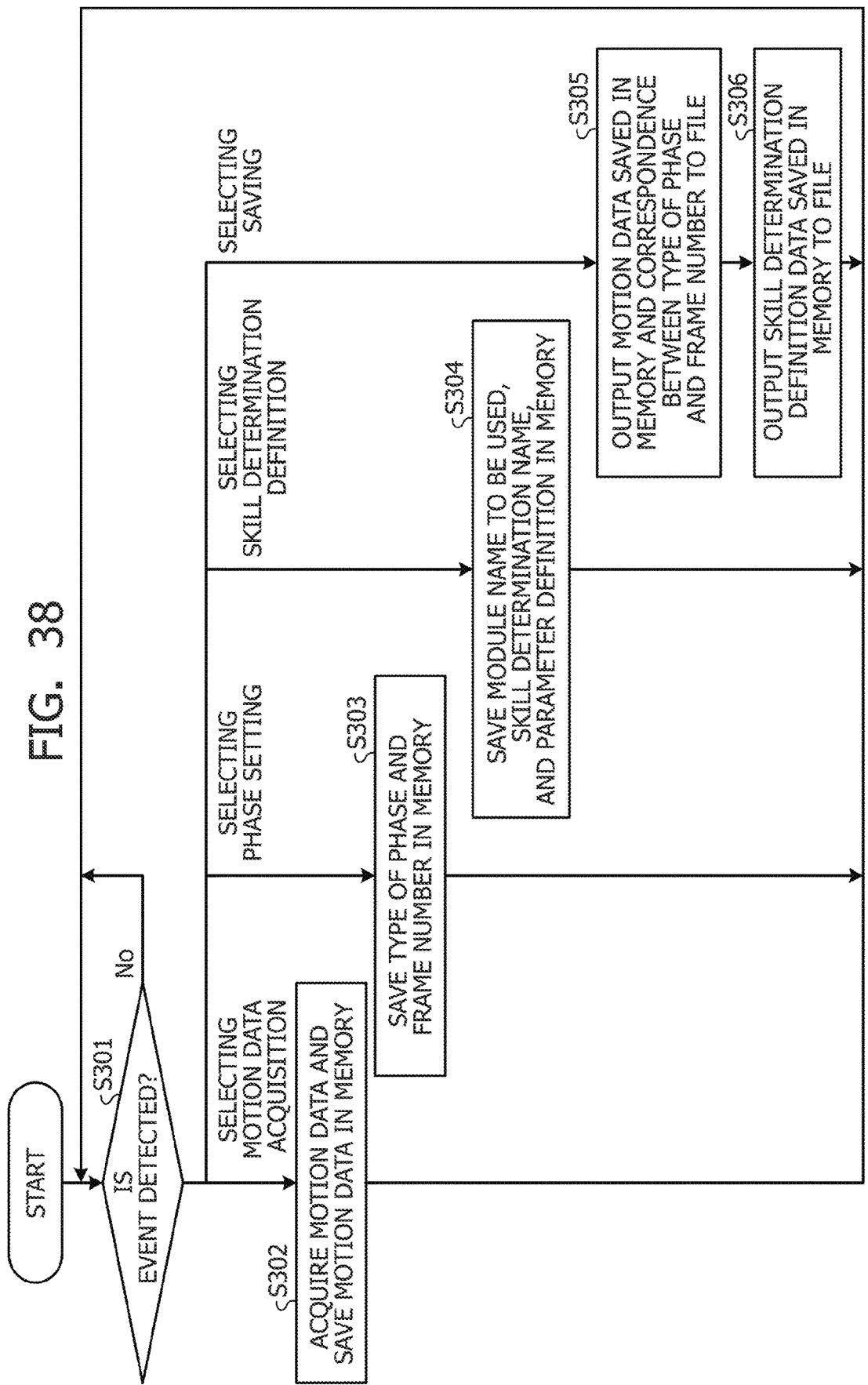
FIG. 38 is a flow chart illustrating a processing procedure of a setting process.

Next, a processing procedure of the setting process executed by the exemplar data generation unit 130A and the skill determination definition unit 140A will be described. FIG. 38 is a flow chart illustrating a processing procedure of a setting process. As illustrated in FIG. 38, the skill determination device 100A determines whether or not an event is detected (step S301). If the event is not detected (step S301, No), the skill determination device 100A moves to step S301 again.

If an event for selecting motion data acquisition is detected (step S301, selecting motion data acquisition), the skill determination device 100A moves to step S302. The exemplar data generation unit 130A or the skill determination definition unit 140A acquires the motion data and saves the motion data in the memory (step S302). The process moves to step S301.

If an event for selecting phase setting is detected (step S301, selecting phase setting), the skill determination device 100A moves to step S303. The exemplar data generation unit 130A saves the type of phase and the frame number in the memory (step S303) and moves to step S301.

If an event for selecting skill determination definition is detected (step S301, selecting skill determination definition), the skill determination device 100A moves to step S304. The skill determination definition unit 140A saves the module name to be used, the skill determination name, and the parameter definition in the memory (step S304) and moves to step S301.

If the skill determination device 100A detects an event for selecting saving (step S301, selecting saving), the exemplar data generation unit 130A outputs the motion data saved in the memory and the correspondence between the type of phase and the frame number to the file (step S305). The skill determination definition unit 140A outputs the skill determination definition data 120b saved in the memory to the file (step S306) and moves to step S301.

Next, advantageous effects of the skill determination device 100A according to the present Embodiment will be described. The skill determination device 100A extracts the corresponding second frame data from the motion data of the user for each type of phase and determines the skill of the user for the second frame data of each type of phase based on the skill determination definition data 120b. Therefore, according to the skill determination device 100A, the skill of the user may be automatically determined for general purpose.

For example, the skill determination definition unit 140A appropriately updates the skill determination definition data 120b for the skill determination based on the information from the input device, and the skill determination unit 160A determines the skill based on the skill determination definition data 120b. In the related art, the logic for the skill determination is built in, and the target of the skill determination is fixed. However, the skill determination definition unit 140A may appropriately update the skill determination definition data 120b, and the versatility may be improved. The skill determination definition data 120b is defined by a combination of the module and the parameter definition, and a module and parameter definition defined for another target may be easily reused for another target.

The skill determination device 100A associates the motion data of the user and the motion data of the expert and displays the determination result of the skill on the display screen. As a result, the user may recognize the points to be improved even when the expert is not near the user. The user may also play back the swing after the swing to figure out the points to be improved without worrying about the screen all the time. The user may also compare the difference between the user and the expert to improve the skill. The second frame data of the user is managed in association with the type of phase, and the second frame data may be easily handled in the analysis and the like.

The skill determination device 100A compares the exemplar data 120a and each piece of the second frame data included in the motion data of the user to determine the type of phase corresponding to the second frame data and extracts the second frame data for each type of phase. For example, the skill determination device 100A specifies the first frame data corresponding to the second frame data based on the similarity between each piece of first frame data and the second frame data and determines that the type of phase corresponding to the first frame data is the type of second frame data. Therefore, the type of second frame data of the user may be accurately determined, and the accuracy of the skill determination may be improved.

The skill determination device 100A uses the weight to correct the similarity between the first frame data and the second frame data in the matching. The weight is determined by FIG. 31 based on the time of the first frame data selected last time and the time of the first frame data for the calculation of the similarity this time. This may reduce reversal or jumping of the first frame data matching the second frame data.

The skill determination device 100A uses the image information, the voice information, or the physical stimulus to the user to output the determination result of the skill. Therefore, the improvement of the skill of the user may be supported by various notification methods.

Incidentally, the process of the skill determination device 100A is an example. Hereinafter, other processes executed by the skill determination device 100A will be described.

For example, a server on the network may be provided with the function of the skill determination device 100A. The server acquires and accumulates the motion data from the terminal devices of the user and the expert. The server also saves in advance the exemplar data 120a and the skill determination definition data 120b. The server displays the motion data and the determination result of the skill on a Web screen of the terminal device when the terminal device of the user accesses the server.

Although the skill determination definition unit 140A receives an input from the input device to generate the skill determination definition data 120b, the skill determination definition unit 140A may automatically generate the skill determination data 120b based on the exemplar data 120a. For example, the skill determination definition unit 140A analyzes the exemplar data 120a and sets, as the skill determination definition data 120b, a result of statistical processing of an average value or the like of the parameters of the skill determination. For example, an average value of the amounts of movement of the feature points of the head in the first frame data included in the exemplar data 120a is defined as α. In this case, the skill determination definition unit 140A sets the standard parameters of the record of the module name "PositionChecker" to "α, α+a, α+2a."

Here, a is an appropriately set numeric value.

Although the skill determination unit 160A determines the skill for each piece of second frame data and outputs the determination result, the configuration is not limited to this. The skill determination unit 160A may convert the skill determination results into a total score and display the total score. For example, although the skill determination unit 160A determines the skill for each phase as illustrated in FIG. 35, the skill determination unit 160A may convert the determination results from the start to the end into a total score and display the total score. The points provided to the determination results "Excellent, Good, Bad" are set in advance.

The skill determination unit 160A may apply the skill determination process to the motion data of the user, and besides to the motion data of the exemplar data 120a. In this case, the output unit 170A may display the difference between the determination result for the motion data of the exemplar data 120a and the determination result for the motion data of the user.

The presentation method of the motion data output by the output unit 170A may not be fixed. For example, the output unit 170A may receive an operation from the input device and display the motion data from a different angle, such as from the back, from the side, and from above the motion data. The output unit 170A may also change the presentation method of the motion data of the exemplar data 120a in conjunction with the change in the presentation method of the motion data of the user.

Incidentally, although the case of determining the skill of golf is described in Embodiment, the skill determination device 100A according to the present Embodiment may also be applied to sports and the like other than the golf. For example, the skill determination device 100A may be applied to tennis, athletics, dance, use of cookware, performance of musical instrument, and the like.

Figure 39:
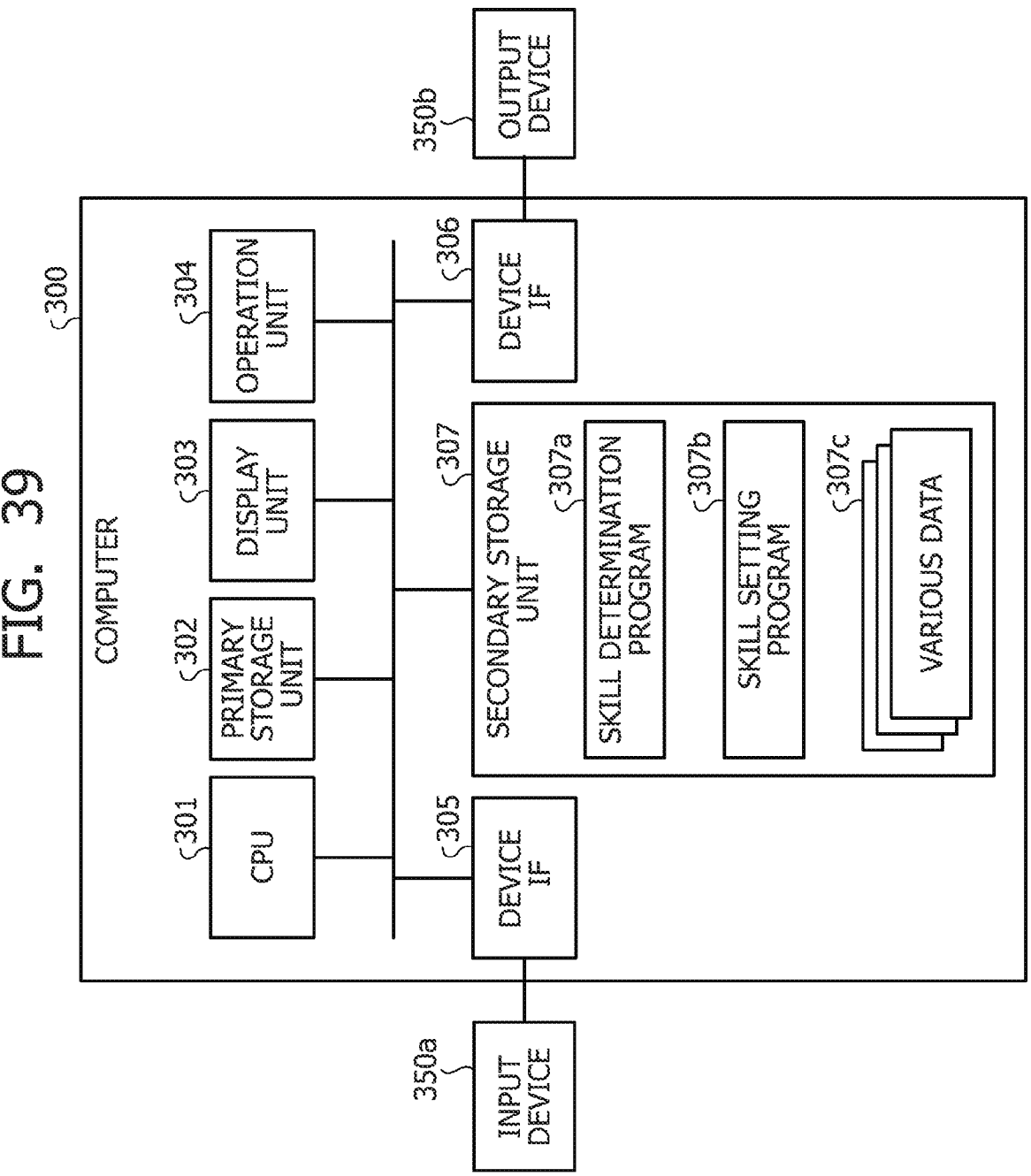
FIG. 39 is a diagram illustrating an example of a computer that executes a skill determination program.

Next, an example of a computer that executes a skill determination program for realizing a function similar to the skill determination device 100A illustrated in Embodiment will be described. FIG. 39 is a diagram illustrating an example of a computer that executes a skill determination program.

As illustrated in FIG. 39, a computer 300 is coupled to an input device 350a, such as an acceleration sensor and a motion sensor, and an output device 350b, such as a speaker and a vibration device. The computer 300 includes: a CPU 301 that executes various types of arithmetic processing; a primary storage unit 302 that temporarily stores various types of information; a display unit 303 such as a display; and an operation unit 304 such as an input device. The computer 300 includes a device IF (Interface) 305 that exchanges data with the input device 350a and a device IF 306 that exchanges data with the output device 350b. The computer 300 further includes a secondary storage unit 307 corresponding to a hard disk drive or the like.

The secondary storage unit 307 includes a skill determination program 307a, a skill setting program 307b, and various data 307c. The skill determination program 307a is read and executed by the CPU 301 to execute processes corresponding to the phase determination unit 150A, the skill determination unit 160A, and the output unit 170A of FIG. 21. The skill setting program 307b is read and executed by the CPU 301 to execute processes corresponding to the exemplar data generation unit 130A and the skill determination definition unit 140A of FIG. 21. The various data 307c correspond to the exemplar data 120a, the skill determination definition data 120b, the motion data of the user, and the like.

Note that the programs 307a and 307b may not be stored in the secondary storage unit 307 from the beginning. The programs are stored in advance in a "portable physical medium," such as a flexible disk (FD), a CD-ROM, a DVD disk, a magneto-optical disk, and an IC card, inserted into the computer 300. Then, the computer 300 may read and execute the programs 307a and 307b.

Embodiment 3

Figure 40:
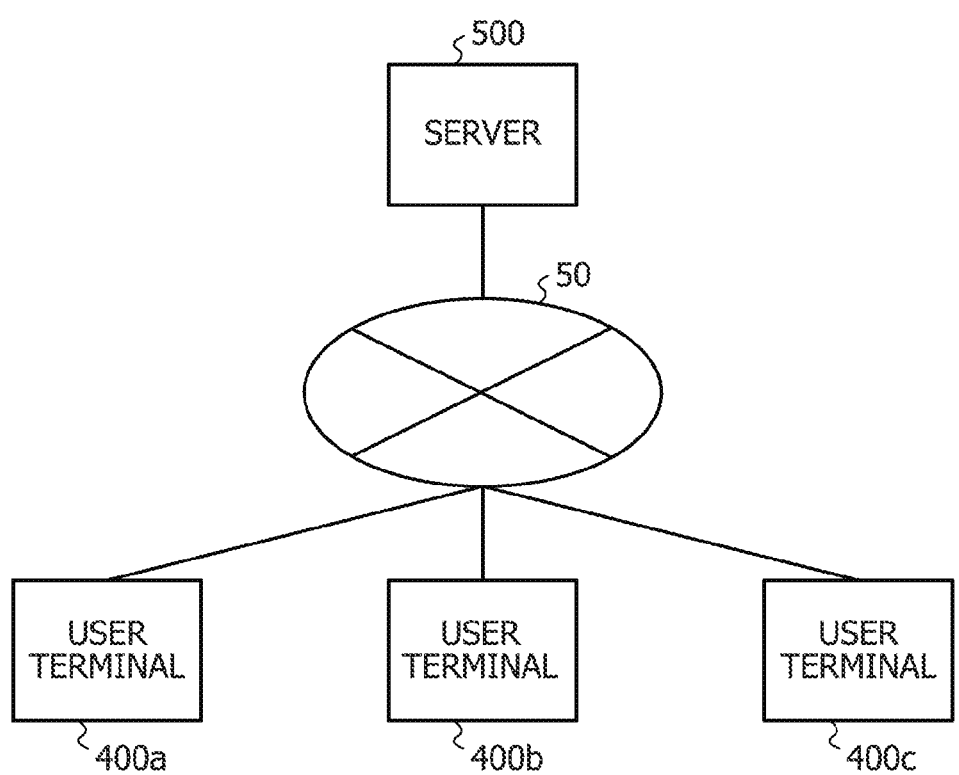
FIG. 40 is a diagram illustrating a configuration of a system according to Embodiment 3.

FIG. 40 is a diagram illustrating a configuration of a system according to Embodiment 3. As illustrated in FIG. 40, the system includes user terminals 400a, 400b, 400c and a server 500. The user terminals 400a to 400c and the server 500 are coupled to each other through the network 50. Although the user terminals 400a to 400c are illustrated in the example here, other user terminals may be coupled to the network 50. In the following description, the user terminals 400a to 400b will be collectively referred to as user terminals 400 as necessary.

The user terminal 400 has a function similar to the skill determination device 100A illustrated in Embodiment 2. The user terminal 400 is a processing unit that acquires the motion data of the user to determine the skill of the user and that notifies the server 500 of the determination results of the skill. Note that the user terminal 400 may be coupled to the skill determination device 100A to acquire the determination results of the skill of the user from the skill determination device 100A of the coupling destination.

The user operates the user terminal 400 to access the server 500 and refers to the past determination results of the skill accumulated in the server 500.

The server 500 receives the information of the determination results of the skill from each user terminal 400 and holds the information. The server 500 notifies the user terminal 400 of the determination results of the skill when the user terminal accesses the server 500 for the information of the determination results of the skill.

When the server 500 notifies the user terminal 400 of the information of the determination results of the skill, the server 500 displays, on a display screen of the user terminal 400, an advertising banner directly or indirectly related to the type of sport for which the skill is determined. The server 500 also displays, on the display screen, information of a product according to the determination results of the skill of the user. For example, when the type of sports is golf, the server 500 displays an advertising banner related to golf and notifies the user terminal 400 of information of a golf product according to the skill. Note that other than the golf, the advertising banner and the information of the product may be similarly transmitted to the user terminal 400 for baseball, tennis, athletics, dance, use of cookware, or performance of musical instrument.

Figure 41:
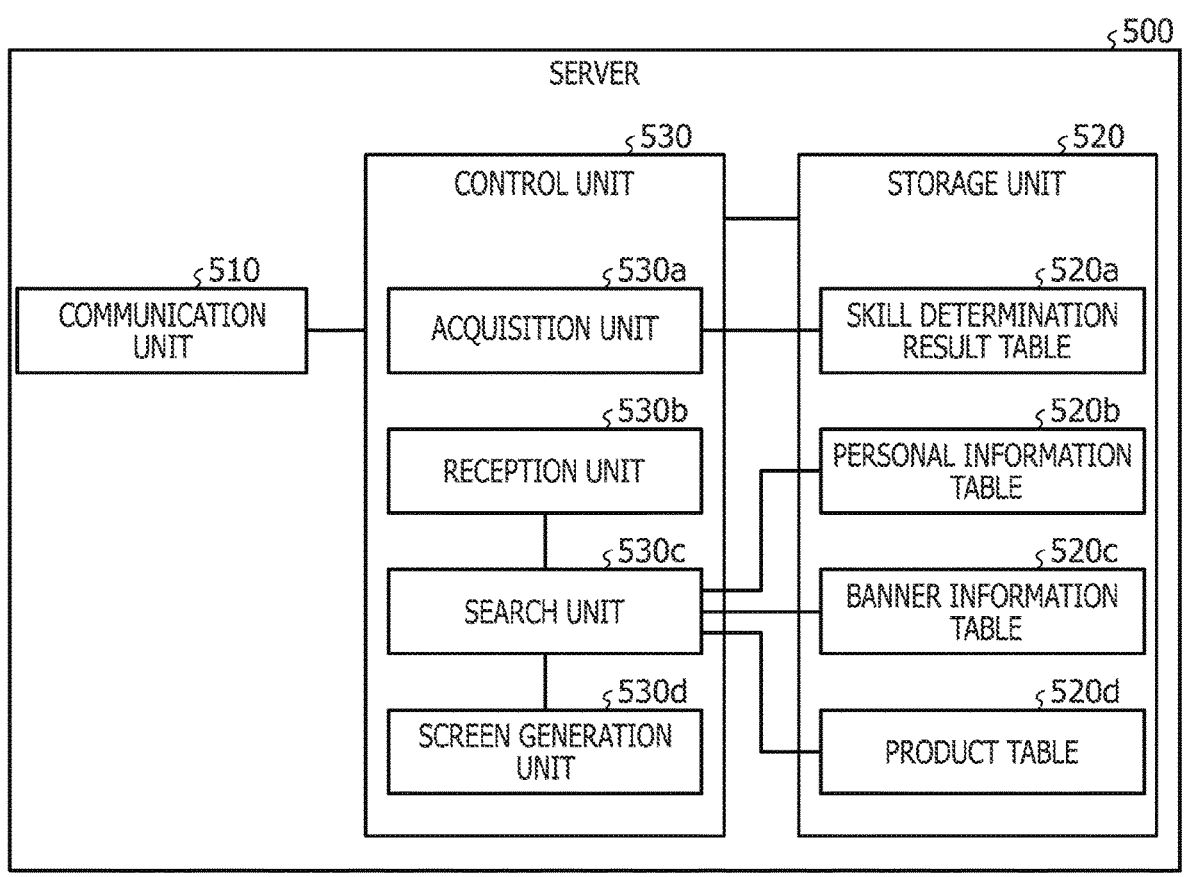
FIG. 41 is a functional block diagram illustrating a configuration of a server according to Embodiment 3.

FIG. 41 is a functional block diagram illustrating a configuration of a server according to Embodiment 3. As illustrated in FIG. 41, the server 500 includes a communication unit 510, a storage unit 520, and a control unit 530.

The communication unit 510 is a processing unit that executes data communication with each user terminal 400 through the network 50. The communication unit 510 corresponds to a communication device. The control unit 530 described later exchanges data with each user terminal 400 through the communication unit 510.

The storage unit 520 includes a skill determination result table 520a, a personal information table 520b, a banner information table 520c, and a product table 520d. The storage unit 520 corresponds to a storage device, such as a RAM (Random Access Memory), a ROM (Read Only Memory), a flash memory, and other semiconductor memory devices.

The skill determination result table 520a is a table for holding the information of the determination results of the skill transmitted from the user terminals 400. FIG. 42 is a diagram illustrating an example of a data structure of a skill determination result table. As illustrated in FIG. 42, user identification information, activities, and skill determination results are associated. The user identification information is information for uniquely identifying the users. The activities indicate activities for which the skill is determined. The skill determination results are determination results of the skills of the users who have performed actions related to the activities.

FIGS. 43A to 43C depict diagrams illustrating an example of skill determination results. The skill determination results illustrated in FIGS. 43A to 43C are skill determination results corresponding to user identification information. For example, each skill determination result is associated with the date of the determination of the skill. Each skill determination result associates the determination result of the head movement, the determination result of the right elbow angle, the determination result of the bent-forward posture, and the determination result of the waist rotation for each phase. Although not illustrated here, the skill determination result table 520a may hold the motion data of the user that is a determination source of the skill determination results, in association with the skill determination results.

The personal information table 520b is a table for holding personal information of the users. FIG. 44 is a diagram illustrating an example of a data structure of a personal information table according to Embodiment 3. As illustrated in FIG. 44, the personal information table 520b associates user identification information, address, sex, age, height, and weight. Among these, the user identification information is information uniquely identifying the user. The address is, for example, an E-mail address (Electronic mail address) used by the user. The sex, the age, the height, and the weight are the sex, the age, the height, and the weight of the user identified by the user identification information.

The banner information table 520c is a table for holding information regarding advertising banners displayed on the display screen of the user terminal 400. FIG. 45 is a diagram illustrating an example of a data structure of a banner information table. As illustrated in FIG. 45, the banner information table 520c associates conditions and advertising banner information. The conditions include, for example, activity, sex, and age. For example, the example illustrated in FIG. 45 indicates to display advertising banners A1, B1, and C1 on the display screen of the user terminal 400 when the activity corresponding to the determination result of the skill is "golf," the sex of the user is "male," and the age of the user is "20 or over."

For example, the advertising banners A1, B1, and C1 are advertising banners directly or indirectly related to the activity "golf."

The product table 520d is a table for defining products according to the skill determination results of the user. FIG. 46 is a diagram illustrating an example of a data structure of a product table. As illustrated in FIG. 46, the product table 520d associates conditions, product names, and comments. The conditions indicate conditions for selecting the product, and the conditions include the activity, the phase, and the determination results. The activity is an activity for which the skill is determined. The product name indicates the name of the product recommended to the user. The comment indicates a reason or the like for recommending the product. For example, it is defined to recommend a product "golf club A" when the activity is "golf," the determination result of the waist rotation is $-45°\pm\alpha$ in the phase "impact," and the determination result of the right knee angle is $10°\pm\alpha$. It is also defined to provide a comment "a shaft with soft hand side is recommended to a body-turn type to use more flexibility" when the product "golf club A" is recommended.

The control unit 530 includes an acquisition unit 530a, a reception unit 530b, a search unit 530c, and a screen generation unit 530d. The control unit 530 corresponds to an integrated device, such as an ASIC (Application Specific Integrated Circuit) and an FPGA (Field Programmable Gate Array). The control unit 530 also corresponds to an electronic circuit, such as a CPU and an MPU (Micro Processing Unit).

The acquisition unit 530a is an acquisition unit that acquires information regarding the determination results of the skill from the user terminal 400. For example, the information regarding the determination results of the skill is information associating the user identification information, the activity, the skill determination results, and the motion data. The acquisition unit 530a associates the user identification information, the activity, and the skill determination results and stores them in the skill determination result table 520a.

When the acquisition unit 530a stores the information regarding the skill determination results in the skill determination result table 520a, the acquisition unit 530a adds the information of the skill determination results to a record of a set of the same user identification information and the activity if the record is already stored.

The reception unit 530b is a processing unit accessed by the user terminal 400 regarding the information of the past skill determination results stored in the skill determination result table 520a. For example, when the user terminal 400 accesses the information of the past skill determination results, the user terminal 400 notifies the server 500 of the user identification information. The reception unit 530b outputs the user identification information received from the user terminal 400 to the search unit 530c.

The search unit 530c is a processing unit that searches for the past skill determination results corresponding to the user identification information, the advertising banner information regarding the activity for which the skill is determined, and the product according to the skill determination results of the user. In the following description, the past skill determination results corresponding to the user identification information will be appropriately referred to as history information. The search unit 530c outputs the searched history information, the advertising banner information, and the information of the product to the screen generation unit 530d. Hereinafter, examples of processes of the search unit 530c will be described.

First, an example of a process of searching for the history information executed by the search unit 530c will be described. The search unit 530c compares the user identification information acquired from the reception unit 530b and the skill determination result table 520a to search for the activity and the skill determination results corresponding to the user identification information. The search unit 530c outputs the information of the searched skill determination results as history information to the screen generation unit 530d. The activity searched by the search unit 530c is used to search for the advertising banner information described later. The information of the skill determination results searched by the search unit 530c is used to search for the product information described later.

Next, an example of a process of searching for the advertising banner information executed by the search unit 530c will be described. The search unit 530c compares the user identification information and the personal information table 520b to specify the sex and the age corresponding to the user identification information. The search unit 530c then compares the set of activity, sex, and age and the conditions of the banner information table 520c to specify the record. The search unit 530c outputs the advertising banner information included in the specified record to the screen generation unit 530d.

For example, the search unit 530c specifies the record of the first line in FIG. 45 when the set of activity, sex, and age is "golf," "male," and "25."

The search unit 530c then outputs the information of the advertising banners A1, B1, and C1 to the screen generation unit 530d.

Next, an example of a process of searching for the product information executed by the search unit 530c will be described. The search unit 530c compares the set of activity and skill determination results and the conditions of the product table 520d to specify the record. The search unit 530c outputs the product information included in the specified record to the screen generation unit 530d. For example, the product information includes the product name and a comment. When there are a plurality of skill determination results for the same user identification information, the search unit 530c uses the latest skill determination result to search for the product information.

For example, it is assumed that the activity is "golf," the determination result of the waist rotation is "45°±α" in the phase "impact" included in the skill determination result, and the determination result of the right knee angle is "10°±α."

In this case, the search unit 530c searches, as the product information, the set of product name and comment included in the record of the first line in FIG. 46.

The screen generation unit 530d is a processing unit that generates a display screen displayed on the screen of the user terminal 400. For example, the screen generation unit 530d provides, on the screen, the information of the skill determination results, the advertising banner information, and the product information acquired from the search unit 530c to generate the display screen. The screen generation unit 530d transmits the information of the generated display screen to the user terminal 400 accessing for the skill determination results.

Next, an example of a processing procedure of the server 500 according to Embodiment 3 will be described. FIG. 47 is a flow chart illustrating a processing procedure of a server according to Embodiment 3. As illustrated in FIG. 47, the reception unit 530b of the server 500 receives the user identification information (step S301). The search unit 530c of the server 500 refers to the skill determination result table 520a to search for the skill determination results corresponding to the user identification information and generates the history information (step S302).

The search unit 530c refers to the banner information table 520c to search for the advertising banner information (step S303). The search unit 530c refers to the product table 520d to search for the product information (step S304).

The screen generation unit 530d of the server 500 generates the display screen provided with the history information, the advertising banner information, and the product information (step S305). The screen generation unit 530d transmits the information of the display screen to the user terminal 400 (step S306).

Next, advantageous effects of the server 500 according to Embodiment 3 will be described. When the server 500 notifies the user terminal 400 of the information of the past determination results of the skill, the server 500 displays, on the display screen of the user terminal 400, the advertising banners directly or indirectly related to the activity for which the skill is determined. The server 500 also displays, on the display screen, the information of the product according to the determination results of the skill of the user. As a result, the directly or indirectly related information may be advertised to the user referring to the skill determination results. The product information according to the skill determination results may also be recommended.

Incidentally, the reception unit 530b of the server 500 may notify the user terminal 400 of charge information according to the amount of data when the reception unit 530b stores, in the skill determination result table 520a, the information of the determination results of the skill from the user terminal 400. For example, the reception unit 530b monitors the amount of data stored in the skill determination result table for each piece of user identification information. The reception unit 530b notifies the user terminal 400 corresponding to the user identification information with the amount of data exceeding a threshold that the amount of uploaded data is over the threshold and further upload is not free. When the user agrees to pay the fee in response to the notification, the reception unit 530b receives a payment method and saves the payment method in association with the user identification information.

Note that when the user operating the user terminal 400 notifies the server 500 of the information regarding the determination results of the skill, the user may select the data to be notified instead of notifying the server 500 of all the information regarding the determination results of the skill. For example, when the user determines that the amount of data regarding the motion data is large, the user may notify the server 500 of only the determination results of the skill to save the amount of data. The user may also notify the server 500 of only a snapshot instead of the motion data to reduce the amount of data.

Embodiment 4

FIG. 48 is a diagram illustrating a configuration of a system according to Embodiment 4. As illustrated in FIG. 48, the system includes the user terminals 400a, 400b, and 400c and a server 600. The user terminals 400a to 400c and the server 600 are coupled to each other through the network 50. Although the user terminals 400a to 400c are illustrated in the example here, other user terminals may be coupled to the network 50. In the following description, the user terminals 400a to 400c will be collectively referred to as user terminals 400 as necessary.

The user terminal 400 has a function similar to the skill determination device 100A illustrated in Embodiment 2. The user terminal 400 is a processing unit that acquires the motion data of the user to determine the skill of the user and that transmits the determination results of the skill to the server 600. Note that the user terminal 400 may be coupled to the skill determination device 100A to acquire the determination results of the skill of the user from the skill determination device 100A of the coupling destination.

The server 600 classifies the users into a plurality of groups in advance based on features of the users. When the server 600 receives the determination results of the skill from the user terminal 400, the server 600 determines the group including the user as the target of the determination of the skill and transmits the information of the determination results of the skill to the user terminal 400 of each user included in the determined group.

Figure 49:
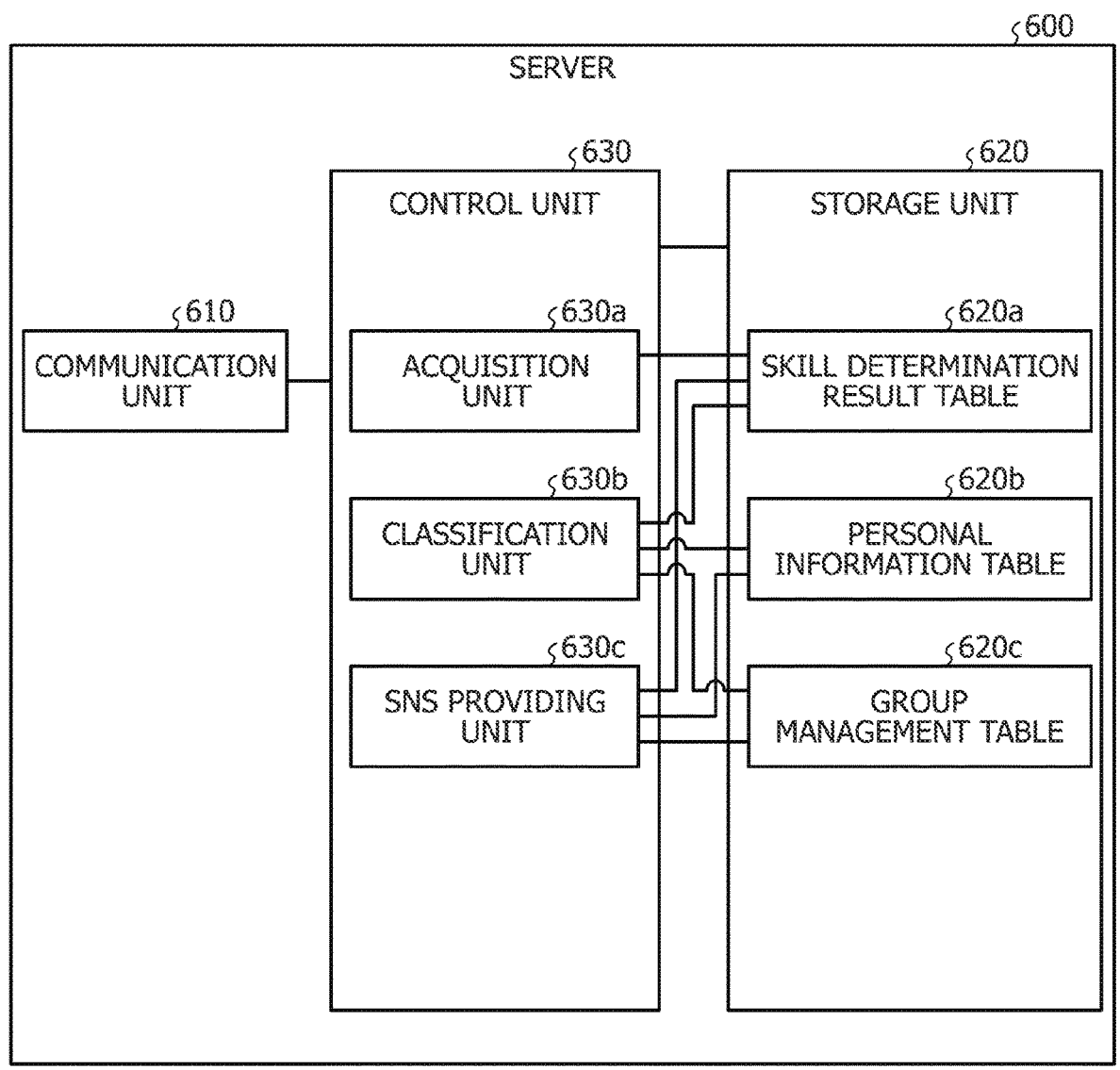
FIG. 49 is a functional block diagram illustrating a configuration of a server according to Embodiment 4.

FIG. 49 is a functional block diagram illustrating a configuration of a server according to Embodiment 4. As illustrated in FIG. 49, the server 600 includes a communication unit 610, a storage unit 620, and a control unit 630.

The communication unit 610 is a processing unit that executes data communication with each user terminal 400 through the network 50. The communication unit 610 corresponds to a communication device. The control unit 630 described later exchanges data with each user terminal 400 through the communication unit 610.

The storage unit 620 includes a skill determination result table 620a, a personal information table 620b, and a group management table 620c. The storage unit 620 corresponds to a storage device, such as a RAM, a ROM, a flash memory, and other semiconductor memory devices.

The skill determination result table 620a is a table for holding the determination results of the skill transmitted from the user terminals 400. The data structure of the skill determination result table 620a is similar to, for example, the data structure of the skill determination result table 520a illustrated in FIG. 42.

The personal information table 620b is a table for holding personal information of the users. FIG. 50 is a diagram illustrating an example of a data structure of a personal information table according to Embodiment 4. As illustrated in FIG. 50, the personal information table 620b associates user identification information, address, sex, age, height, weight, school, and practice field. Among these, the user identification information is information for uniquely identifying the user. The address is, for example, an email address used by the user. The age, the height, and the weight are the sex, the age, the height, and the weight of the user identified by the user identification information. The school indicates a school that the user goes to. The practice field indicates a place where the user practices.

The group management table 620c is a table for holding information of groups that the users belong to. FIG. 51 is a diagram illustrating an example of a data structure of a group management table. As illustrated in FIG. 51, the group management table 620c associates group identification information and belonging user identification information. The group identification information is information for uniquely identifying the group. The belonging user identification information indicates user identification information of the users belonging to the group. For example, the example illustrated in FIG. 51 indicates that the users with user identification information "U101, U103, U114, . . . " belong to a group with group identification information "G101."

The control unit 630 includes an acquisition unit 630a, a classification unit 630b, and an SNS (Social Networking Service) providing unit 630c. The SNS providing unit 630c corresponds to a notification unit. The control unit 630 corresponds to an integrated device, such as an ASIC and an FPGA. The control unit 630 also corresponds to an electronic circuit, such as a CPU and an MPU.

The acquisition unit 630a is an acquisition unit that acquires information regarding the determination results of the skill from the user terminal 400. For example, the information regarding the determination results of the skill is information associating the user identification information, the activity, and the skill determination results. The acquisition unit 630a associates the user identification information, the activity, and the skill determination results and stores them in the skill determination result table 620a.

When the acquisition unit 630a stores the information regarding the skill determination results in the skill determination result table 620a, the acquisition unit 630a adds the information of the skill determination results to a record of a set of the same user identification information and the activity if the record is already stored.

The classification unit 630b is a processing unit that refers to the personal information table 620b to classify the user identification information into groups according to the features of the users. The classification unit 630b associates the group identification information and the user identification information belonging to the group of the group identification information based on the classification results and registers the information in the group management table 620c.

Hereinafter, an example of a process of the classification unit 630b will be described. For example, the classification unit 630b refers to the personal information table 620b to specify the identification information of the users going to the same school and classifies the specified user identification information into the same group. Alternatively, the classification unit 630b refers to the personal information table 620b to specify the identification information of the users going to the same practice field and classifies the specified user identification information into the same group.

The classification process is an example, and the classification unit 630b may classify the user identification information into groups of the same generations, groups of families, or groups instructed by the same coaches. The classification unit 630b may also refer to the skill determination result table 620a and classify the user identification information with the same level of skill into the same group. For example, the classification unit 630b may add points according to Good, Bad, or Excellent included in the skill determination results to obtain points of each piece of user identification information and classify the user identification information with similar points into the same group.

The SNS providing unit 630c is a processing unit that provides an SNS to each user terminal 400. For example, the SNS providing unit 630c refers to the group management table 620c to share the information of the skill determination results and other information, such as an electronic bulletin board, between the users of the user identification information belonging to the same group.

For example, when the information of the skill determination results is registered in the skill determination result table 620a, the SNS providing unit 630c determines the user identification information belonging to the same group as the user identification information corresponding to the skill determination results based on the group management table 620c. The SNS providing unit 630c transmits the information of the skill determination results registered in the skill determination result table 620a to the user terminals 400 corresponding to the specified user identification information. The SNS providing unit 630c may refer to the personal information table 620b to specify the addresses of the user identification information belonging to the group and may transmit the information of the skill determination results to the specified addresses.

For example, with reference to FIG. 51, the belonging user identification information U101, U103, and U114 belong to the group with group identification information "G101."

In addition, it is assumed that the acquisition unit 630a has registered the skill determination results of the user identification information U101 in the skill determination table 620a. In this case, the SNS providing unit 630c transmits the skill determination results of the user identification information U101 to the user terminals 400 with user identification information U103 and U114 of the same group.

Figure 52:
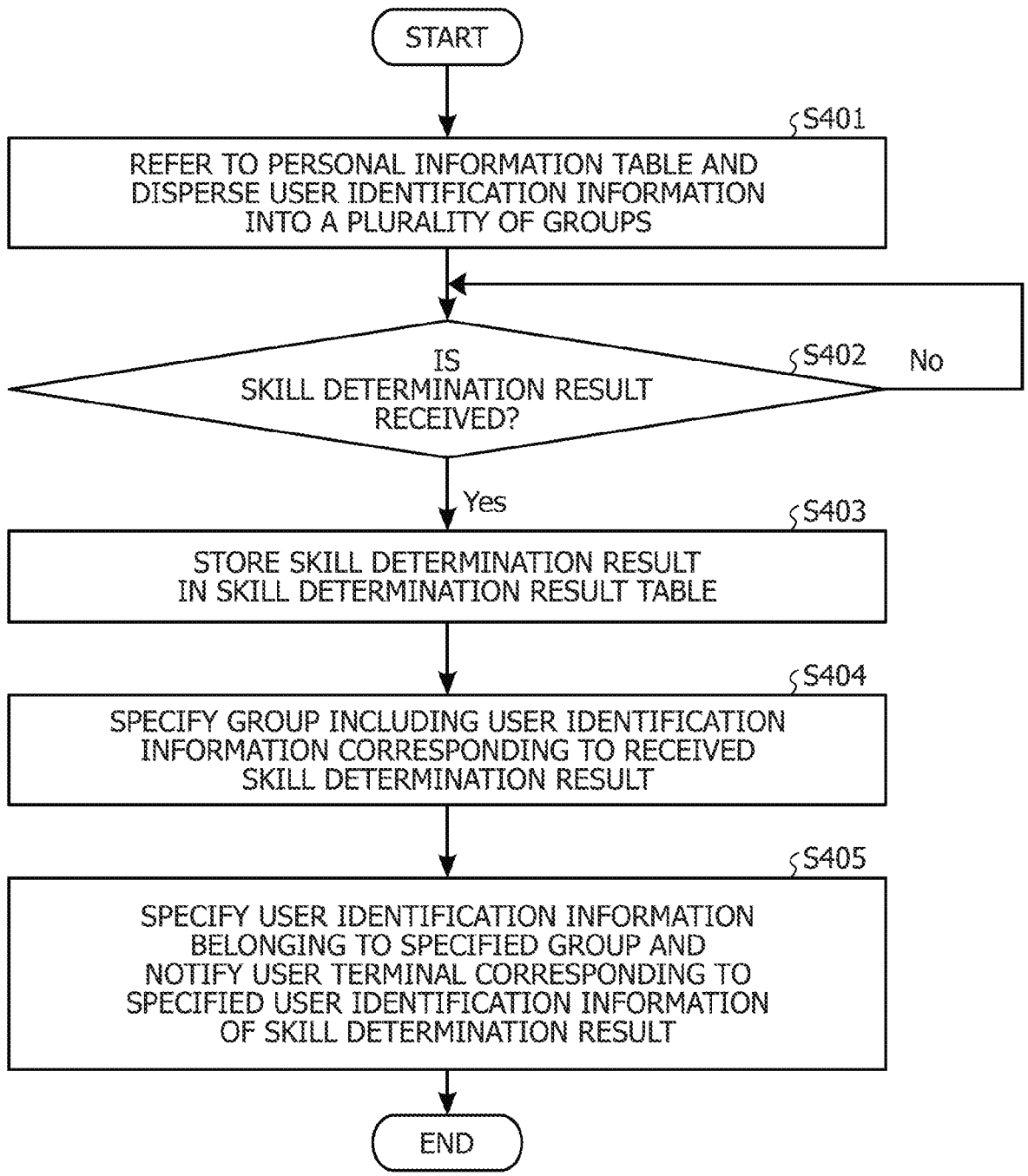
FIG. 52 is a flow chart illustrating a processing procedure of a server according to Embodiment 4.

Next, an example of a processing procedure of the server 600 according to Embodiment 4 will be described. FIG. 52 is a flow chart illustrating a processing procedure of a server according to Embodiment 4. As illustrated in FIG. 52, the classification unit 630b of the server 600 refers to the personal information table 620b to classify the user identification information into a plurality of groups (step S401).

The SNS providing unit 630c of the server 600 determines whether or not the skill determination results are received (step S402). If the skill determination results are not received (step S402, No), the SNS providing unit 630c moves to step S402 again.

If the skill determination results are received (step S402, Yes), the SNS providing unit 630c stores the received skill determination results in the skill determination result table 620a (step S403). The SNS providing unit 630c specifies the group including the user identification information corresponding to the received skill determination results (step S404).

The SNS providing unit 630c specifies the user identification information belonging to the specified group and transmits the skill determination results to the user terminals 400 corresponding to the specified user identification information (step S405).

Next, advantageous effects of the server 600 according to Embodiment 4 will be described. The server 600 classifies the user identification information into a plurality of groups in advance based on the features of the users. When the server 600 receives the determination results of the skill from the user terminal 400, the server 600 determines the group including the user as the target of the determination of the skill and transmits the information of the determination results of the skill to the user terminal 400 of each piece of user identification information included in the determined group. Therefore, the users belonging to the same group may easily communicate with each other. For example, the users may exchange advice for improving the skill on a social network. The process may also serve as an indirectly related site, such as invitation to activity, invitation to event, and invitation to dating, or as an offline customer service.

Embodiment 5

Figure 53:
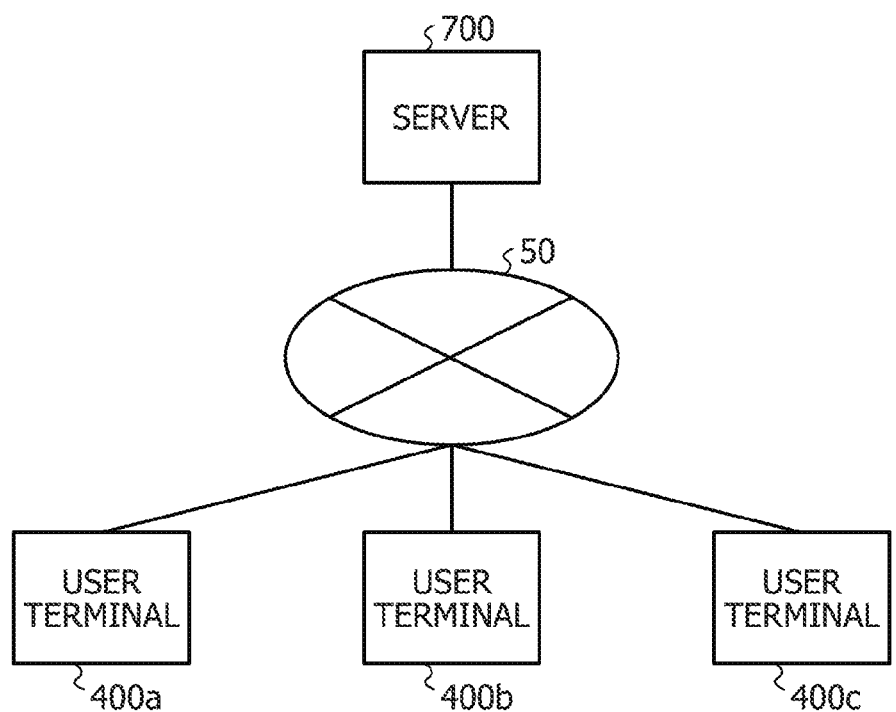
FIG. 53 is a diagram illustrating a configuration of a system according to Embodiment 5.

FIG. 53 is a diagram illustrating a configuration of a system according to Embodiment 5. As illustrated in FIG. 53, the system includes the user terminals 400a, 400b, and 400c and a server 700. The user terminals 400a to 400c and the server 700 are coupled to each other through the network 50. Although the user terminals 400a to 400c are illustrated in the example here, other user terminals may be coupled to the network 50. In the following description, the user terminals 400a to 400b will be collectively referred to as user terminals 400 as necessary.

The user terminal 400 has a function similar to the skill determination device 100A illustrated in Embodiment 2. The user terminal 400 is a processing unit that acquires the motion data of the user to determine the skill of the user and that notifies the server 700 of the determination results of the skill. Note that the user terminal 400 may be coupled to the skill determination device 100A to acquire the determination results of the skill of the user from the skill determination device 100A of the coupling destination.

The user operates the user terminal 400 to acquire the exemplar data of a favorite expert from the server 700 and uses the acquired exemplar data of the expert to determine the skill of the user.

The server 700 is a server that manages exemplar data of a plurality of types of experts. Once the user terminal 400 accesses the server 700, the server 700 displays the exemplar data of the plurality of types of experts and receives a selection of the exemplar data of one of the experts. Once the exemplar data of the expert is selected, the server 700 notifies the user terminal 400 of the selected exemplar data. Note that the server 700 may select the exemplar data of the expert suitable for the user and notify the user terminal 400 of the selected exemplar data of the expert.

Figure 54:
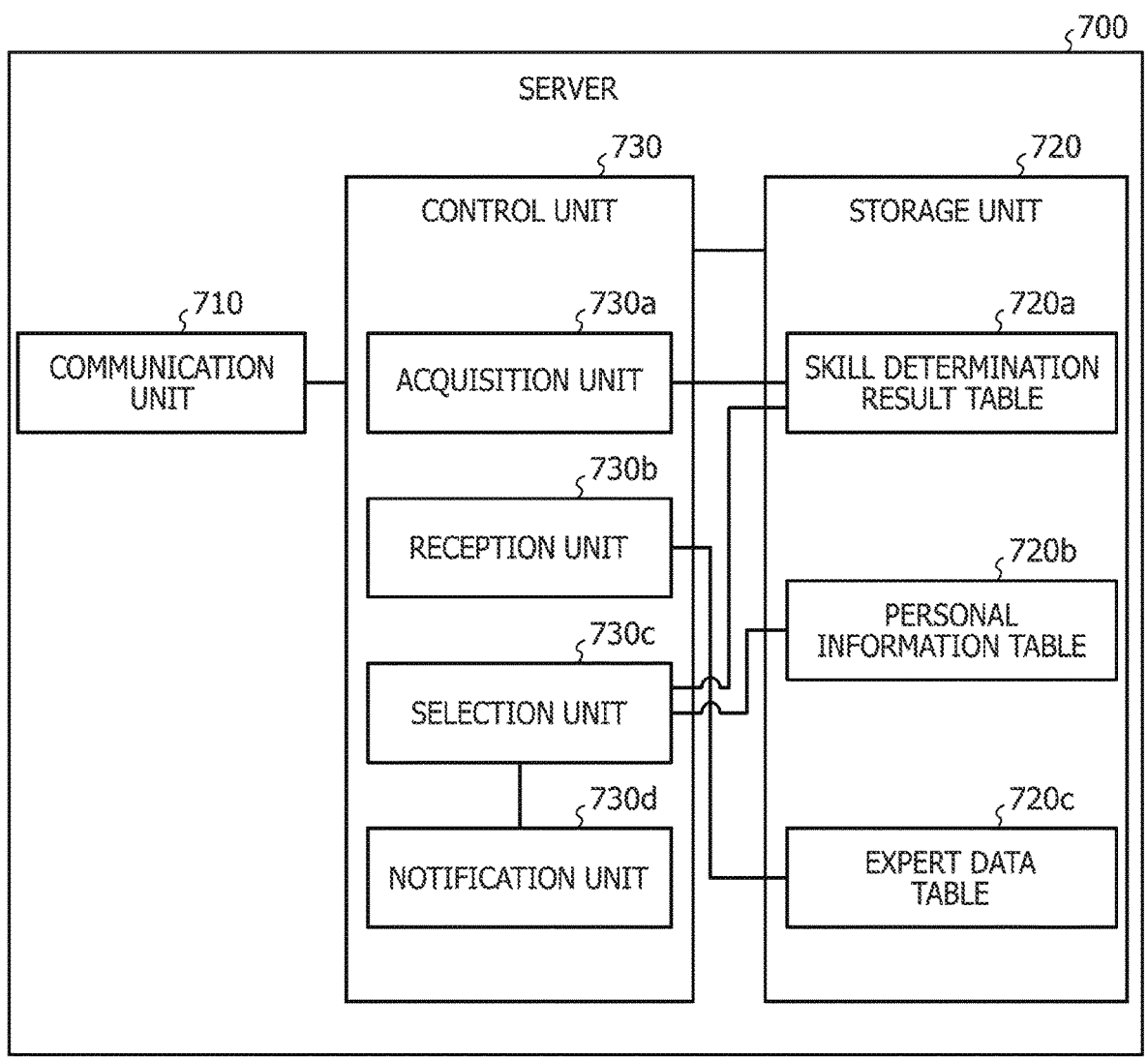
FIG. 54 is a functional block diagram illustrating a configuration of a server according to Embodiment 5.

FIG. 54 is a functional block diagram illustrating a configuration of a server according to Embodiment 5. As illustrated in FIG. 54, the server 700 includes a communication unit 710, a storage unit 720, and a control unit 730.

The communication unit 710 is a processing unit that executes data communication with each user terminal 400 through the network 50. The communication unit 710 corresponds to a communication device. The control unit 730 described later exchanges data with each user terminal 400 through the communication unit 710.

The storage unit 720 includes a skill determination result table 720a, a personal information table 720b, and an expert data table 720c. The storage unit 720 corresponds to a storage device, such as a RAM, a ROM, a flash memory, and other semiconductor memory devices.

The skill determination result table 720a is a table for holding the determination results of the skill transmitted from the user terminals 400. The data structure of the skill determination result table 720a is similar to, for example, the data structure of the skill determination result table 520a illustrated in FIG. 42.

The personal information table 720b is a table for holding personal information of the users. The data structure of the personal information table 720b is similar to, for example, the data structure of the personal information table 520b illustrated in FIG. 44.

The expert data table 720c is a table for holding information regarding the exemplar data of the experts. FIG. 55 is a diagram illustrating an example of a data structure of an expert data table. As illustrated in FIG. 55, the expert data table 720c associates expert identification information, profile information, exemplar data, and evaluation value. Among these, the expert identification information is information for uniquely identifying the expert. The profile information is information of the profile of the expert. The information of the profile of the expert includes information, such as the sex, the age, the weight, and the height of the expert. The exemplar data corresponds to the exemplar data 120a described in Embodiment 2.

The control unit 730 includes an acquisition unit 730a, a reception unit 730b, a selection unit 730c, and a notification unit 730d. The control unit 730 corresponds to an integrated device such as an ASIC and an FPGA. The control unit 730 also corresponds to an electronic circuit, such as a CPU and an MPU.

The acquisition unit 730a is an acquisition unit that acquires information regarding the determination results of the skill from the user terminal 400. For example, the information regarding the determination results of the skill is information associating the user identification information, the activity, and the skill determination result. The acquisition unit 730a associates the user identification information, the activity, and the skill determination results and stores them in the skill determination result table 720a.

When the acquisition unit 730a stores the information regarding the skill determination results in the skill determination result table 720a, the acquisition unit 730a adds the information of the skill determination results to a record of a set of the same user identification information and the activity if the record is already stored.

The reception unit 730b executes the following action when the reception unit 730b receives an access request regarding the exemplar data of the expert from the user terminal. The reception unit 730b causes the user terminal 400 to display a display screen associating the profile information of the expert, the exemplar data, and the evaluation value stored in the expert data table 720c. Once the user operating the user terminal selects the exemplar data, the reception unit 730b notifies the user terminal 400 of the selected exemplar data. Note that the notification unit 730d described later may notify the user terminal 400 of the selected exemplar data.

When the reception unit 730b receives the information of the evaluation value for the exemplar data of the expert from the user terminal 400, the reception unit 730b updates the evaluation value. For example, the reception unit 730b may average the evaluation values from the user terminals 400 corresponding to the experts to update the evaluation values of the expert data table 720c.

Although the user operating the user terminal selects the exemplar data in the example described above, the server 700 may select the exemplar data appropriate for the user to notify the user terminal 400 of the selected exemplar data.

The selection unit 730c is a processing unit that selects the exemplar data appropriate for the user. For example, the selection unit 730c acquires the user identification information from the user terminal 400 and acquires the sex, the age, the height, and the weight corresponding to the user identification information from the personal information table 720b. In the following description, the sex, the age, the height, and the weight corresponding to the user identification information will be collectively referred to as user profile information as necessary.

The notification unit 730d is a processing unit that transmits the exemplar data acquired from the selection unit 730c to the user terminal 400 of the requester.

Next, an example of a process of the selection unit 730c will be described. The selection unit 730c selects profile information of the expert data table 720c most similar to the user profile information. The selection unit 730c selects the exemplar data of the record corresponding to the selected profile information and outputs the selected exemplar data to the notification unit 730d.

The selection unit 730c may use any method to select the similar profile information. For example, the selection unit 730c compares the user profile information and the profile information of the expert. The selection unit 730c provides points according to whether or not the sexes match and according to the difference between the ages, the difference between the heights, and the difference between the weights. The selection unit 730c selects the profile information with the highest total points as the similar profile information. For example, given points are provided when the sexes match, and points are not provided when the sexes do not match. Larger points are provided for a smaller difference between the ages, for a smaller difference between the heights, and for a smaller difference between the weights.

Furthermore, the selection unit 730c may acquire the motion data of the user from the user terminal 400 and acquire the exemplar data most similar to the acquired motion data from the exemplar data of the expert data table 720c. For example, the selection unit 730c executes a process similar to the skill determination device 100A described in Embodiment 2 based on the motion data of the user and each piece of exemplar data of the expert data table 720c to determine the skill to thereby select the exemplar data most similar to the motion data of the user. For example, the selection unit 730c may perform the skill determination and select the exemplar data with the largest number of Excellent as the most similar exemplar data.

The selection unit 730c may also associate the exemplar data transmitted to the user terminal 400 and the skill determination results based on the exemplar data and store them in the skill determination result table 720a. The selection unit 730c repeatedly executes the process and determines whether or not the skill of the user is improved based on the skill determination results stored in the skill determination result table 720a. For example, the selection unit 730c compares the past skill determination results corresponding to the same user identification information and the current skill determination results and determines that the user and the expert are compatible when the number of Excellent is increased. In this case, the selection unit 730c continues to transmit the exemplar data of the same expert to the user terminal 400. The selection unit 730c may also correct and increase the evaluation value of the expert when the number of Excellent is increased.

On the other hand, the selection unit 730c compares the past skill determination results corresponding to the same user identification information and the current skill determination results and determines that the user and the expert are incompatible when the number of Excellent is decreased or not changed. In this case, the selection unit 730c transmits the exemplar data of another expert to the user terminal 400. The selection unit 730c may also correct and reduce the evaluation value of the expert when the number of Excellent is decreased or not changed.

Figure 56:
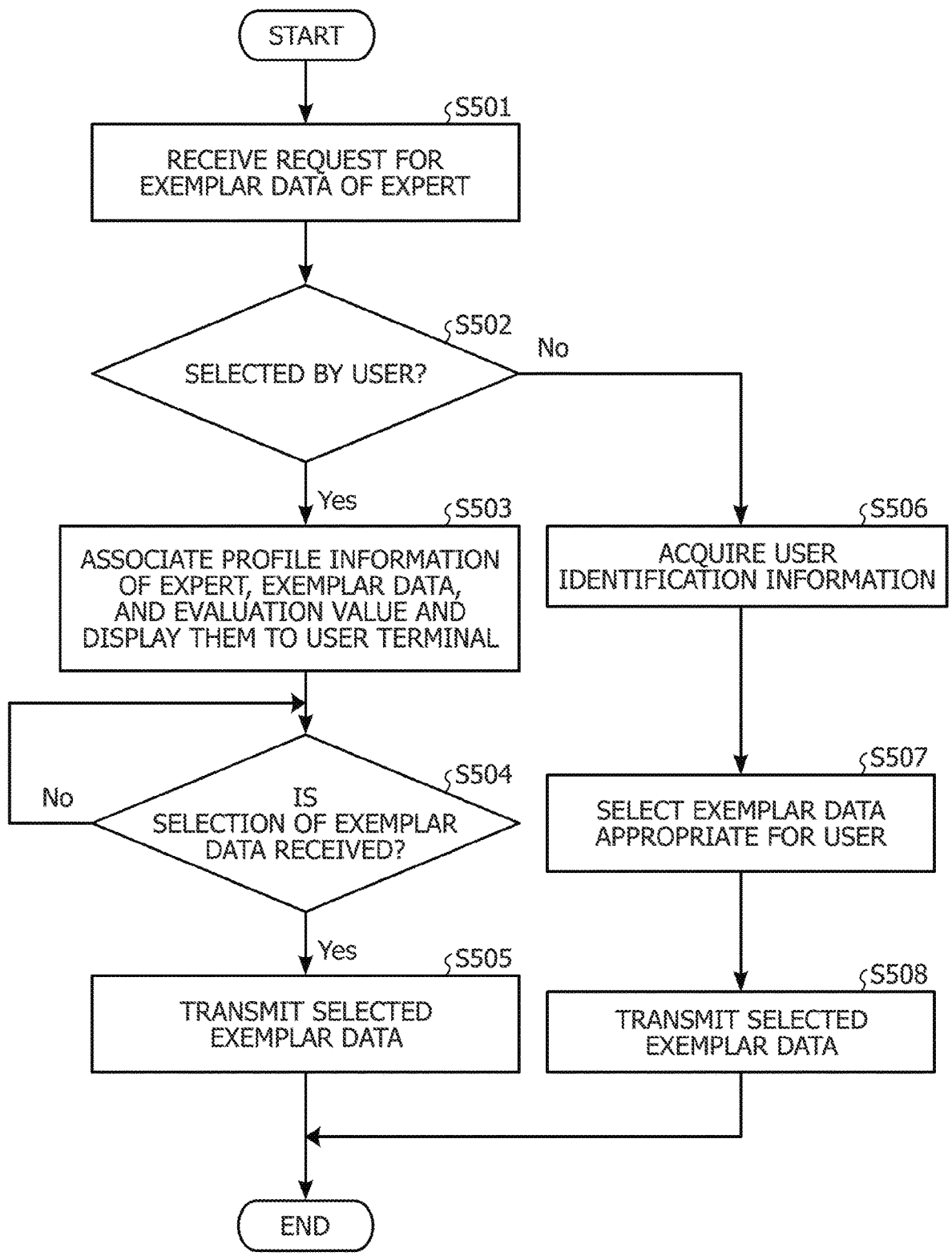
FIG. 56 is a flow chart illustrating a processing procedure of a server according to Embodiment 5.

Next, an example of a processing procedure of the server 700 according to Embodiment 5 will be described. FIG. 56 is a flow chart illustrating a processing procedure of a server according to Embodiment 5. As illustrated in FIG. 56, the reception unit 730a of the server 700 receives a request for the exemplar data of the expert from the user terminal 400 (step S501).

Here, if the user selects the exemplar data of the expert (step S502, Yes), the server 700 moves to step S503. On the other hand, if the user does not select the exemplar data of the expert (step S502, No), the server 700 moves to step S506.

The process from step S503 will be described. The reception unit 730b of the server 700 associates the profile information of the expert, the exemplar data, and the evaluation value and displays them on the user terminal 400 (step S503).

The reception unit 730b determines whether or not the exemplar data is selected (step S504). If the exemplar data is not selected (step S504, No), the reception unit 730b moves to step S504 again.

On the other hand, if the exemplar data is selected (step S504, Yes), the reception unit 730b notifies the user terminal 400 of the selected exemplar data (step S505).

The process from step S506 will be described. The selection unit 730c of the server 700 acquires the user identification information from the user terminal 400 (step S506). The selection unit 730c selects the exemplar data appropriate for the user (step S507). The server 700 notifies the user terminal 400 of the exemplar data selected by the selection unit 730c (step S508).

Next, advantageous effects of the server 700 according to Embodiment 5 will be described. The server 700 displays the exemplar data of the expert on the user terminal 400, and once the exemplar data of the expert is selected, the server 700 notifies the user terminal 400 of the selected exemplar data. Alternatively, the server 700 selects the exemplar data of the expert suitable for the user and notifies the user terminal 400 of the selected exemplar data of the expert. Therefore, the user may use the exemplar data of the expert suitable for the user to determine the skill.

Figure 57:
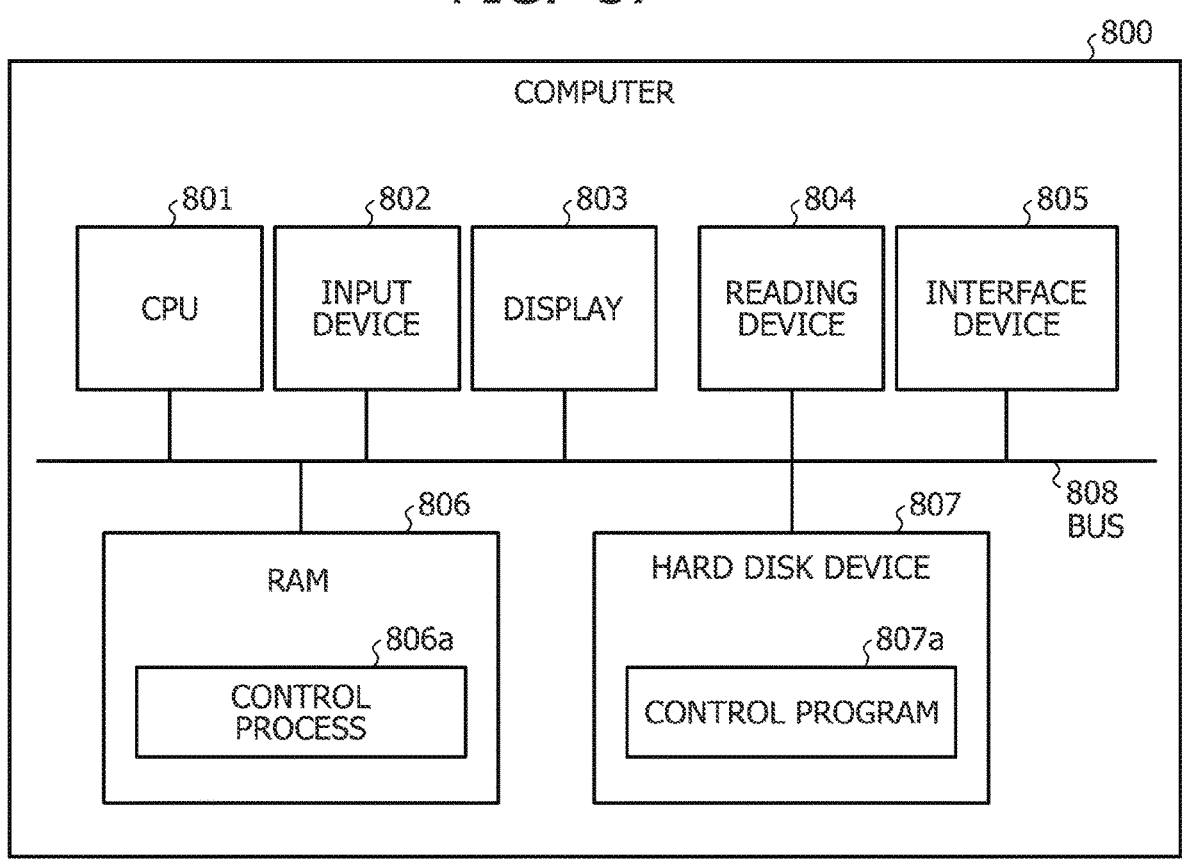
FIG. 57 is a diagram illustrating an example of a computer that executes a control program.

Next, an example and a hardware configuration of a computer that executes a control program for realizing functions similar to the servers 500, 600, and 700 illustrated in Embodiments will be described. FIG. 57 is a diagram illustrating an example of a computer that executes a control program.

As illustrated in FIG. 57, a computer 800 includes: a CPU 801 that executes various types of arithmetic processing; an input device 802 that receives an input of data from the user; and a display 803. The computer 800 also includes: a reading device 804 that reads a program and the like from a storage medium; and an interface device 805 that transfers data to and from another computer through a network. The computer 800 also includes: a RAM 806 that temporarily stores various types of information; and a hard disk device 807. The devices 801 to 807 are coupled to a bus 808.

The hard disk device 807 includes a control program 807a. The CPU 801 reads the control program 807a and expands the control program 807a to the RAM 806. The control program 807a functions as a control process 806a. For example, the control process 806a corresponds to the acquisition unit 530a, the reception unit 530b, the search unit 530c, and the screen generation unit 530d illustrated in FIG. 41. Alternatively, the control process 806a corresponds to the acquisition unit 630a, the classification unit 630b, and the SNS providing unit 630c illustrated in FIG. 49. Alternatively, the control process 806a corresponds to the acquisition unit 730a, the reception unit 730b, the selection unit 730c, and the notification unit 730d illustrated in FIG. 54.

Note that the control program 807a may not be stored in the hard disk device 807 from the beginning. Each program is stored in advance in a "portable physical medium," such as a flexible disk (FD), a CD-ROM, a DVD disk, a magneto-optical disk, and an IC card, inserted into the computer 800. Then, the computer 800 may read and execute the control program 807a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a memory;
   a processor coupled to the memory,
   wherein the processor, using the memory,
   acquires three-dimensional information of a plurality of observation points on an object from a sensor, specifies a first area and a plurality of second areas adjacent to the first area from areas of the object based on the three-dimensional information, performs image thresholding and thinning on the three-dimensional information to specify positions of a plurality of feature points included in the second areas;

sets links based on the feature points included in the second areas to estimate positions of skeletons included in the second areas; and uses end points of the skeletons included in the second areas and lengths from the end points of the skeletons to a position of a part included in the first area among a plurality of parameters used to specify the position of the part included in the first area, specifies the position of the part included in the first area, and estimates a position of a skeleton included in the first area based on the specified position of the part.

2. The apparatus of claim 1, wherein
the plurality of parameters include an angle parameter, and the processor changes the angle parameter to specify positions of a plurality of part candidates and specifies, as the part included in the first area, a part candidate close to a position of a given point in the first area among the plurality of part candidates.

3. The apparatus of claim 2, wherein
when the processor specifies the part included in the first area, the processor updates the position of the given point in the first area according to the specified position of the part.

4. The apparatus of claim 1, wherein
the first area corresponds to an area of a body part of the object, and the plurality of second areas correspond to an area of a head part, an area of an arm part, and an area of a leg part of the object.

5. A method executed by a computer, the method comprising:

acquiring three-dimensional information of a plurality of observation points on an object from a sensor, specifying a first area and a plurality of second areas adjacent to the first area from areas of the object based on the three-dimensional information, and performing image thresholding and thinning on the three-dimensional information to specify positions of a plurality of feature points included in the second areas;

setting links based on the feature points included in the second areas to estimate positions of skeletons included in the second areas; and using end points of the skeletons included in the second areas and lengths from the end points of the skeletons to a position of a part included in the first area among a plurality of parameters used to specify the position of the part included in the first area, specifying the position of the part included in the first area, and estimating a position of a skeleton included in the first area based on the specified position of the part.

6. The method of claim 5, wherein
the plurality of parameters include an angle parameter, and in the estimating the position of the skeleton included in the first area, the angle parameter is changed to specify positions of a plurality of part candidates, and a part candidate close to a position of a given point in the first area among the plurality of part candidates is specified as a part included in the first area.

7. The method of claim 6, wherein
in the estimating the position of the skeleton included in the first area, when the part included in the first area is specified, the position of the given point in the first area is updated according to the specified position of the part.

8. The method of claim 5, wherein
the first area corresponds to an area of a body part of the object, and the plurality of second areas correspond to an area of a head part, an area of an arm part, and an area of a leg part of the object.

9. A non-transitory computer-readable recording medium storing therein a program for causing a computer to execute a process, the process comprising:

acquiring three-dimensional information of a plurality of observation points on an object from a sensor, specifying a first area and a plurality of second areas adjacent to the first area from areas of the object based on the three-dimensional information, and performing image thresholding and thinning on the three-dimensional information to specify positions of a plurality of feature points included in the second areas;

setting links based on the feature points included in the second areas to estimate positions of skeletons included in the second areas; and using end points of the skeletons included in the second areas and lengths from the end points of the skeletons to a position of a part included in the first area among a plurality of parameters used to specify the position of the part included in the first area, specifying the position of the part included in the first area, and estimating a position of a skeleton included in the first area based on the specified position of the part.

10. The non-transitory computer-readable recording medium of claim 9, wherein
the plurality of parameters include an angle parameter, and in the estimating the position of the skeleton included in the first area, the angle parameter is changed to specify positions of a plurality of part candidates, and a part candidate close to a position of a given point in the first area among the plurality of part candidates is specified as a part included in the first area.

11. The non-transitory computer-readable recording medium of claim 10, wherein
in the estimating process, the position of the skeleton included in the first area, when the part included in the first area is specified, the position of the given point in the first area is updated according to the specified position of the part.

12. The non-transitory computer-readable recording medium of claim 9, wherein
the first area corresponds to an area of a body part of the object, and the plurality of second areas correspond to an area of a head part, an area of an arm part, and an area of a leg part of the object.

13. The apparatus of claim 1, wherein
the end points are fixed end points and the lengths are fixed end points.

14. The apparatus of claim 1, wherein
the three-dimensional information, the first area, and the second areas are configured to store in the memory.

15. The apparatus of claim 1, further comprising the sensor.

* * * * *